Feb. 13, 1940.  P. H. WILLIAMS ET AL  2,189,851
ACCOUNTING MACHINE
Filed Oct. 8, 1936  14 Sheets-Sheet 1

Inventors
Paul H. Williams
Jesse R. Ganger
William H. Petit and
John T. Davidson
By *Kearl Benst*
Their Attorney

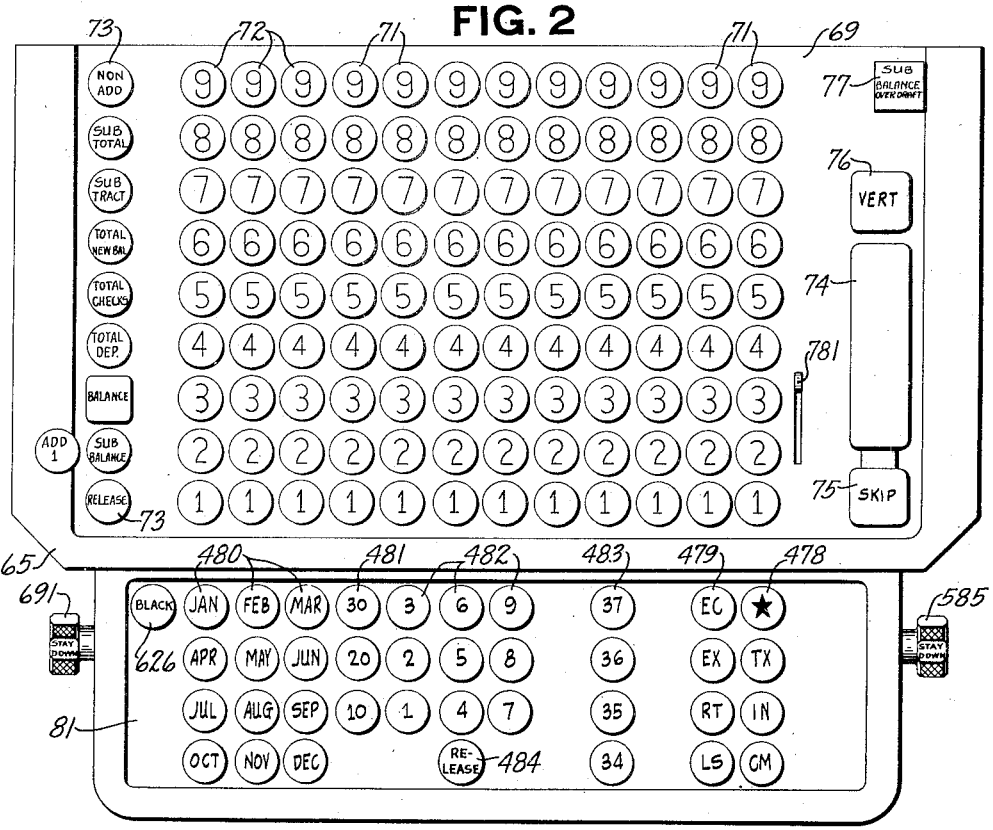

Feb. 13, 1940.　　P. H. WILLIAMS ET AL　　2,189,851
ACCOUNTING MACHINE
Filed Oct. 8, 1936　　14 Sheets-Sheet 3

Inventors
Paul H. Williams
Jesse R. Ganger
William H. Petit and
John T. Davidson
By　Earl Benit
Their Attorney

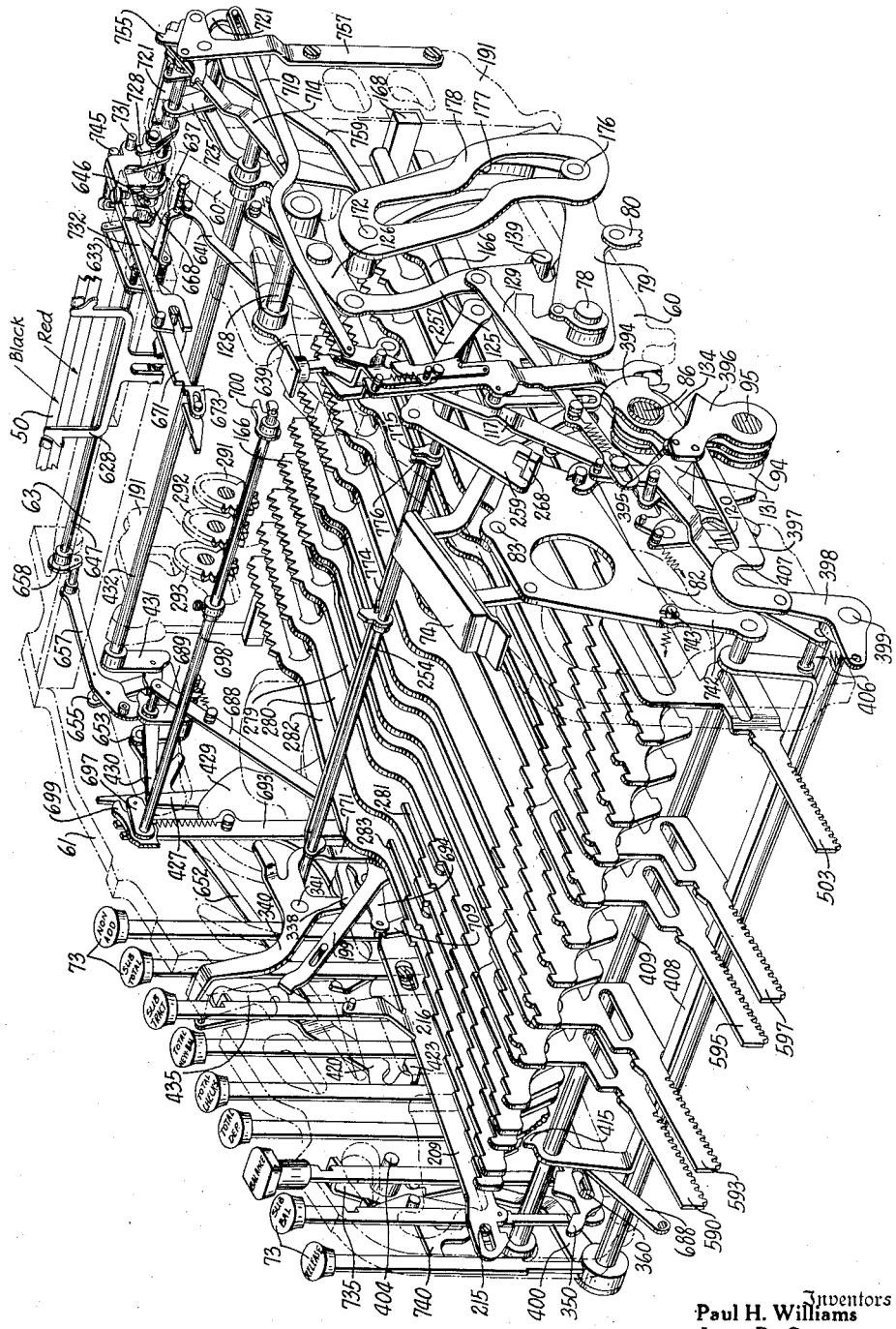

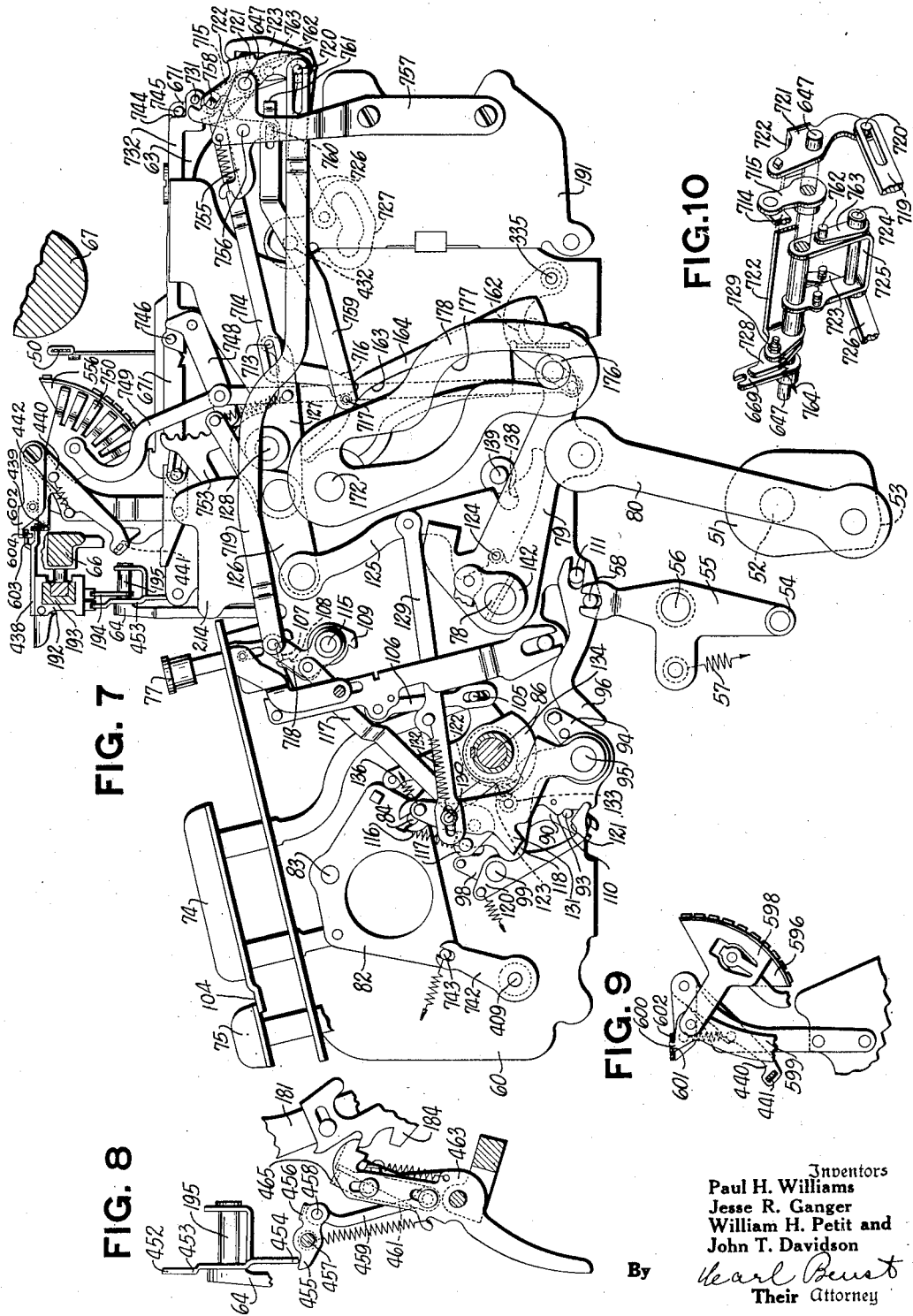

Feb. 13, 1940.  P. H. WILLIAMS ET AL  2,189,851
ACCOUNTING MACHINE
Filed Oct. 8, 1936  14 Sheets-Sheet 6

Inventors
Paul H. Williams
Jesse R. Ganger
William H. Petit and
John T. Davidson By  Earl Beust
Their Attorney Feb. 13, 1940. P. H. WILLIAMS ET AL 2,189,851
ACCOUNTING MACHINE
Filed Oct. 8, 1936 14 Sheets-Sheet 7
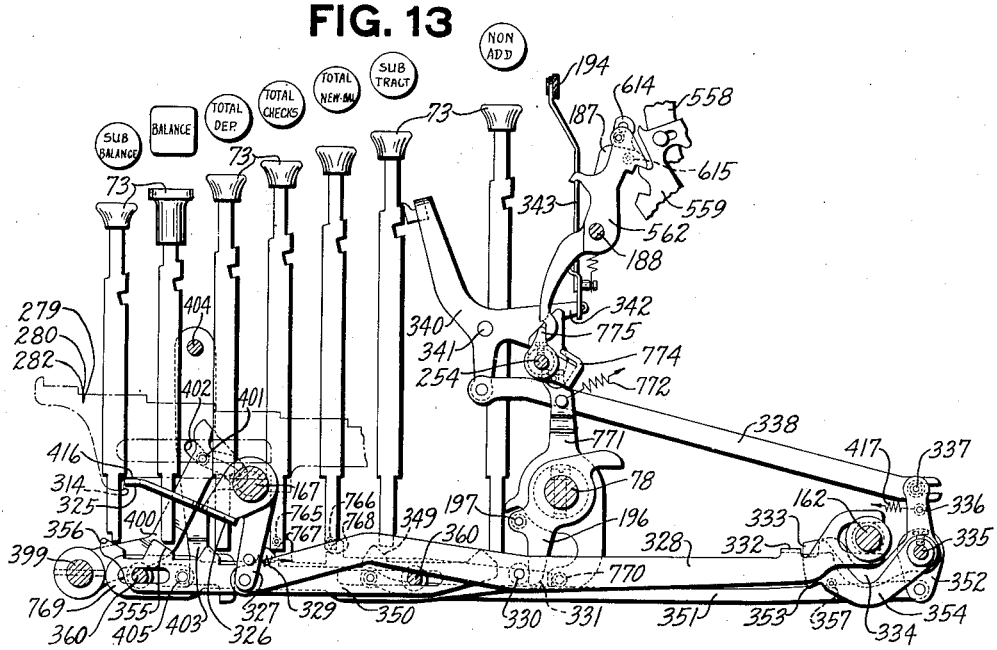
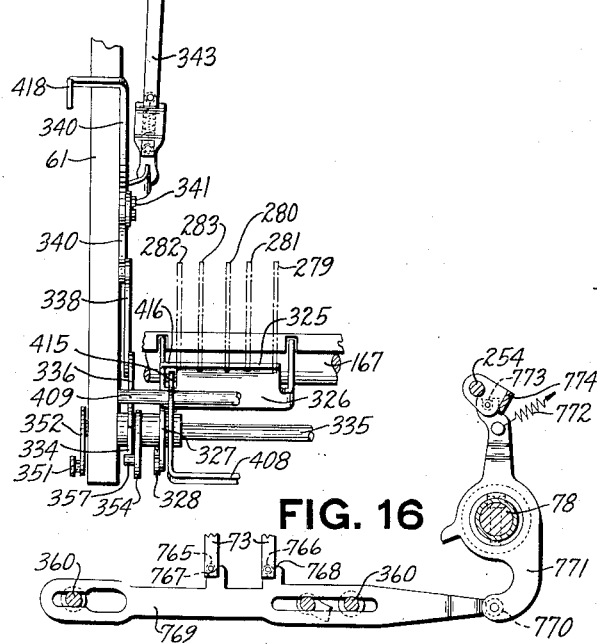
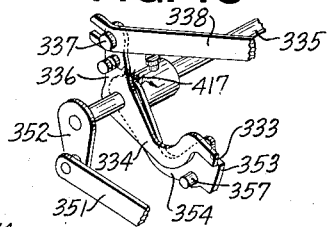
Inventors
Paul H. Williams
Jesse R. Ganger
William H. Petit and
John T. Davidson
By Earl Benst
Their Attorney

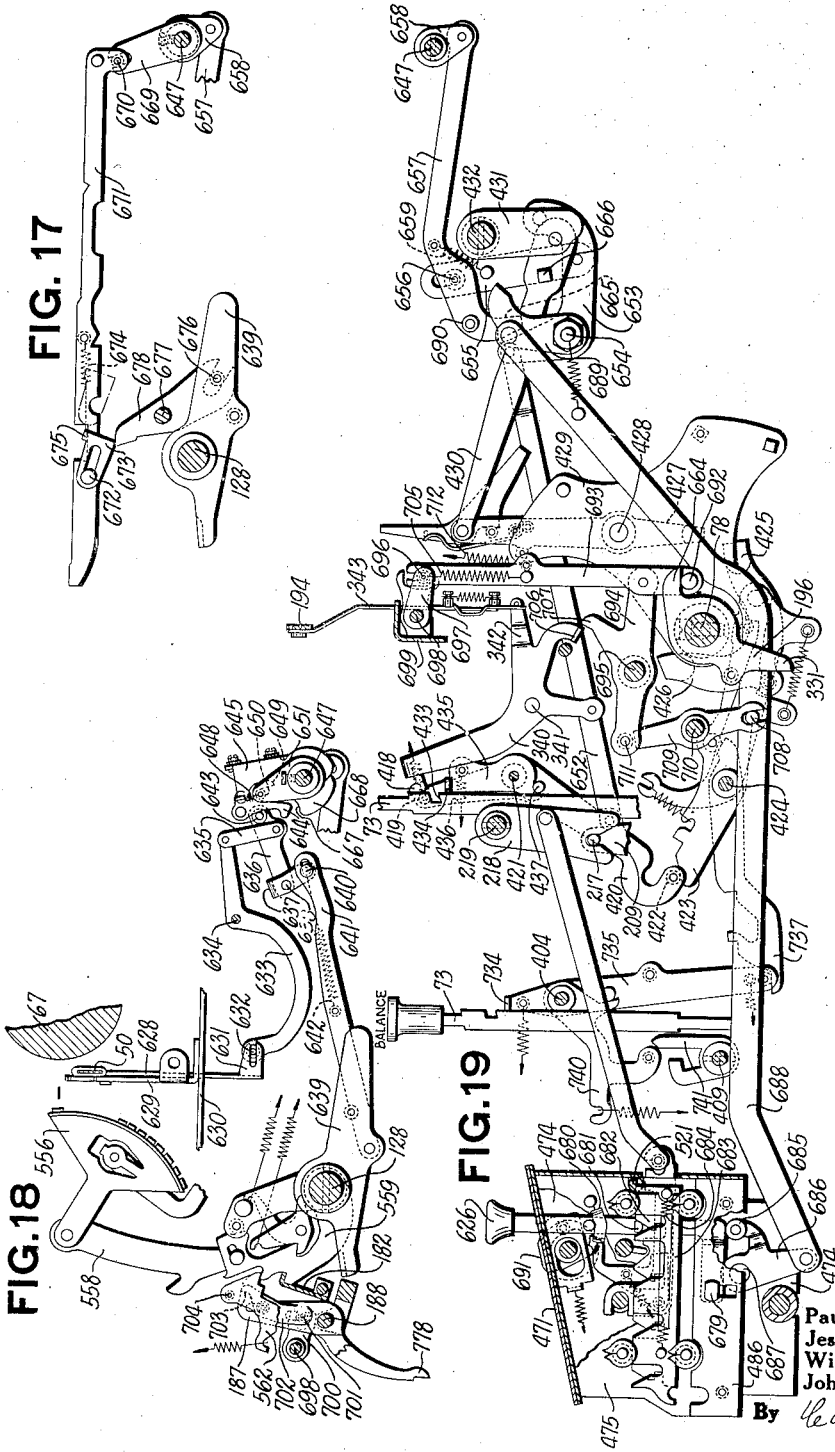

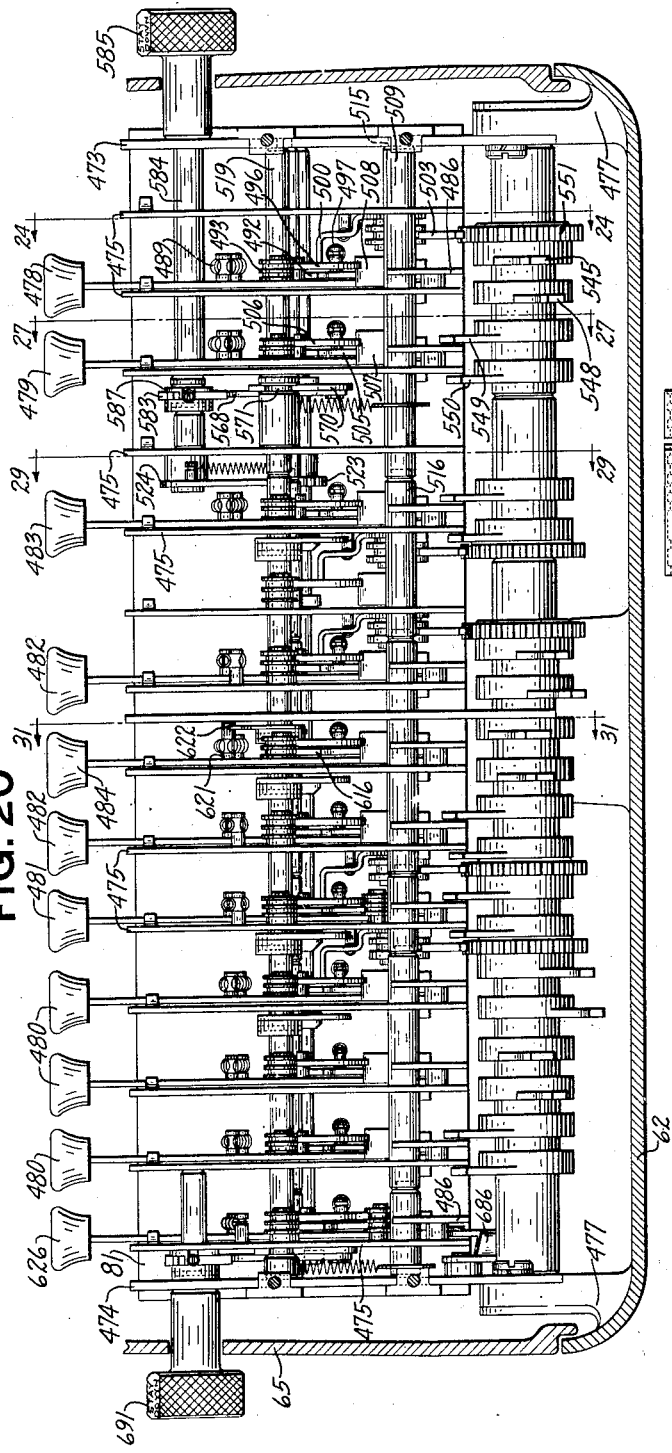

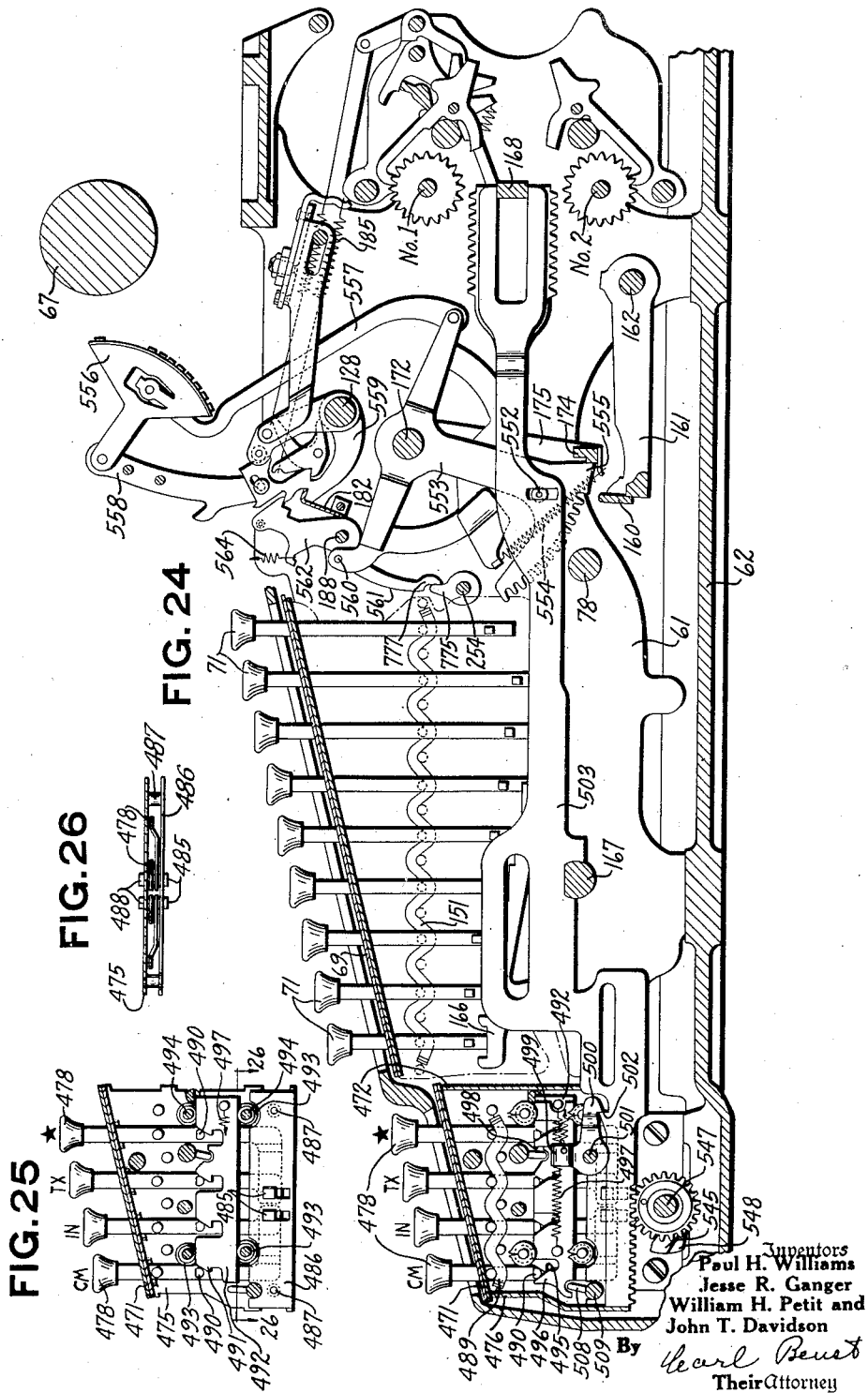

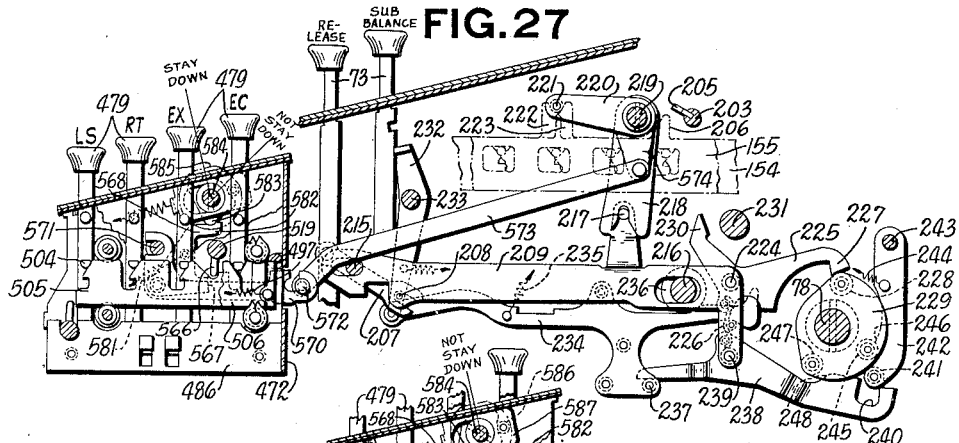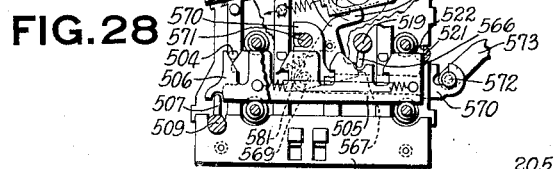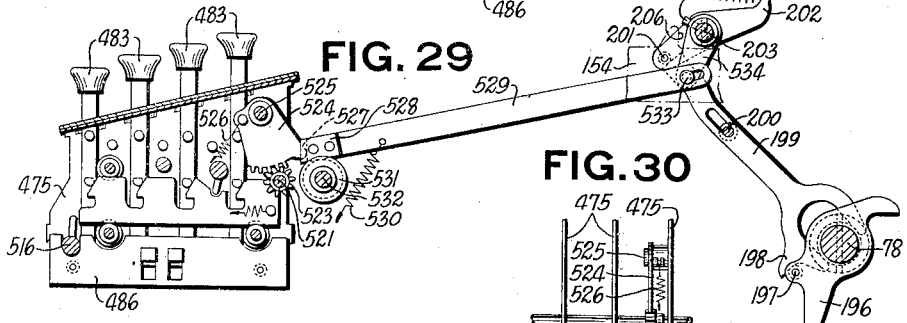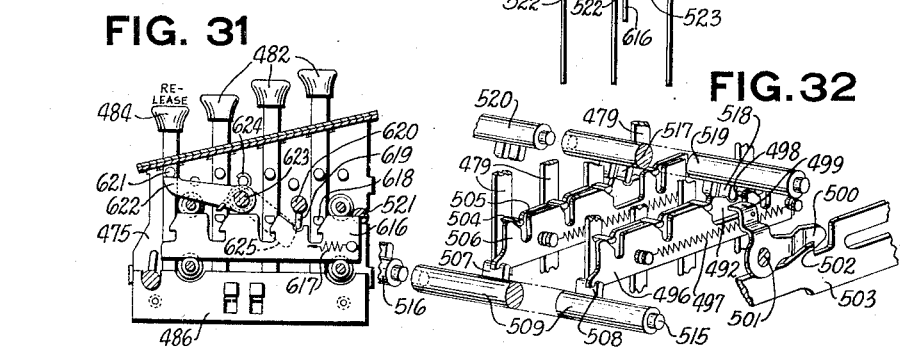

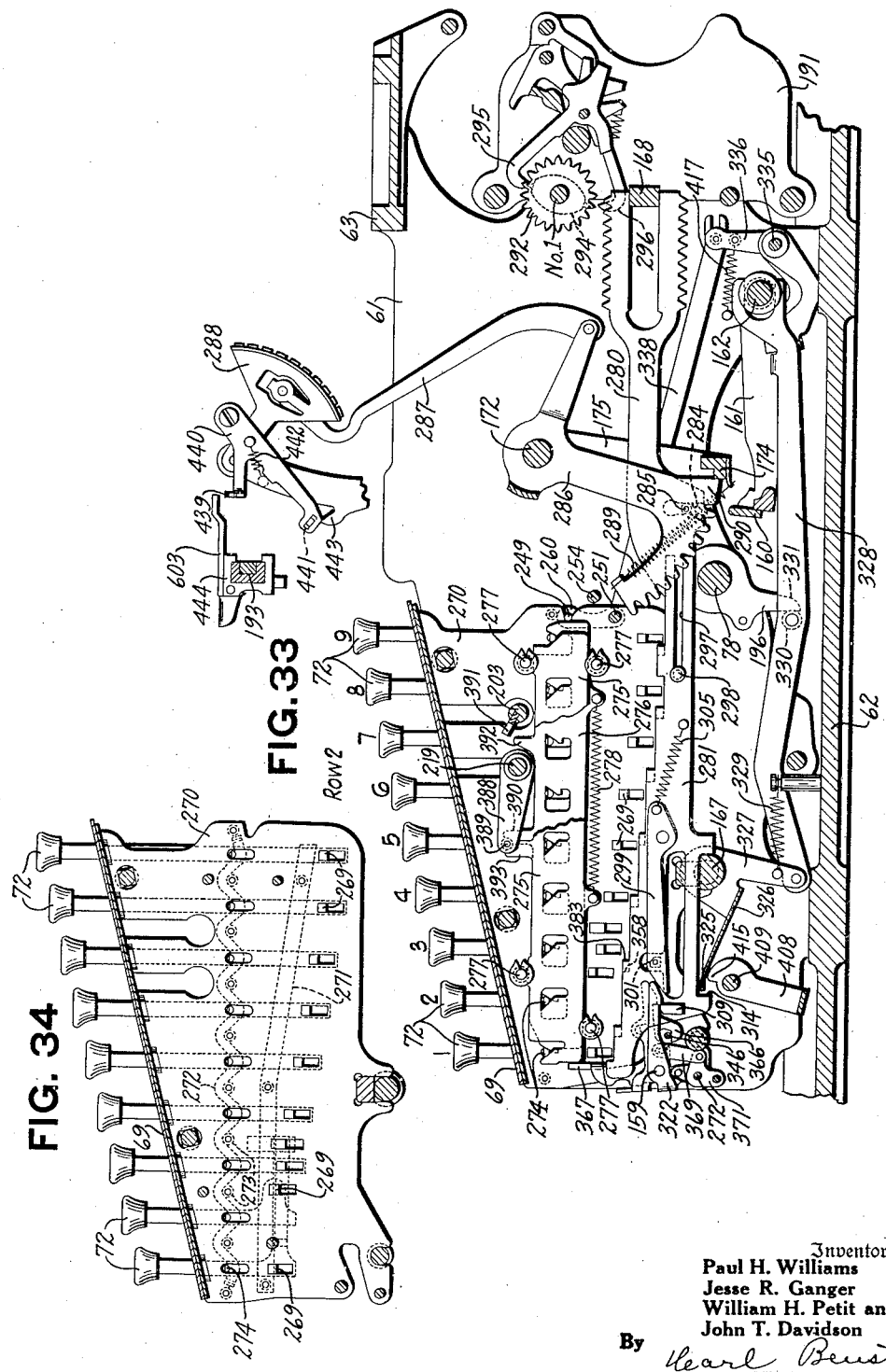

Feb. 13, 1940.  P. H. WILLIAMS ET AL  2,189,851
ACCOUNTING MACHINE
Filed Oct. 8, 1936  14 Sheets-Sheet 13

Inventors
Paul H. Williams
Jesse R. Ganger
William H. Petit and
John T. Davidson
By
Their Attorney Feb. 13, 1940. P. H. WILLIAMS ET AL 2,189,851
ACCOUNTING MACHINE
Filed Oct. 8, 1936   14 Sheets-Sheet 14
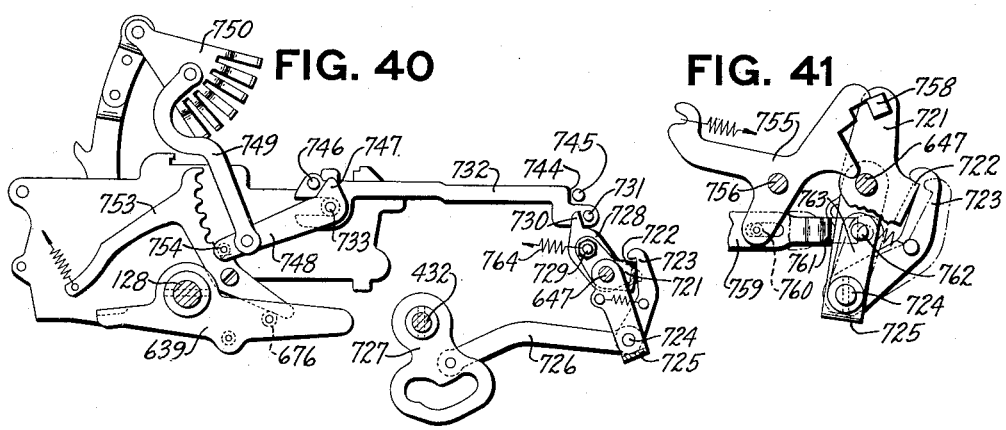
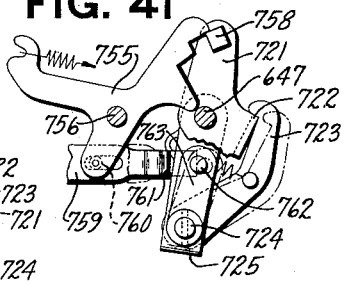
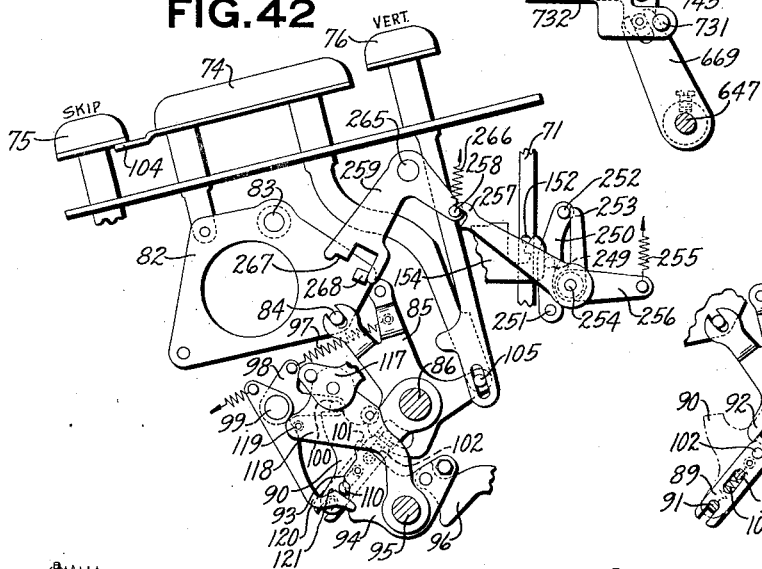
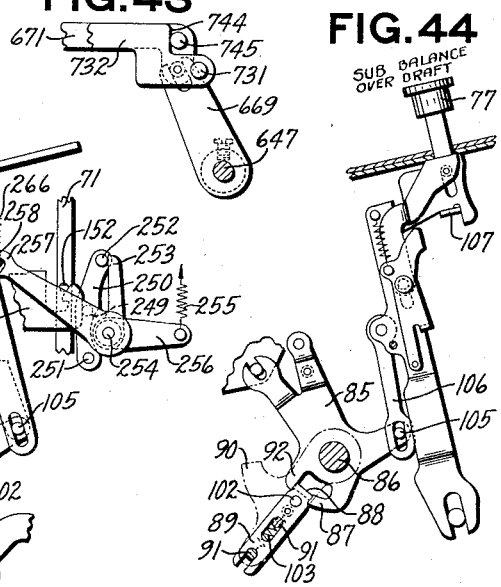
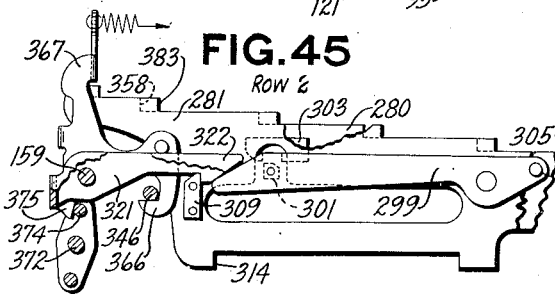
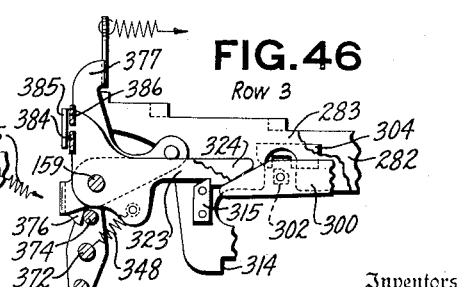
Inventors
Paul H. Williams
Jesse R. Ganger
William H. Petit and
John T. Davidson
By Carl Benst
Their Attorney Patented Feb. 13, 1940

2,189,851

UNITED STATES PATENT OFFICE 2,189,851

ACCOUNTING MACHINE

Paul H. Williams, Jesse R. Ganger, William H. Petit, and John T. Davidson, Dayton, Ohio, assignors to The National Cash Register Company, Dayton, Ohio, a corporation of Maryland Application October 8, 1936, Serial No. 104,650

20 Claims. (Cl. 235—60)

This invention relates to bookkeeping or accounting machines and the like, and is particularly directed to the controlling mechanisms of machines of the type illustrated and described in Letters Patent of the United States No. 1,197,278 and No. 1,203,863, issued respectively September 5, 1916 and November 7, 1916, to Halcolm Ellis, and Patent No. 1,819,084 issued August 18, 1931, to Emil John Ens.

The present invention is shown embodied in the well known Ellis type of accounting machine illustrated and described in the above patents, and in its present form is known as a Bank Service Machine, used by banking institutions for the balancing of checking accounts. However, it is not the desire to restrict or limit the use of this invention to the Ellis type of machine, as it may be easily adapted for use on various other types of machines. Neither is it the desire to limit this invention to Bank Service Machines or to any particular business system, as the flexibility of said machine and the numerous features thereof admirably adapt it for the handling of practically any accounting problems in connection with present-day business systems.

Broadly it is an object of this invention to provide a machine for use by banking establishments in the balancing of checking accounts.

Another object is to provide accounting machines with an auxiliary keyboard.

Another object is the provision of novel means for controlling the two-color inking ribbon in subtract operations.

Still another object of this invention is to supply novel means for automatically counting or accumulating single items as they are listed, said item counting means also being adapted to be manually controlled to accumulate a plurality of items at one time.

A further object is to furnish novel means to cause the machine to operate through three cycles in overdraft operations.

A still further object is to provide means to prevent unintentional repeat operations of the machine.

Another object of this invention is to supply means to permit the repeat printing of an overdraft in a distinctive color.

Still another object is the provision of means to control the two-color inking ribbon to cause repeat prints of an overdraft to be printed in a distinctive color.

Another object of this invention is to provide novel means to control the zero elimination pawls so that the keyboard may be split and certain rows of amount keys may be used as printing keys to control the recording of various data.

Still another object is the provision of novel means to cause two printings of an overdraft, for example, a sub-balance and a balance of said overdraft, to be printed in a distinctive color.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 2 is a diagrammatic plan view of the main and auxiliary keyboards of the machine of the instant invention.

Fig. 3 is a facsimile of a fragment of a statement or ledger sheet prepared on the machine of this invention.

Fig. 6 is a perspective view showing the right and left side frame assemblies, the actuators, and the mechanism that causes a repeat print of the ovedraft to be printed in a distinctive color.

Fig. 7 is a right side elevation showing the machine driving mechanism, mechanism for starting operation of the machine, and the Sub-Balance of Overdraft key mechanism.

Fig. 8 is a detail view of the mechanism that controls the splitting of the amount keyboard when the traveling carriage is tabulated to certain columnar positions.

Fig. 9 is a detail view of the date printing sectors.

Fig. 10 is a perspective view of the mechanism for causing repeat-print of the overdraft to be printed in a distinctive color.

Fig. 13 is a side elevation as observed from the right of the machine of part of the mechanism shown in Fig. 11 and the mechanism for controlling the movement of the item counting actuators.

Fig. 14 is a front view of a part of the mechanism shown in Fig. 13 for controlling the movement of the item counting actuators.

Fig. 15 is a perspective view of the arms for controlling the item counting actuators.

Fig. 16 is a detail view of a part of the mechanism shown in Fig. 13 for causing a clear signal to be printed when certain total keys are depressed.

Fig. 17 is a detail view of a part of the ribbon control mechanism.

Fig. 18 is a side view, as observed from the right of the machine, illustrating a part of the mechanism for causing a repeat-print of the overdraft to be in a distinctive color.

Fig. 19 is a side elevation as observed from the right of the machine, illustrating in particular the engaging mechanism for the #1 or balance totalizer and the means whereby a key in the auxiliary keyboard controls the color of the inking ribbon in subtract operations.

Fig. 20 is a front view, with the case removed, of the auxiliary keyboard.

Figs. 21 and 22 are respectively perspective and fragmentary detail views of one set of stop arms for positioning the corresponding auxiliary keyboard actuator commensurate with the depressed key in that particular order or group.

Fig. 23 is a detail view of the mechanism for tensioning the springs that drive the printing sectors.

Fig. 24 is a longitudinal sectional view of the machine taken along line 24—24 (Fig. 20) looking in the direction of the arrows, and shows the first row of keys in the auxiliary keyboard and its associated actuator mechanism and the first row of amount keys and its associated actuator and printing mechanisms.

Fig. 25 is a detail view of the first row of auxiliary keys shown in Fig. 24.

Fig. 26 is a sectional view, as observed from above, taken along line 26—26 (Fig. 25) illustrating the relative positions of the keys of one row.

Fig. 27 is a transverse sectional view taken along line 27—27 (Fig. 20) looking in the direction of the arrows and shows the second row of keys of the auxiliary keyboard and the releasing mechanism associated therewith.

Fig. 28 is a detail view of the keys shown in Fig. 27.

Fig. 29 is a longitudinal sectional view taken along line 29—29 (Fig. 20) looking in the direction of the arrows and illustrates one row of date keys and the mechanism for locking the keys of the auxiliary keyboard against depression or release during machine operations.

Fig. 30 is a detail view of a part of the mechanism shown in Fig. 29.

Fig. 31 is a sectional view taken along line 31—31 (Fig. 20) and shows the mechanism for manually releasing the date keys.

Fig. 32 is a perspective view of the control plates and detents for one group of keys of the auxiliary keyboard.

Fig. 33 is a longitudinal sectional view of the machine, illustrating one row of item counting keys and the actuator mechanism therefor.

Fig. 34 is a detail view of the row of keys shown in Fig. 33.

Fig. 40 is a detail view of the mechanism for positioning the signal printing sector in overdraft repeat-printing operations.

Fig. 41 is a detail view of a part of the overdraft repeat-printing mechanism.

Fig. 42 is a detail view of the machine starting mechanism and the non-repeat mechanism.

Fig. 43 is a detail view of a part of the ribbon shifting mechanism.

Fig. 44 is a detail view of the Sub-Balance of Overdraft key mechanism.

Fig. 45 is a detail view of the latch mechanism for the auxiliary actuator for the second row of item counting keys.

Fig. 46 is a detail view of the latch mechanism for the auxiliary actuator for the third row of item counting keys.

GENERAL DESCRIPTION

Figure 1:
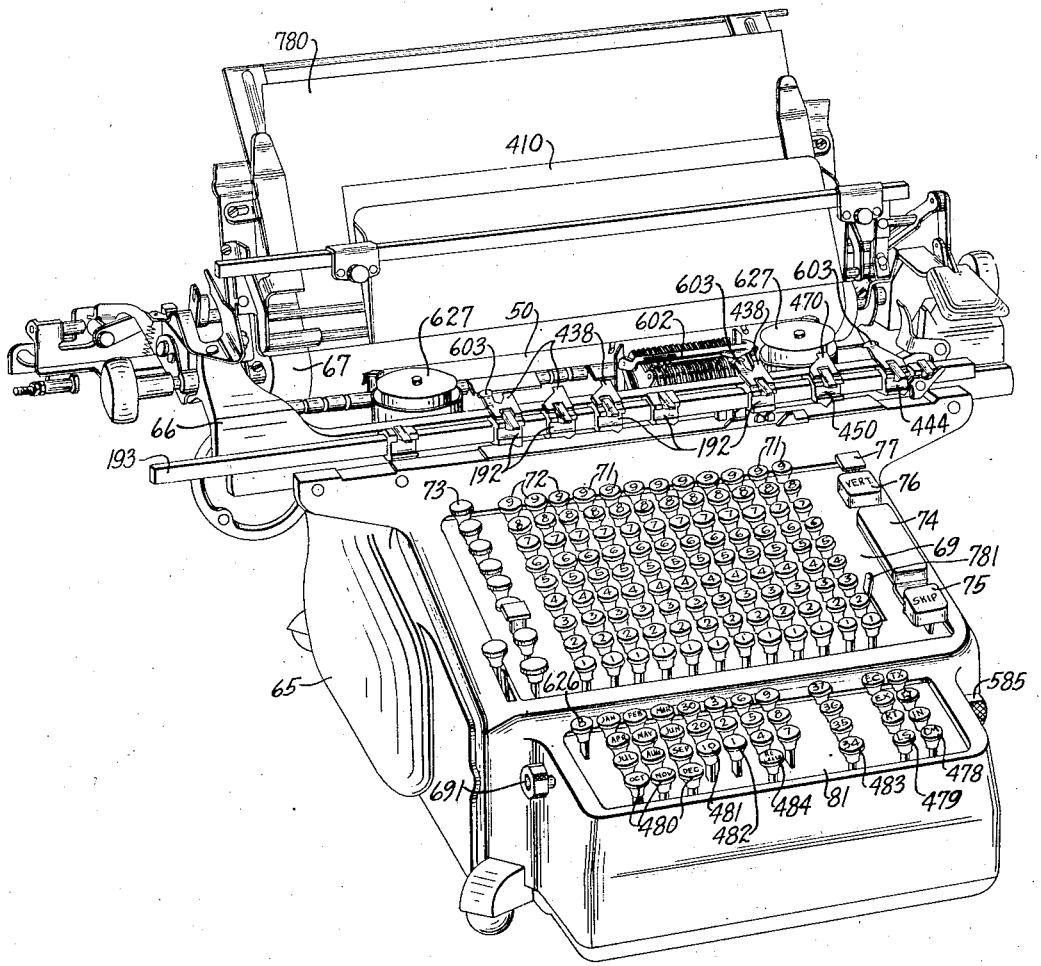
Fig. 1 is a perspective view of the complete machine.

The machine embodying the instant invention is equipped with a traveling carriage, similar in appearance to those used on typewriters, adapted to be automatically or manually tabulated from one column to the next to present to the type carriers different portions of the record material carried by a platen mounted on the carriage. When the traveling carriage reaches the terminus of its tabulated movement it is automatically returned to starting position and in addition may be manually returned to starting position at any time.

The machine is operated by an electric motor of conventional design and this motor is set in motion and clutched to the machine operating mechanism by means of any one of three starting bars conveniently located on the right-hand side of the keyboard. In addition to setting the machine in motion, one of the starting bars, when retained depressed by the operator, causes the traveling carriage to be returned to a predetermined columnar position. This starting bar also causes the traveling carriage to automatically tabulate from one column to the next. The second starting bar causes the platen roll to be rotated to line-space record material carried thereby and prevents automatic tabulation of the traveling carriage. The third starting bar causes the traveling carriage to be skip-tabulated through one or more intervening columnar positions to predetermined columnar positions.

The machine of this invention has a Balance or add-subtract totalizer and three adding totalizers arranged in vertical pairs at the rear of the machine, as shown in the United States patent to Ens, No. 1,819,084. The Balance totalizer is selected for addition and subtraction and the adding totalizers are selected for addition by means of control elements, located in columnar positions on the traveling carriage, in cooperation with hanging bar levers. In this illustration of the invention, only the Balance totalizer and one adding totalizer are shown. Other functions of the machine, including non-add, sub-total and total operations, are controlled by means of a row of control keys located on the extreme left of the keyboard.

The present machine has a plurality of denominational rows of amount keys which keys when depressed control the positioning of their corresponding actuators commensurate with the value of the key, and the actuators in turn position their respective printing sectors and the corresponding wheels of the selected totalizer or totalizers in proportion thereto. In sub-total and total recording operations, the wheels of the selected totalizer position the amount actuators and the printing sectors to the amount standing on said wheels as they are returned to zero position. In total recording operations, the wheels of the selected totalizer are disengaged from the amount actuators while said wheels are in zero position, to leave the totalizer in a cleared condition and in sub-total operations the wheels of the selected totalizer remain in engagement with the amount actuators and are returned thereby to their original positions. In subtract operations, the wheels of the balance totalizer are reversely rotated by the amount actuators to subtract therefrom the amount set up on the amount keys.

Adding, subtracting, sub-total and total operations consist of one cycle of movement of the operating mechanism while overdraft operations, in which the complementary amount of an overdraft is transposed to a true negative balance and this true negative balance recorded upon the record material, consists of three cycles of movement of the operating mechanism. An overdraft operation is initiated by depressing a Sub-Balance of Overdraft key conveniently located on the right-hand side of the keyboard. In overdraft operations the two-color inking ribbon is automatically lifted to a position where the sub-balance of an overdraft will be printed in a distinctive color. However, prior to the succeeding operation the inking ribbon is automatically returned to normal printing position. Ordinarily it is desirable to print a sub-total of the overdraft upon the main portion of a record sheet and a total of the overdraft upon the stub of said record sheet, and as it is desirable that both printings of the overdraft be in a distinctive color, mechanism has been provided for causing a repeat-print of the overdraft to also be in a distinctive color. During the first printing of the overdraft, in a sub-balance of an overdraft operation, the repeat printing mechanism is rendered effective and creates a condition whereby a subsequent selection of the balance totalizer for a total or balance operation will cause the inking ribbon to be lifted to a position whereby the second printing of the overdraft will be in a distinctive color. As previously stated, after the first printing of the overdraft, the ribbon is returned to normal printing position and in intervening operations between the first and second printing of the overdraft, the ribbon mechanism will function in a normal manner to record items in their proper color. After the second printing of the overdraft, the repeat-printing mechanism is restored to ineffective position.

Normally the starting mechanism is automatically restored to normal position at the end of each cycle of operation. However, in overdraft operations, depressing the Sub-Balance of Overdraft key renders mechanism effective that retains the starting mechanism effective until the machine has completed three cycles of movement, after which the starting mechanism is automatically restored to normal position. Novel mechanism is provided for preventing unintentional repeat operations of the machine in case any of the starting bars or any of the keys that initiate machine operation are inadvertently retained depressed at the end of machine operation.

An item-counting device is provided for automatically counting or accumulating each subtractive item as it is entered in the machine, and the item-counting device is also provided with a plurality of rows of keys, similar to the amount keys, for manually controlling the entering and accumulating of the total number of a plurality of items, while the total amount of said items is simultaneously subtracted from the balance totalizer.

In the present arrangement the item-counting device functions only in subtract operations and, as the wheels of the item-counting device are mounted upon the same shaft as the wheels of the balance totalizer and are consequently engaged with and disengaged from their actuators in subtract time, it is necessary to subtract the complement of the item or items being accumulated from the wheels of the item-counting device in order to positively enter said amounts therein. The printing mechanism for the item-counting device is rendered inoperative while the items are being accumulated to prevent the complement of said items from being recorded. However, in the final balancing operation, when the balance totalizer is cleared, the item-counting device is also cleared and the total number of items simultaneously recorded in the proper column of the record sheet.

The present machine is equipped with an auxiliary keyboard located directly in front of the regular keyboard. The auxiliary keyboard comprises a plurality of date keys, a plurality of symbol keys, a Black key for controlling the inking ribbon in subtract operations, and a release key for releasing the depressed date keys which are not automatically released at the end of machine operations. The date keys control the positioning of type carriers which record the date upon the record material. Likewise, the symbol keys control the positioning of a type carrier which records a symbol characteristic of the type of operation being performed. Ordinarily, subtractive items are printed in a distinctive color, for example, red; however, in some cases it is desirable to print subtractive items in black, and this is assomplished by depressing the Black key which causes the bichrome inking ribbon to be raised to a position where subtractive items will be printed in black. The Black key and the symbol keys are automatically released at the end of each machine operation and may be manually released by means of the regular release key for the main keyboard. Manually operated means is provided for retaining the Black key and the symbol keys in depressed position for any number of machine operations.

When the machine is at rest, the date type carriers are retained in a neutral position and before these type carriers can move out of this neutral position it is necessary that one or more of the amount actuators be released from zero position either by the depression of an amount key or by the conditioning of the machine for a total or sub-total operation. The date type carriers are also locked against printing movement until the traveling carriage is tabulated to a date column.

When the traveling carriage is tabulated to certain columnar positions, mechanism is actuated to rock the zero elimination pawls or order hooks for certain amount banks to ineffective positions to split the amount keyboard so that several groups of amount keys may be used simultaneously for listing several items. When the amount keyboard is split in this manner, the amount keys are used only as listing keys and do not enter amounts in the totalizers.

This machine is also provided with mechanism to print a distinguishing signal when certain totalizers are cleared.

Detailed Description

Framework

Figure 4:
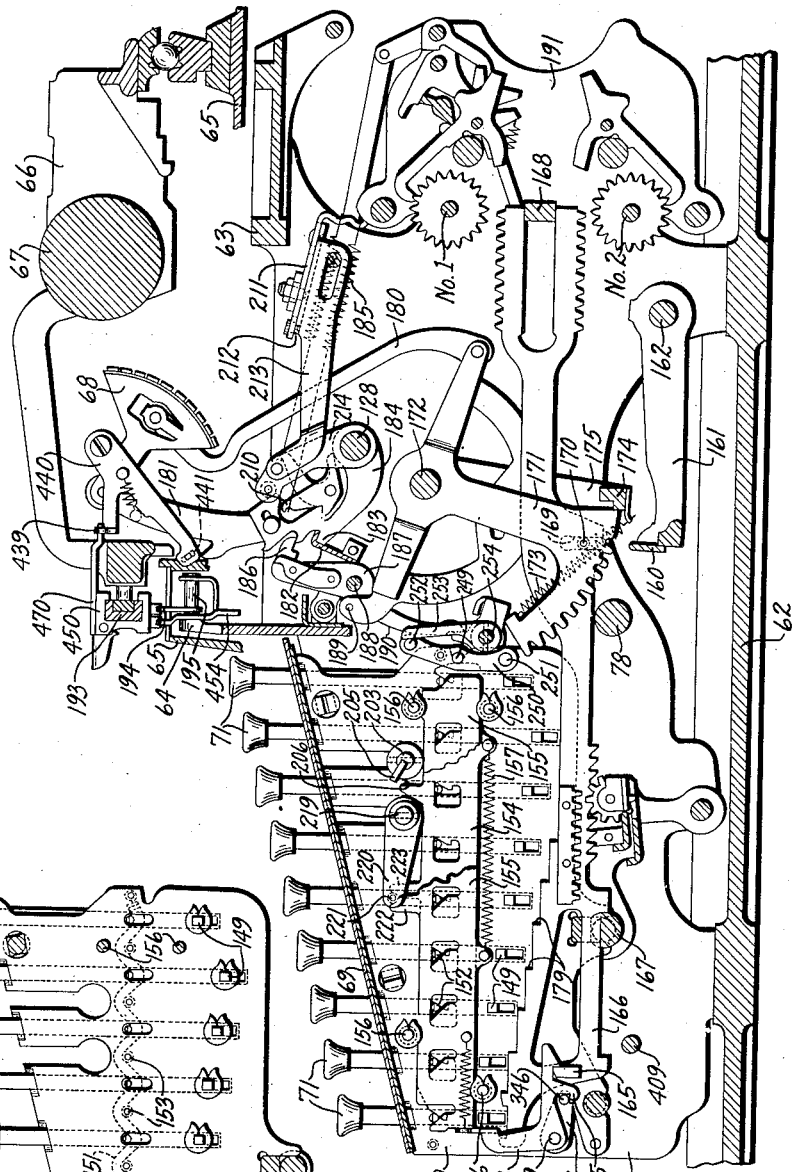
Fig. 4 is a longitudinal sectional view taken just to the right of one of the amount banks, illustrating the manner in which the actuator is controlled by the amount keys and how the actuator in turn controls the printing sector and positions the totalizer wheel.
Figure 11:
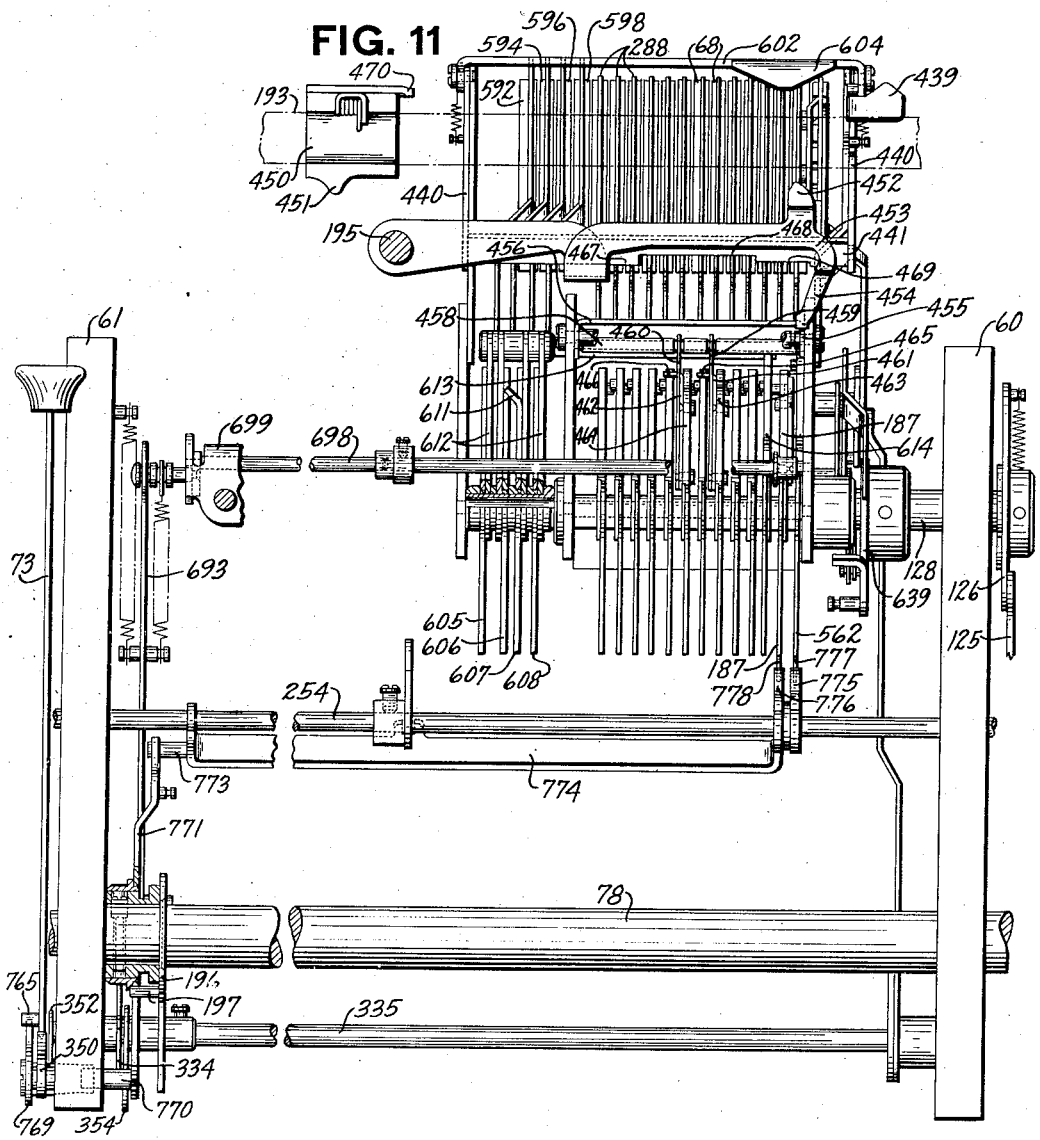
Fig. 11 is a front elevation showing in particular the mechanism for splitting the amount keyboard and the mechanism for causing a clear signal to be printed when certain total keys are depressed.

Referring to Figs. 4, 6 and 11, the mechanism of the machine embodying this invention is supported by a right frame 60 and a left frame 61 mounted on a machine base 62 and rigidly maintained in proper relation to each other by means of cross frames 63 and 64 and various other cross frames, rods and shafts. The mechanism of the machine is enclosed in a suitable case or cabinet 65 (Figs. 1 and 2), which is secured to the machine base 62. A traveling carriage 66, similar to that used on typewriters, is supported for lateral movement by means of ways thereon, in cooperation with corresponding ways mounted upon the top of the case 65 (Fig. 4). The traveling carriage 66 rotatably supports a platen roll 67 which presents record material to an inking ribbon 50 and a plurality of amount type sectors 68 (Figs. 4 and 11) and various other type sectors later to be described.

Keyboard and operating mechanism

The framework of the main keyboard of the instant machine comprises a top plate 69 (Fig. 4), a right and left end plate (not shown), and a partition plate 70 for each row of amount keys. The top plate 69 is secured to the frames 60 and 61 to maintain the keyboard framework in place. The keys of the main keyboard include a plurality of rows of amount keys 71 (Figs. 1 and 2), three rows of item-counting keys 72, a row of control keys 73, a starting bar 74, a Skip tabulating starting bar 75, a Vertical feed starting bar 76, and a Sub-Balance of Overdraft key 77. Depressing any one of the starting bars 74, 75 or 76 causes a mainshaft 78 (Figs. 4 and 7) journaled in the frames 60 and 61, to be operated through one cycle of movement, which is the proper movement for operating the machine in non-adding, adding, subtracting, sub-total and total operations.

Depressing the Sub-Balance of Overdraft key 77 causes the main shaft 78 to operate through three cycles of movement to effect an overdraft operation. Secured on the right-hand end of the main shaft 78 is an arm 79 connected by a link 80 to a crank 51 secured on a shaft 52 journalled in the motor frame (not shown). Also secured on the shaft 52 is the driven member of a clutch device (not shown) the driving member of which is operatively connected to an electric motor of conventional design but preferably one of the character illustrated and described in Letters Patent of the United States #1,601,102, issued September 28, 1926, to F. W. Bernau.

In order to increase the capacity of the main keyboard, the present machine has been equipped with an auxiliary keyboard 81 (Fig. 2) located directly in front of the main keyboard. The auxiliary keyboard supports a plurality of date printing keys, a plurality of symbol printing keys, and a key for controlling the color of the bichrome ribbon in subtract operations. The auxiliary keyboard is mounted upon extensions of the base 62 (Fig. 20) and is enclosed by the cabinet 65. The auxiliary keyboard will be described in detail later in this specification.

Depressing the starting bar 74 (Figs. 42 and 44) rocks a lever 82 counter-clockwise on its pivot 83 which, by means of a stud 84 in said lever, in cooperation with a bifurcated extension of a lever 85, loose on a shaft 86 journaled in the right frame 60 and a support plate (not shown) rocks said lever 85 clockwise. The lever 85 has a hook-shaped extension 87 and a finger 92, which embrace a bent-over extension 88 of a slide 89, shiftably mounted upon an arm 90, loose on the shaft 86, by means of horizontal slots in said slide 89 in cooperation with studs 91 in said arm 90. Thus the lever 85 moves the slide 89 and the arm 90 clockwise in unison therewith to move a stud 110 carried by said arm 90 out of engagement with a shoulder 93 of a release arm 94 loose on a stud 95 secured in the frame 60. The arm 94, upon being released, is rocked counter-clockwise by a spring (not shown), which by means of a link 96, one end of which is connected to said arm 94 and the other end being bifurcated to embrace a stud 111 (Fig. 7) in the frame 60 closes the switch for the operating motor and engages the clutch mechanism to cause the shaft 52 and the crank 51 to make one revolution to operate the main shaft 78 through one cycle of movement.

During counter-clockwise rotation of the crank 51 (Fig. 7), a camming surface 53 thereon, in cooperation with a roller 54 carried by a lever 55 fulcrumed on a stationary stud 56, rocks said lever 55 clockwise against the action of a spring 57. This, by means of a slot in the upper end of said lever 55 in cooperation with a stud 58 carried by the link 96, shifts said link rearwardly to return the arm 94 clockwise to move the shoulder 93 beyond the stud 110. This causes a spring 97 (Fig. 42), tensioned between the lever 85 and a bell crank 98 fulcrumed on a stationary stud 99, to return said lever 85 counter-clockwise to restore the starting bar to undepressed position and by means of a stud 100 in said bell crank 98 in cooperation with an extension of the arm 90, to return said arm 90 counter-clockwise in unison with the lever 85. Counter-clockwise return movement of the lever 85 causes the stud 110 to reengage the shoulder 93 to retain the arm 94 and the link 96 in untripped position after the mechanism which restores these parts moves out of cooperative engagement therewith. Clockwise movement of the lever 55 under influence of the camming surface 53 also sets up a condition which causes the clutch mechanism to be disengaged and the motor switch opened after one cycle of movement has been completed.

In case any of the starting bars or keys that set the machine in motion, are unintentionally retained depressed, restoration of the arm 94 causes a projection 101 thereof to engage a stud 102 in the slide 89 (Figs. 42 and 44) to shift said slide upwardly against the action of a spring 103 to move the bent-over ear 88 out of engagement with the hook 87 and into a clearance slot formed by said hook and the finger 92. This permits the spring 97 and the bell crank 98 to return the arm 90 independently of the lever 85 to cause the stud 110 to engage the shoulder 93 to retain the arm 94 in untripped position to prevent a repeat operation of the machine.

An extension 104 (Figs. 7 and 42) of the plate that supports the starting bar 74 underlies the Skip-tabulating starting bar 75. Consequently, depression of the bar 75 also depresses the starting bar 74 to set the machine in motion and in addition causes the traveling carriage 66 (Fig. 1) to be skip-tabulated to predetermined columnar positions. The Vertical feed starting bar 76 has a slot in the lower end of the stem thereof which cooperates with a stud 105 in an extension of the lever 85. Therefore, depression of the starting bar 76 rocks the lever 85 clockwise to set the machine in motion in the manner explained above, and in addition causes the platen roll 67 (Fig. 1) to be rotated to line-space the record material carried thereby.

Sub-balance of overdraft key

Directing attention of Figs. 7 and 44, depressing the Sub-Balance of Overdraft key 77 by means of a link 106, the upper end of which is pivotally connected to said Sub-Balance of Overdraft key and the lower end of which is slotted to embrace the stud 105 in the lever 85, rocks said lever 85 clockwise to set the machine in motion, in exactly the same manner as depressing one of the starting bars.

Depressing the key 77 causes the machine starting mechanism to be locked against restoration until the machine has operated through the three cycles necessary to effect an overdraft operation. This is accomplished in the following manner:

Depressing the Sub-Balance of Overdraft key 77 (Figs. 7 and 44) moves a bent-over ear 107 on the stem thereof beyond the shoulder 108 on a latch 109 loose on a stud 115 in the main frame 60. A spring 116, one end of which is connected to a link 117, connecting the latch 109 to a latch releasing lever 118 pivoted on the stud 95, urges said lever 118 and the latch 109 clockwise to move the shoulder 108 into the path of the ear 107 to latch the Sub-Balance of Overdraft key 77 in depressed position. Clockwise movement of the lever 118 withdraws a stud 119 (Fig. 42) therein from a raised surface of a pawl 120 rotatable on the stud 99, and permits said pawl to be spring-urged counter-clockwise to move a surface 121 thereof into the path of the stud 110 to hold said stud 110 out of the path of the shoulder 93 upon restoration of the starting mechanism at the end of one cycle of operation, as explained earlier herein. This causes the machine to operate through three cycles without interruption to perform a sub-balance of overdraft operation.

A cam 122 (Fig. 7) loose on the stud 86 makes one counter-clockwise revolution in overdraft operations and in the third cycle of said operation it engages a roller 123 mounted on the lever 118 and rocks said lever and the latch 109 counter-clockwise to disengage the shoulder 108 from the ear 107 to permit the Sub-Balance of Overdraft key 77 to be spring-returned upwardly to undepressed position. When the lobe of the cam 122 moves beyond the roller 123 the spring 116 returns the lever 118 and the latch 109 clockwise until a flat surface on said latch, adjacent the shoulder 108, contacts the edge of the ear 107. This positions the pawl 120, as shown in Fig. 42 so that the surface 121 is maintained out of the path of the stud 110.

Figure 35:
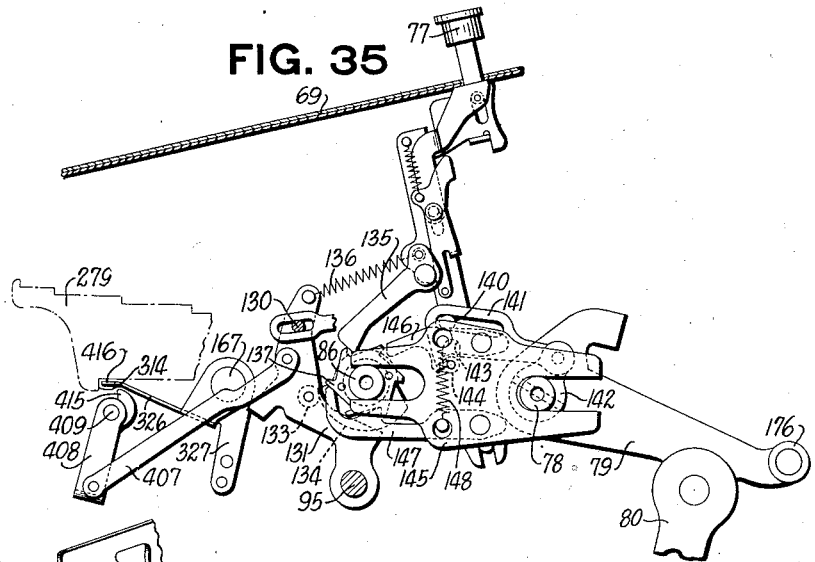
Fig. 35 is a detail view, showing in particular, the mechanism controlled by the Sub-Balance of Overdraft key for locking the item counting actuators in zero position.

In the first two cycles of a sub-balance of overdraft operation, the complementary amount of the overdraft is transposed to a true negative balance and during the third cycle of a sub-balance of overdraft operation the balance totalizer is operated in a sub-total operation and the true negative balance is printed upon record material carried by the platen roll. In order to prevent erroneous entries by the printing mechanism during the first two or transposing cycles of a sub-balance of overdraft operation, the printing mechanism is rendered inoperative in the following manner:

Referring to Figs. 7 and 35, the machine operating arm 79 carries a stud 124, which normally engages a notch in a link 125, the upper end of which is pivotally connected to an arm 126 flexibly connected to another arm 127 secured on a printer shaft 128, opposite ends of which are journaled in the right frame 60 and in the framework of the printer mechanism. Oscillation of the arm 79, in the manner explained previously, by means of the link 125 oscillates the printer shaft 128 first clockwise and back to normal position to cause the printing mechanism to function. One end of a link 129 is pivotally connected to the link 125 while the other end of said link is slotted to embrace a stud 130 in a lever 131 pivoted on the stud 95. A spring 132, tensioned between the stud 130 and the link 129, urges the link 125 clockwise to normally maintain the notch therein in engagement with the stud 124 in the arm 79. The spring 132 also urges the lever 131 clockwise to normally maintain a roller 133 carried thereby in engagement with the periphery of a plate cam 134 integral with the cam 122, which, it will be recalled, is rotatably mounted on the stud 86.

Loosely mounted on the stem of the Sub-Balance of Overdraft key 77 (Fig. 35) is a pawl 135 urged counter-clockwise by a spring 136 into engagement with the teeth of a ratchet 137 integral with the cams 122 and 134. Depressing the Sub-Balance of Overdraft key 77 causes the pawl 135 in cooperation with the teeth of the ratchet 137 to rotate said ratchet and the cam 134 a slight preliminary distance counter-clockwise to move the high portion of the periphery of said cam out of engagement with the roller 133 to release the lever 131 to the action of a spring 136, which moves said lever clockwise until the roller 133 engages the low surface of the periphery of the cam 134. Clockwise movement of the lever 131, by means of the link 129, shifts the link 125 (Fig. 7) counter-clockwise to disengage said link from the stud 124 and to engage a notch 138 in said link with a stationary stud 139 in the right frame 60. In the course of a sub-balance of overdraft operation and in a manner presently to be described, the cam 134 receives one counter-clockwise rotation to return the lever 131 counter-clockwise near the end of the second cycle of said sub-balance of overdraft operation to reengage the link 125 with the stud 124 so that the printer mechanism will function in the third cycle of said sub-balance of overdraft operation to print the true negative balance.

The ratchet 137 (Fig. 35) and the cams 122 and 134 are driven one counter-clockwise revolution in sub-balance of overdraft operations in the following manner: Depressing the Sub-Balance of Overdraft key 77 causes a stud 140 in the stem thereof, in cooperation with a slot in a latch 141 pivotally connected to a crank 142 secured on the shaft 78, to engage a notch 143 in said latch with a stud 144 in a slide 145, reciprocably mounted by means of horizontal slots therein in cooperation with the main shaft 78 and the stud 86.

Initial movement counter-clockwise of the main shaft 78 moves the slide 145 forwardly or toward the left, as viewed in Fig. 35, to cause a pawl 146 carried thereby to engage one of the teeth of the ratchet 137 to rotate said ratchet and the cams assembled thereto to complete the first step of movement, which consists of one-sixth of a revolution in a counter-clockwise direction. Return movement rearwardly of the slide 145 upon return movement clockwise of the main shaft 78 causes another pawl 147 carried thereby to engage one of the teeth of the ratchet 137 to rotate said ratchet and the cams assembled thereto another sixth of a revolution in a counter-clockwise direction. A spring 148 stretched between the pawls 146 and 147 urges said pawls toward each other to maintain the teeth of said pawls in communication with the ratchet 137.

Inasmuch as the main shaft 78 makes three cycles of movement in a sub-balance of overdraft operation, the slide 145 will be reciprocated back and forth three times, which due to the push-pull action of the pawls 146 and 147 will rotate the ratchet 137 and the cams assembled thereto one complete counter-clockwise revolution. Restoration of the Sub-Balance of Overdraft key 77 to undepressed position at the end of subbalance of overdraft operation disengages the notch 143 in the latch 141, from the stud 144. It is therefore obvious that the slide 144 and associated mechanism function only in sub-balance of overdraft operations.

As previously stated, in the third cycle of a sub-balance of overdraft operation, the balance totalizer performs a sub-total operation, and a sub-total of the true negative balance is printed upon the record material. Mechanism is rendered effective in the last cycle of a sub-balance of overdraft operation to cause the inking ribbon to be lifted to a position where the true negative balance will be printed in a distinguishing color, such as red, and near the end of the sub-balance of overdraft operation the ribbon mechanism is restored to normal printing position.

The present machine also embodies mechanism that causes a repeat-print of the overdraft to be in a distinguishing color, and this is accomplished by setting up a condition in a sub-balance of overdraft operation whereby the next time the balance totalizer is selected for either a sub-balance or balance operation the inking ribbon will be lifted to its red printing position. This overdraft repeat-printing mechanism will be fully explained later.

Amount keys

The machine embodying the instant invention has nine denominational rows of amount keys and inasmuch as the mechanism for each of the nine rows of amount keys is substantially alike, it is believed that the description of one of the amount banks and its associated mechanism will be sufficient for the purpose of this specification. The row of amount keys illustrated in Fig. 4 and their associated mechanism will now be described in detail.

Figure 5:
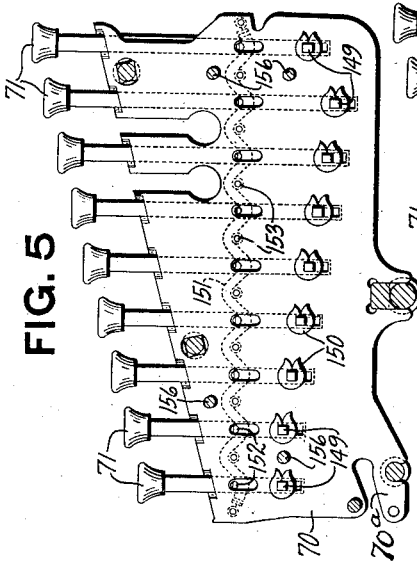
Fig. 5 is a detail view showing the manner in which the amount keys are assembled to their respective partition plates.

Referring to Figs. 2, 4 and 5, the upper ends of the stems of the amount keys 71 extend through openings in the keyboard plate 69, and each of said amount keys carries a stud 149, which extends through a vertical slot in the partition plate 70, for the particular amount banks shown in Figs. 4 and 5. Spring clips 150 (Fig. 5), in cooperation with annular grooves in the studs 149, retain said studs in the vertical slots in the plate 70. A coil spring 151 laced around studs 152 in the key stem and studs 153 in the plate 70, returns the amount keys 71 upwardly to undepressed position when they are released, after having been depressed. Associated with each amount bank is a detent plate 154 (Fig. 4) and a control plate 155, mounted to slide horizontally on the plate 70 by means of four rollers on four studs 156, secured in said plate 70.

Depressing an amount key causes the pin 152 therein, in cooperation with its corresponding hook-shaped projection formed in apertures in the locking plate 154, to shift said plate rearwardly or toward the right, as here viewed, against the tension of a spring 157, opposite ends of which are connected to the plates 154 and 155. When the pin 152 passes beyond the hook-shaped projection, the spring 157 returns the plate 154 forwardly to cause the hook to latch over the flat-topped surface of the pin 152 to obstruct upward movement of the depressed key 71 under influence of the spring 151, and to lock said key in depressed position. Likewise depressing an amount key causes the pin 152, in cooperation with its corresponding angular opening in the control plate 153, to shift said plate forwardly against the action of the spring 157 to rock a zero latch 158 counter-clockwise on its supporting shaft 159, mounted in the keyboard framework, to disengage the hook of said zero latch from a lug 165 on an amount actuator rack 166 for this particular amount bank. The actuator 166 is mounted for horizontal reciprocating movement by means of a slotted rod 167, supported by the frames 60 and 61, in cooperation with a notched portion of the front end of said actuator, and by means of a bar 168 extending between the frames 60 and 61, in cooperation with the slotted end of the actuator 166.

The actuator 166 has a vertical slot 169 therein, which engages a stud 170 in a downward extension of a reducer segment 171 rotatably mounted on a shaft 172 journaled in the frames 60 and 61. A spring 173 stretched between the segment 171 and a bail 174 of a leading frame, normally maintains a portion of said segment 171 in contact with the bail 174. The bail 174 extends between two similar arms 175, only one here shown, which straddle all the reducer segments and which are secured on the shaft 172. The main operating shaft 78 (Figs. 6 and 7) is operatively connected to the leading frame shaft 172 by a roller 176 carried by the arm 79, in cooperation with a camming slot 177 in an arm 178 secured to the shaft 172. It is therefore apparent that oscillating movement of the main shaft 78 rocks the leading frame shaft 172 first counter-clockwise and then back to normal position.

When the machine is operated without an amount key being depressed in this particular amount bank, the zero latch 158 (Fig. 4) retains the actuator 166 in zero position, as here shown, and oscillating movement of the leading frame bail 174 stretches the spring 173 without imparting any movement to the segment 171. Depressing an amount key rocks the zero latch 158 to ineffective position and moves the stud 149 in said amount key into the path of the corresponding one of a series of graduated steps 179 cut in the top surface of the actuator 166. Upon operation of the machine, initial movement clockwise of the leading frame bail 174, by means of the spring 173, carries the reducer segment 171 and the actuator 166 in unison therewith until the corresponding step 179 engages the stud 149 of the depressed amount key. This differentially positions the actuator 166 and the segment 171 in proportion to the value of the depressed amount key, and the spring 173 permits the leading frame bail 174 to complete its initial movement counter-clockwise, independently of the segment 171 and the actuator 166. A link 180 connects an arm of the segment 171 to the type sector 68 for this particular amount bank, and consequently transmits the differential positioning of said segment 171 to said type sector 68. The sector 68 is pivotally connected to an arm 181 rotatably mounted on the printer shaft 128.

After the type sector 68 has been positioned and the leading frame 174 has completed its initial movement counter-clockwise, an aliner bar 160 is rocked into engagement with one of a series of tooth spaces in the segment 171 to aline said segment and the printing sector in set positions. The aliner 160 extends between similar arms 161 (only one here shown) secured to an aliner shaft 162 journaled in the frames 60 and 61. Initial movement counter-clockwise of the arm 79 (Fig. 7) causes the roller 176, in cooperation with a camming groove 163 in an arm 164 connected to the shaft 162, to rock said arm and said shaft clockwise to engage the aliner bar 160 with the segment 171. After printing is completed and prior to return movement of the leading frame bail 174, return movement of the arm 79 disengages the aliner from the segment 171. Immediately after the aliner 160 is engaged with the segment 171 a printer release trigger 182 (Fig. 4) is rocked counterclockwise out of engagement with a tooth 183 of a plate 184, connected to the arm 181, to release said arm to the action of a spring 185, to cause the type sector 68 to make an impression stroke to imprint the value of the depressed key upon the record material carried by the platen roll 67.

One end of the spring 185 is connected to a pawl 210 pivoted on the arm 181 and having a tooth that engages a similar tooth on the plate 184. The other end of the spring 185 is connected to a bent-over extension of an adjustable plate 211 (Figs. 4 and 23) slidably mounted on the bail of a yoke 212 having arms 213 connected respectively to similar arms 214 secured on the printer shaft 128. The rearward ends of the arms 213 have similar slots that slide on studs in the printer side plates. An eccentric adjustment between the plate 211 and the bail of the yoke 212 provides a means of securing the desired tension of the springs 185. Initial movement clockwise of the shaft 128 and the arms 214, shifts the yoke 212 rearwardly to increase the tension of the springs 185 prior to printing movement of the sectors 68 to insure a good impression. The plate 211 and a similar plate, also adjustably mounted on the bail of the yoke 212, provide a means for anchoring and adjusting the springs 185 for all the printing sectors.

When no amount key is depressed a tooth 186 (Fig. 4) of a zero elimination pawl or order hook 187, pivoted on a shaft 188 supported by the printer framework, in cooperation with a corresponding tooth in the plate 184, retains said plate, the arm 181 and the printing sector 68 against printing movement when the trigger 182 is released in the manner explained above. However, when a key is depressed, movement of the actuator 166 and the segment 171 away from zero positions causes a stud 189 in an extension of said segment 171, in cooperation with an arcuate surface 190 on an extending tail of the zero elimination pawl 187, to rock the tooth 186 of said pawl out of engagement with the tooth in the plate 184 to permit the type sector 68 to make a printing stroke.

Totalizers and selection thereof

The right-hand end of the actuator 166 has two sets of rack teeth adapted to cooperate with corresponding wheels of a #1 or balance totalizer and a #2 or adding totalizer, mounted in a totalizer framework 191 secured to the frames 60 and 61. While only two totalizers are here shown, it is but a matter of assembly to add additional totalizers by connecting them to the framework 191.

The totalizers are selected and the machine is conditioned for adding and subtracting operations by means of control elements 192 (Figs. 4 and 14), mounted on a bar 193 secured to the traveling carriage 66, in cooperation with hanging bar levers similar to a subtract hanging bar lever 194 mounted on a stud 195 secured in the cross frame 64. In adding operations, after the leading frame bail 174 has completed its initial movement counter-clockwise and the actuator 166 and the segment 171 have been differentially positioned, the corresponding wheel of the selected totalizer is engaged with the teeth of said rack and return movement forwardly or clockwise of the bail 174 picks up the segment 171 and returns it and the actuator 166 to zero position to rotate the wheel of the selected totalizer a corresponding distance to accumulate therein the amount set up on the amount keys. In subtract operations, the wheel of the selected totalizer is engaged with the actuator 166 prior to its initial movement rearwardly and is consequently rotated in a reverse direction to subtract therefrom the amount set up on the keyboard. Depressing the "Non-Add" key 73 (Fig. 1) conditions the machine for a non-adding operation in which the amount set up on the key-board is merely printed and not entered in any of the totalizers.

In addition to the subtract hanging bar lever 194, the balance totalizer may be selected for a subtract operation by means of the "Subtract" key 73. The different totalizers are selected and the machine is conditioned for total and sub-total operations by means of the "Total" and "Sub-Total" and the "Balance" and "Sub-Balance" control keys 73. The #1 or balance totalizer has the well known dual transfer mechanism for transferring amounts from lower to higher denominations. The transfer mechanism is shifted from adding to subtracting position depending upon the type of operation being performed. The #2 or adding totalizer has a single transfer mechanism for transferring amounts from lower to higher denominations.

In the beginning of sub-total and total operations the control plate 155 (Fig. 4) is shifted forwardly in a manner presently to be described, to move the zero latch 158 to ineffective position so that the actuator 166 is free to move upon oscillation of the leading frame bail 174. Prior to initial movement rearwardly of the actuator 166 the wheel of the selected totalizer is engaged therewith whereupon initial movement of said actuator, under influence of the shaft 172 and the leading frame bail 174, reversely rotates the wheel of the selected totalizer until said wheel is stopped in zero position by means of the tooth on a tripping cam integral therewith coming in contact with its associated add transfer pawl. This positions the actuator 166 and the type sector 68 commensurate with the amount on the totalizer wheel so that this amount may be recorded when the printing sector 68 makes its printing stroke. It will be noted that the contour of the camming slot 177 in the arm 178 (Fig. 7) permits the shaft 172 and the leading frame to dwell for an appreciable time at the terminus of their movement in either direction. In total operations, during the dwell of the leading frame after its initial movement counter-clockwise, the wheel of the selected totalizer is disengaged from the actuator 166 and as said wheel is standing at zero, the totalizer remains in a cleared condition.

In sub-total operations, the wheel of the selected totalizer remains engaged with the actuator 166 during its return movement forwardly and is consequently returned to its original position.

The details of this totalizer engaging mechanism form no part of the instant invention and will not be further described herein. For details of this mechanism, see the patents mentioned at the beginning of this specification.

*Amount key locking mechanism*

Mechanism which cooperates with the locking plate or detent 154 (Fig. 4) locks the amount keys against depression or release during machine operations.

Referring to Figs. 4 and 29, secured on the main shaft 78 is an arm 196 with a stud 197, which cooperates with a projection 198 on a pitman 199 slidably mounted by means of a bifurcated lower end thereof in cooperation with a collar on the shaft 78, and by means of a slot in said pitman in cooperation with a stationary stud 200. The upper end of the pitman 199 cooperates with a stud 201 in an extension of an arm 202 secured on a shaft 203 journaled in the keyboard framework. A spring 204, one end of which is connected to an extension of the arm 202, urges said arm and the shaft 203 counter-clockwise to normally maintain the stud 201 in contact with the upper end of the pitman 199.

Initial movement counter-clockwise of the main shaft 78 and the arm 196 withdraws the stud 197 from the projection 198 and permits the spring 204 to move the arm 202 and the shaft 203 counter-clockwise to shift the pitman 199 downwardly. Counter-clockwise movement of the shaft 203 moves a lug 205 carried thereby in the path of a shoulder 206 on a projection of the locking detent 154 to prevent movement of said detent during machine operations. In adding, non-adding and subtracting operations, this locks the depressed amount keys against release and the undepressed amount keys against depression and in total-taking operations it locks all the amount keys against depression. Near the end of return movement clockwise of the shaft 78 and the arm 196, the pitman 199 is returned upwardly to rock the lug 205 out of the path of the shoulder 206, in which position the parts are maintained when the machine is at rest.

*Key releasing mechanism*

Mechanism is provided for automatically releasing the depressed amount keys at the end of non-adding, adding and subtracting operations, and for releasing any amount keys carelessly or inadvertently depressed, prior to a total or a sub-total operation, in the beginning of said operations. Manual means is also provided for releasing the depressed amount keys.

Calling attention to Figs. 2, 4 and 27, the "Release" key 73 has pivotally connected thereto one end of a toggle link 207, the other end of which is bifurcated to straddle a stud 208 in a bar 209 mounted for horizontal sliding movement by means of horizontal slots therein in cooperation with studs 215 and 216 in the left frame 61. Depressing the release key 73 shifts the bar 209 rearwardly, causing a stud 217 in an upward extension thereof, in cooperation with an inverted V-slot in an arm 218 secured on a shaft 219 journaled in the keyboard framework, to shift said arm and said shaft counter-clockwise. An arm 220 secured on the shaft 219 is rocked counter-clockwise in unison therewith causing a stud 221 carried by said arm, in cooperation with opposed angular surfaces on projections 222 and 223 of the control plate 155 and the locking plate 154 to shift said control plate forwardly for a purpose presently to be described and to shift said locking plate 154 rearwardly to disengage one of the hooks in said locking plate from the stud 152 in the depressed amount key. This frees the depressed key to the action of the spring 151 (Fig. 5), which immediately returns said key upwardly to undepressed position.

Pivoted on a stud 224 (Fig. 27) carried by the bar 209 is a key release pawl 225 urged clockwise by a torsion spring 226 to normally maintain the bottom surface of the hook 227 thereon in resilient engagement with a roller 228, mounted on a disc 229, secured on the main shaft 78. Initial movement counter-clockwise of the shaft 78 and the disc 229 causes the roller 228 to move beyond the hook 227, whereupon the torsion spring 226 immediately rocks the pawl 225 clockwise to move the hook into the path of said roller 228. Return movement clockwise of the shaft 78 and the disc 229 causes the roller 228 to engage the hook 227 to shift the bar 209 rearwardly to rock the shaft 219 and the arm 220 counter-clockwise to shift the locking plate 154 rearwardly to release the depressed amount keys in the manner explained above. Before the shaft 78 and the disc 229 complete their return movement clockwise, an upward projection 230 of the pawl 225 engages a stationary stud 231, which disengages the hook 227 from the roller 228 and permits return of the bar 209 and associated mechanism to normal position by the spring 157 (Fig. 4), tensioned between the plates 154 and 155.

The mechanism described above automatically releases the depressed amount keys in non-adding, adding and subtracting operations. In total and sub-total operations it is necessary that the automatic amount key releasing mechanism function in the early part of an operation, in order to release any amount keys carelessly or inadvertently depressed prior to said operations.

A latch 232 (Fig. 27) pivoted on a stud 233 in the left frame 61 in cooperation with a notch in the stem of the "Sub-Balance" key 73 is adapted to retain said key depressed. The latch 232 has pivotally connected to the lower end thereof a lever 234, urged counter-clockwise by a spring 235 against a stop collar 236 on the stud 216. A stud 237, carried by said lever 234, in cooperation with a tail on an amount key release pawl 238, pivoted at 239 to a downward extension of the bar 209, maintains a notch 240 in said pawl 238 out of engagement with a roller 241, mounted on the lower end of a lever 242 pivoted at 243 to the left frame 61. A spring 244 urges the lever 242 clockwise to normally maintain a camming surface thereon in resilient engagement with a roller 245 mounted on the disc 229.

Depressing any of the "Total" keys or the "Sub-Total", the "Balance" or the "Sub-Balance" key 73 (Fig. 2), by mechanism not here shown but well known in the art, rocks the lever 234 (Fig. 27) clockwise to retract the stud 237 from the tail of the pawl 238 to permit the torsion spring 226 to rock the notch 240 into engagement with the roller 241. Thereupon initial movement counter-clockwise of the shaft 78 and the disc 229 causes the roller 245 to engage a node 246 of the camming surface on the lever 242 to rock said lever counter-clockwise to shift the pawl 238 and the bar 209 rearwardly. Rearward movement of the bar 209 rocks the shaft 219 and the arm 220 counter-clockwise to shift the locking detent 154 rearwardly to release the depressed amount keys.

Inasmuch as no amount keys are depressed in total and sub-total operations, it is obviously necessary to move the zero latch 158 (Fig. 4) to ineffective position, so that the rack 166 will be free to be positioned by its corresponding totalizer wheel and this is accomplished in the following manner.

Counter-clockwise movement of the arm 220 also shifts the control plate 155 forwardly to rock the zero latch 158 (Fig. 4) out of engagement with the projection 165 to free the actuator 166 so that it may be positioned under control of its corresponding totalizer wheel.

After the bar 209 (Fig. 27) has moved rearwardly a sufficient amount to release the depressed amount keys and to move the zero latches to ineffective positions, a roller 247 carried by the disc 229 engages a rounded camming surface 248 on the pawl 238 and rocks said pawl clockwise to disengage the notch 240 from the roller 241 to permit the bar 209 and associated parts to be spring-returned to normal position, as here shown. When the depressed total or sub-total key is released, the lever 234 is spring-returned counter-clockwise to normal position to cause the stud 237 to engage the tail of the pawl 238 to retain said pawl in ineffective position after the shaft 78 and the disc 229 have been returned clockwise to normal position, as here shown, and the roller 247 is moved out of the path of the camming surface 248.

*Mechanism to prevent release of the machine when an amount key is partially depressed*

In order to prevent release of the machine for operation when an amount key is partially depressed, mechanism shown in Figs. 4, 33 and 42 locks the release mechanism against operation until the amount key is either fully depressed or fully released. Depressing an amount key 71 causes the stud 152 therein, in cooperation with the angular nose of a corresponding hook, to rock the locking detent 154 rearwardly until said stud 152 passes beyond said hook, whereupon the detent 154 is spring-returned forwardly to latch the hook over the stud 152 to retain said amount key depressed. A rod 249 extends across the keyboard framework, in the path of the ends of the locking plates or detents 154. The rod 249 is supported by two arms 250 and 260 secured on opposite ends of a shaft 251 journaled in the partition plates 70 and a plurality of similar partition plates 270 for the item counting keys 72 (Fig. 33).

Rearward movement of the detent 154 (Figs. 33 and 42) rocks the rod 249 and the arms 250 and 260 clockwise, causing a stud 252 in the upper end of the arm 250 in cooperation with an arm 253, secured on a shaft 254 journaled in the frames 60 and 61, to rock said arm and said shaft clockwise against the action of a spring 255, one end of which is connected to a crank 256 secured on the shaft 254. Clockwise movement of the shaft 254 retracts the finger of an arm 257, secured thereon, from a stud 258 in an extension of a starting bar locking plate 259 pivoted on a stud 265 in the frame 60. This permits a spring 266 to rock said locking plate 259 counter-clockwise to move a shoulder 267 thereon into the path of a square stud 268 secured in the lever 82 to block counter-clockwise releasing movement of said lever 82. It is therefore evident that if an amount key is retained partially depressed the shoulder 267 will be retained in the path of the stud 268 to prevent operation of the machine until the amount key is either fully depressed or fully released. Normally, a clearance notch in the end of the locking plate 259 permits counter-clockwise releasing movement of the lever 82.

*Item counting mechanism*

The machine embodying the present invention is provided with an item counting device which comprises three rows of keys 72 (Figs. 1 and 2) occupying the space generally occupied by the three higher orders of amount keys. The three rows of item counting keys control actuators which in turn control the positioning of item counting wheels mounted upon the same axle as the #1 or balance totalizer wheels. Other than being upon the same axle, the item counting wheels have no connection whatever with the balance totalizer wheels. A transfer mechanism, similar to that used in the balance totalizer, transfers amounts from lower to higher order item counting wheels. Being upon the same axle as the #1 or balance totalizer amount wheels, the item counting wheels are engaged with their respective actuators in exactly the same time as the wheels of the balance totalizer are engaged with their actuators.

In the present arrangement only debit items are counted, and naturally at this time the wheels of the item counting device are engaged with and disengaged from their actuators in subtracting time. Therefore in order to positively accumulate debit items, it is necessary to subtract the complement of said items from the item counting wheels. For example, with the three item wheels in zero position, in order to accumulate one item it is necessary to rotate the three wheels reversely nine steps to subtract the complement of one (999) therefrom, leaving said wheels standing at 001. Obviously in this case the printing sectors for the item wheels will go to nine, and if allowed to print would record an erroneous result. Therefore, in order to prevent such an erroneous recording, the item counting type carriers are allowed to print only in balance operations, at which time the wheels of the item counting device position the printing sectors. Before items can be entered in the item counting wheels by using the item counting keys, it is necessary that the traveling carriage be tabulated to a subtract column.

The item counting keys are used when it is desirable to enter more than one item at a time. For example, in banking institutions often a number of checks, for a specific purpose, are bunched and the total amount of these checks subtracted from the depositor's balance at one time. In this case the operator sets up the number of checks in the bunch on the item counting keys and enters this total amount in item counting wheels. Ordinarily, however, only one debit item is subtracted from the depositor's balance at a time, and in this case the item counting mechanism functions automatically to accumulate one each time a debit item is subtracted from the balance. Before the automatic item accumulating mechanism will function, it is necessary that the traveling carriage be tabulated to a subtract column, and that one or more of the amount keys 71 be depressed. A control key is provided for rendering the check counting device inoperative in subtract operations, in case it is desirable not to have certain items counted. The control key also causes a symbol to be printed opposite the item to indicate that said item was not counted.

As previously explained, there are three denominational rows of check or item counting keys 72 (Fig. 2). A cross sectional view of the second row of these keys is shown in Figs. 33 and 34, and mechanism which is common to all three rows of item counting keys will be explained in connection with these figures.

The upper ends of the stems of the item counting keys extend through the keyboard plate 69. Fast in the lower end of each of said key stems is a square stud 269 which protrudes through a corresponding vertical slot in one of the partition plates 270 similar to the amount partition plate 70 and forming a part of the keyboard framework. A bar 271, which is connected to the plate 270 by screws, overlies the lower ends of the stems of the keys 72 to retain the studs 269 in their respective slots. A coil spring 272 is threaded between stationary studs 273 in the plate 270 and pins 274, one of which is carried by each of the keys 72, and provides a means of returning the keys upwardly to undepressed positions. Each of the pins 274 cooperates with a corresponding camming surface in an opening in a control plate 275 and its corresponding camming surface on the nose of a hook in a locking detent 276, similar in every respect to the amount control plate 155 (Fig. 4) and the amount locking detent 154. The plate 275 and the detent 276 are mounted for horizontal sliding movement by means of rollers turnably mounted upon four studs 277 secured in the partition plate 270 and retained in place by means of spring clips assembled in annular grooves in each of the studs 277. A spring 278 stretched between the plate 275 and the detent 276 urges them rearwardly and forwardly respectively to normally maintain the camming surfaces thereon in contact with the pins 274 in the keys 72.

Depressing an item counting key 72, in any one of the three rows, causes the pin 247 in said key in cooperation with the corresponding camming surface on the control plate 275 to shift said control plate forwardly against the action of the spring 278 (Fig. 33) to move the zero latch for the main actuator for that particular row of keys to ineffective position in a manner to be fully explained later. Also upon depression of an item counting key the pin 274 in cooperation with the angular surface on the nose of the corresponding hook for that key, shifts the locking detent 276 rearwardly against the action of the spring 278 until said pin 273 moves beyond said hook, whereupon the spring 278 returns the locking detent 276 forwardly to latch the hook over the pin 274 to retain the key 72 depressed.

The right-hand end of the detent 276, as observed in Fig. 33, cooperates with the rod 249 in exactly the same manner as the amount detent 154 (Fig. 4) to prevent release of the machine when one of the item counting keys is partially depressed.

The units row or row one of the item counting keys has a main actuator 279, (Figs. 6 and 37) the tens row or row 2 (Figs. 6, 33, 38 and 45) has a main actuator 280 and an auxiliary actuator 281, and the hundreds row or row 3 (Figs. 6, 39 and 46) has a main actuator 282 and an associated auxiliary actuator 283. Taking the main actuator 280 (Fig. 33) as representative of all the main actuators for the item counting banks, these actuators are mounted for horizontal sliding movement upon the rod 167 and the bar 168 in exactly the same manner as the amount actuator 166 (Fig. 4). Each of the main actuators 279, 280, and 282, has therein a vertical slot 284 which embraces a stud 285, in a downward extension of a reducer segment 286 rotatably mounted upon the shaft 172. A link 287 connects a rearward extension of the segment 286 to a type sector 288 similar in every respect to the amount type sector 68 (Fig. 4). A spring 289 normally maintains a portion 290 of the segment 286 in contact with the bail 174 of the leading frame.

The main item counting actuators 279, 280 and 282, (Figs. 6 and 33) have teeth on the rearward ends thereof which cooperate respectively with item counting wheels 291, 292 and 293, mounted upon the #1 or balance totalizer shaft. These racks are controlled to enter complements of amounts subtractively in these wheels, as will be explained more fully hereinafter. Each of the item counting wheels has integral therewith a tripping cam 294 having diametrically opposed tripping teeth which cooperate with their respective add tripping pawls 295 and subtract tripping pawls 296. In the present embodiment, items are accumulated only in subtract operations, therefore the add tripping pawls 295 serve only to stop the item counting wheels in zero position in sub-total and total operations. In the beginning of subtract operations the add pawls 295 are shifted out of the path of the teeth in the tripping cams 294 and the subtract pawls 296 are shifted into the path of said teeth. In sub-total and total operations, the add pawls 295 are returned into the path of the tripping cams 294.

The auxiliary actuators 281 and 283 (Figs. 6 and 33) are slidably mounted adjacent their respective main actuators 280 and 282 by means of slots in the rod 167 and by means of horizontal slots 297 in the right-hand end of said auxiliary actuators, as here viewed, in cooperation with a stud 298 secured in each of the main actuators. The auxiliary actuators 281 and 283 carry respectively latch arms 299 and 300, (Figs. 33, 45 and 46) carrying studs 301 and 302 adapted to engage notches in blocks 303 and 304 secured respectively to the main actuators 280 and 282. Springs 305 urge the latch arms 299 and 300 clockwise to engage the studs 301 and 302 with the notches in the blocks 303 and 304, when the restraining means is removed from said arms 299 and 300.

Figure 37:
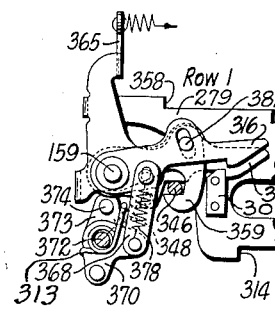
Fig. 37 is a detail view of the latches for controlling the actuator for the first row of item counting keys.
Figure 38:
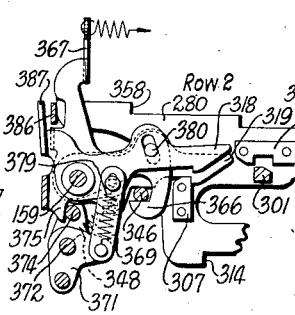
Fig. 38 is a detail view of the latches for controlling the actuators for the second row of item counting keys.
Figure 39:
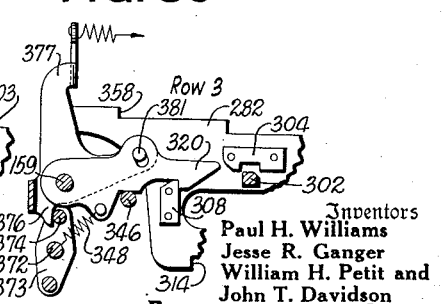
Fig. 39 is a detail view of the latches for controlling the actuators for the third row of item counting keys.

Referring to Figs. 37, 38 and 39, the main actuators 279, 280 and 282 have secured thereto respectively blocks 306, 307 and 308, and the auxiliary racks 281 and 283, (Figs. 45 and 46) have secured thereto similar blocks 309 and 315. The block 306 on the main actuator 279 (Fig. 37) has cooperating therewith two latches 316 and 317 on the shaft 159, which are adapted to latch the main actuator 279 in zero position under certain conditions to be revealed later. The block 307 (Fig. 38) on the main actuator 280, has cooperating therewith two zero latches 318 and 319 loose on the shaft 159 and the main actuator 282 (Fig. 39) has cooperating with the block 308 assembled thereon a zero latch 320. The block 309 (Fig. 45) on the auxiliary actuator 281 has cooperating therewith two zero latches 321 and 322 loose on the shaft 159 and the block 315 for the auxiliary actuator 283 (Fig. 46) has cooperating therewith zero latches 323 and 324, rotatable on the shaft 159.

*Carriage control of item counting device*

As previously stated, before the item counting mechanism can function automatically, it is necessary that the traveling carriage be tabulated to a subtract column, and that one or more amount keys be depressed. Directing attention to Figs. 6, 13, 14 and 15, when the machine is at rest, an extension 325 of a yoke 326 is positioned so that it is in the path of shoulders 314 on the forward ends of the main and auxiliary item counting actuators to retain said actuators in zero positions. A downward extension 327 of the yoke 326 has pivotally connected thereto the forward end of a pitman 328, the other end of which is bifurcated to straddle a collar on the shaft 162. A spring 329, one end of which is connected to the extension 327, urges the yoke 326 counter-clockwise and the pitman 328 rearwardly to normally maintain a stud 330 carried by said pitman in contact with a downward extension 331 of the arm 196 (see also Fig. 33).

Initial movement counter-clockwise of the main shaft 78 and the arm 196 retracts the extension 331 from the stud 330. This permits the spring 329 to shift the pitman rearwardly and rock the extension 325 of the yoke 326 downwardly out of the path of the shoulders 314 unless such rearward movement of the pitman 328 is obstructed by means of a bent-over ear 332 thereon, in cooperation with the end 333 of an arm 334 loose on a shaft 335 journaled in the frames 60 and 61. An upward extension 336 of the arm 334 carries a stud 337 embraced by the bifurcated end of a link 338, the other end of which is pivoted to a downward extension of a control lever 340, loose on a stud 341 in the left frame 61. An extension 342 of the lever 340 has connected thereto the lower end of a hanging bar 343, the upper end of which is connected to one end of the hanging bar lever 194.

Tabulating the traveling carriage 66 (Figs. 4 and 14) to a subtract column causes a lug 344 on the subtract control element 192 to engage the upturned end of the lever 194 and rock said lever clockwise, to lift the hanging bar 343 and rock the lever 340 counter-clockwise, as viewed in Fig. 13. Counter-clockwise movement of the lever 340 causes a bent-over extension 418 (Fig. 19) on the upper end thereof, in cooperation with a stud 419 carried by a lever 420, to rock said lever also counter-clockwise upon its pivot stud 421, secured in the left frame 61. Counter-clockwise movement of the lever 420 causes a stud 422 in the hook-shaped lower end thereof, in cooperation with an angular camming surface on a totalizer engaging control lever 423, to rock said lever 423 counter-clockwise upon a stud 424 secured in the left frame 61. Counter-clockwise movement of the engaging control lever 423 moves the ends of spring-pulled pawls 425 and 426 into the path of the lower end of a flying lever 427 pivoted at 428 to a totalizer engaging plate 429 secured on the main shaft 78.

Initial movement counter-clockwise of the main shaft 78 (Fig. 19) and the plate 429 causes the lower end of the flying lever 427 to engage the end of the pawl 425 to shift a link 430, connecting the upper end of said flying lever 427 to a crank 431 secured on a #1 totalizer engaging shaft 432, forwardly to rock the crank 431 and the shaft 432 clockwise to engage the wheels of the #1 or balance totalizer (Fig. 4) with the amount actuators 166 prior to their initial movement rearwardly, and to engage the wheels 291, 292 and 293 (Fig. 6) of the item counting totalizer with their respective main actuators 279, 280, and 282 prior to their initial movement rearwardly. Initial movement rearwardly of the actuators reversely rotates the wheels of the balance totalizer to subtract the amount set up on the amount keys therefrom and also reversely rotates the wheels of the item-counting totalizer to subtract the complement of the amount of the item therefrom. After the actuators have completed their initial movement rearwardly, return movement clockwise of the main shaft 78 (Fig. 19) and the plate 429 causes the lower end of the flying lever 427, which, during the initial movement of said shaft 78 and said plate 429, by-passes the upper end of the pawl 426, to engage said pawl to shift the link 430 rearwardly to rock the crank 431 and the #1 totalizer engaging shaft 432 counter-clockwise to disengage the wheels of the balance totalizer and the item counting totalizer from the actuators.

Depressing the subtract key 73 also selects and conditions the balance totalizer for a subtract operation and in addition prevents the item counting actuators from functioning at this time.

Depressing the subtract key 73 (Fig. 19) moves a notch 433 therein opposite a bent-over ear 434 on a lever 435 pivoted on the stud 421. This permits a spring 436 to urge the lever 435 counter-clockwise to cause a projection on the lower end thereof, in cooperation with a stud 437 in the lever 420, to rock said lever counter-clockwise to select and condition the balance totalizer for a subtract operation, in the manner explained above. Prior to the end of a subtract operation the lever 435 is rocked clockwise, in the well known manner, to move the ear 434 out of engagement with the slot 433 to permit the subtract key 73 to be spring-returned upwardly, after which the ear 434 comes to rest on the edge of the key 73, as here shown.

Counter-clockwise movement of the lever 340, (Figs. 13, 14, 19 and 15) when the traveling carriage is tabulated to a subtract column, shifts the link 338 rearwardly to rock the arm 334 clockwise against the tension of a spring 417, to move the end 333 thereof out of the path of the ear 332 to permit rearward movement of the pitman 328 and counter-clockwise movement of the yoke 326 to ineffective position upon initial movement of the main shaft 78 and the arm 196. It is therefore obvious from the foregoing description that it is necessary for the balance totalizer to be selected and conditioned for a subtracting operation under control of the carriage before the item counting actuators are free to move out of zero positions.

*Automatic accumulation of items*

Each time a debit item is subtracted from the balance under control of the carriage, one is accumulated in the item totalizer. Depressing an amount key in any order releases the three main actuators 279, 280 and 282 (Fig. 6) for full movement to subtract the complement of one (999) from the item totalizer.

Figure 36:
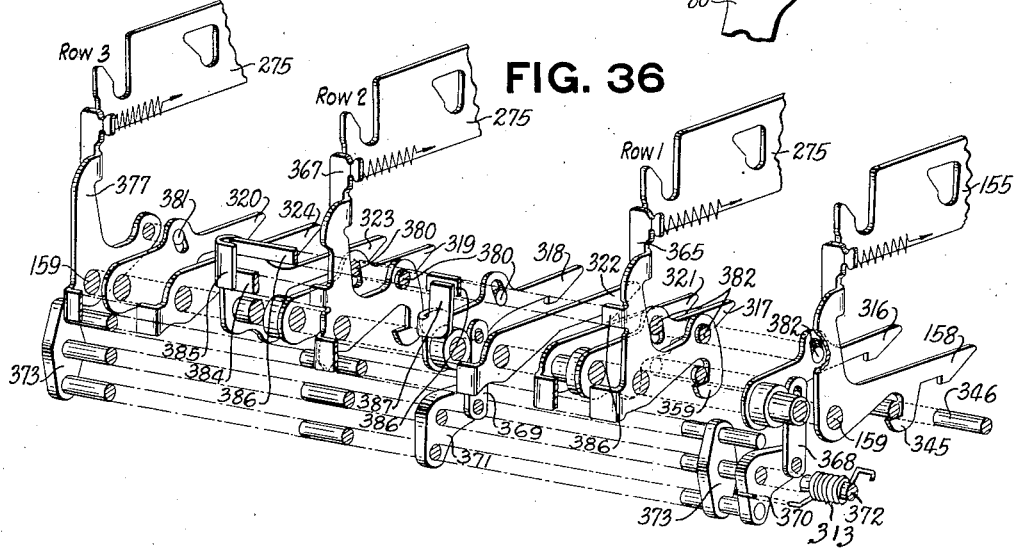
Fig. 36 is a perspective view of the control plates and control latches for the three rows of item counting keys.

Each of the zero latches 158 (Figs. 4 and 36) for the several amount banks, has a hook 345 which underlies a rod 346, which extends the full width of the keyboard and is supported by symmetrical arms 347 secured on the shaft 159. Depressing one of the amount keys 71 shifts the control plate 155 forwardly to rock the latch 158 counter-clockwise to lift the rod 346. It will be noted by referring to Figs. 36, 37, 38 and 39, that the rod 346 underlies shoulders on the zero latches 317, 319 and 320 for the main actuators 279, 280 and 282. It is therefore obvious that upward movement of the rod 346, when an amount key is depressed, rocks the pawls 317, 319 and 320, counter-clockwise out of engagement with the blocks 306, 307, and 308 on the main actuators against the action of springs 348, which normally maintain said pawls in engagement with the blocks. The latches 316 and 318 for the main actuators 279 and 280 are yieldingly retained in ineffective position, as shown in Figs. 37 and 38, by a spring 313 (Fig. 37), which is coiled about the shaft 372, one end of said spring being formed to engage the downwardly projecting arm of the bell crank 370, as shown in Fig. 37, and the other end of said spring projecting upward to engage on the upper edge of the projection 70a of the partition plate 70 for the highest order amount bank, which projection is shown in the lower left-hand corner of Fig. 5. The spring is thus normally under tension, so as to yieldingly hold the latches 316 and 318 in normal ineffective position when the item counting mechanism functions automatically. Consequently the main actuators are free to move full distance rearwardly to ninth position under influence of the leading frame bail 174 (Fig. 33), in which position they are stopped by means of the shoulders 314 contacting the rod 167.

When items are counted automatically, the auxiliary actuators 281 and 283 (Figs. 45 and 46) remain latched in zero positions, as here shown because when no item counting keys are depressed both the latches 321 and 322 for the auxiliary actuator 281 and the latches 323 and 324 for the auxiliary actuator 283 remain latched over the blocks 309 and 315, as here shown. The latches 321, 322, 323 and 324, for the auxiliary actuators are spring-urged clockwise to effective positions.

The latches 321 and 322 (Fig. 45) have angular noses, which cooperate with a corresponding angular surface on the end of the arm 299, and the latches 323 and 324 (Fig. 46) have similar angular noses which cooperate with a corresponding angular surface on the end of the arm 300. When either of the latches 321 or 322 are in effective position, as here shown, the spring tension thereon is sufficient to overcome the action of the spring 305 and retain the stud 301 out of engagement with the notch in the block 303, and the same is true of the latches 323 and 324 for the auxiliary actuator 283, and in such cases the auxiliary actuators remain uncoupled from their corresponding main actuators.

In subtract operations, the wheels of the balance totalizer and the item counting wheels are engaged with their respective actuators, prior to initial movement of said actuators, which movement reversely rotates the amount wheels to subtract therefrom the amount set up on the keyboard and reversely rotates the item counting wheels to subtract therefrom 999, which is the complement of one when there are three denominational orders, to enter one in the units item-counting wheel 291 (Fig. 6). Prior to return movement forwardly of the main item counting actuators and the amount actuators, the item counting wheels and the wheels of the balance totalizer are disengaged therefrom.

*Disabling of automatic item counting mechanism*

Sometimes it is desirable not to have an item automatically counted, and the automatic item-counting mechanism may be disabled or rendered inoperative by depressing the "Subtract" key 73 (Figs. 13 and 19). Depressing the "Subtract" key 73 causes the lower end thereof to engage the camming surface of a projection 349 of a slide 350, mounted on the left frame 61 by means of two horizontal slots therein, in cooperation with studs 360 secured in the frame 61, to shift said slide 350 forwardly. A link 351 pivotally connects the slide 350 to a crank 352, secured on the shaft 335, and rocks said crank and said shaft clockwise when the slide 350 is shifted forwardly by depression of the subtract key.

Clockwise movement of the shaft 335 as shown in Fig. 13, rocks an arcuate surface 353 on an arm 354, secured on said shaft, into the path of the bent-over ear 332 on the link 328 to retain the extension 325 of the yoke 326 in the path of the shoulders 314 to obstruct movement of the item counting actuators, to prevent the item-counting mechanism from functioning automatically, even though the traveling carriage is tabulated to a subtract column. Normally the surface 353 of the arm 354 is below the ear 332 and does not obstruct movement of the pitman 328 upon operation of the machine. In addition to controlling the item-counting mechanism, the slide 350 is also arranged to position a symbol type carrier. Consequently depression of the "Subtract" key causes a symbol to be printed opposite the debit item to show that said item was not counted.

Other control keys, including the "Non-Add" key, the "Total Check" key, and the "Total Deposit" key, also position the slide 350 to cause a symbol to be printed characteristic of the different operations these keys initiate. Positioning of the slide 350 by the keys mentioned above, also rocks the arm 354 clockwise (Fig. 19) to move the surface 353 into the path of the ear 332. However, this movement of the arm 354 is incidental to the positioning of the symbol type carrier and is not necessary to prevent automatic operation of the item counting mechanism at this time, because when these control keys are used, the traveling carriage is not in a subtract column and consequently the arm 334 obstructs movement of the pitman 328 and the extension 325 of the bail 326 to prevent automatic operation of the check counting mechanism.

In balance and sub-balance operations, it is desirable that the extension 325 of the yoke 326 be moved to ineffective position so that the item counting actuators are free to be positioned by the item counting wheels when they are returned to zero so that said actuators may in turn position their respective type carriers to record the amount standing on the item counting wheels.

Depressing either the "Balance" or the "Sub-Balance" key 73 causes the lower end of the stems of said keys, in cooperation with a corresponding camming surface on a projection 355 or a projection 356 of the slide 350, to move said slide forwardly, which by means of the link 351 rocks the shaft 335 and the arm 354 a sufficient distance clockwise (Fig. 13) to move the arcuate surface 353 beyond the ear 332. This clockwise movement of the arm 354 is sufficient to cause a stud 357 (Figs. 13 and 15) therein to engage the lower surface of the arm 334 and rock said arm upwardly out of the path of the ear 332, which is obviously necessary as the traveling carriage is not in a subtract column when a balance or a sub-balance is being taken. Therefore, when either the "Balance" or the "Sub-Balance" key 73 is depressed the pitman 328 moves rearwardly under influence of the arm 196 upon initial movement counterclockwise of the shaft 78 to rock the extension 325 out of the path of the shoulders 314 on the item counting actuators to cause the total to be taken from the item counting wheels and recorded.

*Use of item counting keys*

When using the item counting keys 72 (Figs. 2 and 33) for entering more than one item in the wheels of the item totalizer it is necessary to have the traveling carriage tabulated to a subtract column, the same as when items are automatically entered in the item counting wheels however, it is not necessary that an amount key be depressed. There are seven problems presented in the use of the item counting keys and it is believed that the best way to explain this mechanism is to treat each problem separately.

When a key is depressed in the units row or row I of the item counting device, it is necessary that the main actuator for this row go to the complement of the number, and for the main actuators of row 2 and row 3 to go to 9. For example, if the 4 key (Figs. 2, 36 and 37) is depressed in row I the actuator 279 for row I, under influence of the leading frame bail 174, moves to its sixth position, in which position it is located by means of a corresponding one of a series of graduated steps 358 on the top edge thereof coming in contact with the stud 269 in the depressed key. This movement of the actuators 279 rotates the units item counting wheel 291 (Fig. 6) reversely six steps, which is in effect the same as adding 4 therein.

Depressing the 4 key in the first row releases the main actuators for rows 2 and 3, and as there are no keys depressed in these rows, the actuators travel full distance to ninth position to subtract the complement 996 from the item counting wheels, which, assuming that the wheels were in zero position at the beginning of the operation, leaves the units wheel standing at 4, and the tens and hundreds wheels standing at zero. The latch 321 (Figs. 36, 37 and 45) is connected by a yoke to a hook-shaped extension 359, which underlies the rod 346, and an upward extension 365 of said latch is adapted to cooperate with the control plate 275 for the first row of item counting keys in exactly the same manner as the amount latch 158 explained earlier herein.

Depressing a key in row I shifts the control plate 275 forwardly to rock the latch 321 counter-clockwise to cause the hook 359 to shift the rod 346 to move the latches 317, 319 and 320 (Figs. 37, 38 and 39) for the main actuators 279, 280 and 282. The zero latch 321 (Fig. 45) for the auxiliary actuator 281 is rocked to ineffective position, however, the latch 322 remains effective, and holds said actuator in zero position. The latches 323 and 324 for the auxiliary actuator 283 (Fig. 46) remain effective to retain said actuator in zero position. The latches 316 and 318 for the main actuators 279 and 280 remain in ineffective position as here shown. It is therefore evident that the main actuator for row I is free to move until it is arrested by the stud 269 (Fig. 33) in the depressed key, and the main actuators for rows 2 and 3 are free to move full distance to ninth position to subtract the complement of the amount set up in row I from the wheels of the item counting device.

When a key is depressed in row 2 of the item counting device, for example, the 4 key, it is necessary to subtract the complement of 40 (960) from the three wheels of the item counting device. This is accomplished by retaining the main actuator for row I in zero position and by allowing the main actuator for row 2 to move to sixth position, in which position it is stopped by the stud in the depressed key in cooperation with the corresponding stop 358 thereon, and by permitting the main actuator for row 3 to go to ninth position. As before the auxiliary actuators are retained in zero positions.

The latch 322 (Figs. 36 and 38) is connected by a yoke to a hook-shaped extension 366, which underlies the rod 346, and has an upward extension 367 which cooperates with the control plate 275 for row 2. Depressing a key in row 2 shifts the control plate 275 forwardly to rock the latch 322 counter-clockwise to cause the extension 366 to lift the rod 346, to rock the latches 317, 319 and 320 for the main actuators 279, 280 and 282 (Figs. 36, 37, 38 and 39) to ineffective positions. The latches 316 and 318 carry studs which extend respectively through slots in the upper ends of links 368 and 369, the lower ends of which are pivotally connected to bell cranks 370 and 371 secured on a shaft 372 rotatably supported by the keyboard framework. Also secured on the shaft 372 is a plurality of arms 373, the upper ends of which support a rod 374, which cooperates with downward projections 375 of the extension 367 of the latch 322, and 376 of an extension 377 of the latch 324. Springs 378 and 379 (Figs. 37 and 38) form flexible connections between the latches 316 and 318 and their respective bell cranks 370 and 371, so that said bell cranks and their associated links may move independently of the latches when said latches are retained in effective positions in a manner later to be described.

Counter-clockwise movement of the extension 367 lifts the rod 346 to move the latch 317 to ineffective position. However, the projection 375 of the extension 367 rocks the rod 374, the shaft 372, and the bell cranks 370 and 371 clockwise against the action of the spring 313. Clockwise movement of the bell crank 370, by means of the link 368, moves the latch 316 downwardly into engagement with the block 306 to obstruct movement of the main actuator 279. Counter-clockwise movement of the extension 367 (Figs. 36 and 38) moves a stud 380 carried thereby into engagement with the upper end of a slot in the latch 318 to prevent clockwise movement of the latch to effective position under influence of the bell crank 371, the spring 379 forming a flexible connection that permits movement of said bell crank independently of said latch 318. It is, therefore, apparent that when a key is depressed in row 2, the main actuator 279 for row 1 will be retained in zero position, the main actuator 280 for row 2 will be positioned under control of the depressed key, and the main actuator 282 for row 3 will travel to the 9 position, and the two auxiliary actuators will be retained in zero positions, to subtract the complement (960) of the value of the depressed key from the item counting wheels.

When a key is depressed in row 3, it is necessary that the main actuator for row 3 be positioned under the control of the depressed key, and that the two auxiliary actuators for rows 2 and 3 be retained in zero positions. For example, if it is desired to add 400 in the item counting wheels, it is necessary to subtract its complement 600 therefrom. Depressing the 4 key in row 3 causes the main actuators for rows 1 and 2 and the auxiliary actuators for rows 2 and 3 to be retained in zero positions, and arrests the main actuator for row 3 in sixth position, which revolves the corresponding item counting wheel reversely six steps to fourth position, to give a positive result.

Depressing a key in row 3 shifts the control plate 275 (Figs. 36 and 39) therefor forwardly to rock the extension 377 and the latch 324 counter-clockwise. Counterclockwise movement of the extension 377 causes the projection 376 in cooperation with the rod 374 to rock the shaft 372 clockwise, which by means of the bell cranks 370 and 371 (Figs. 37 and 38) and their associated links 368 and 369 rocks the latches 316 and 318 clockwise into engagement with their respective blocks 306 and 307 to retain the main actuators 279 and 280 in zero positions during operation of the machine.

While there is no hook on the extension 377 of the latch 324 to lift the rod 346, this rod is nevertheless lifted by the hook 345 (Fig. 36) on the zero latch 158 for the amount bank in which an amount key is depressed, and rocks the latches 317 and 319 for the main actuators 279 and 280 to ineffective positions; making it necessary to move the latches 316 and 318 to effective positions. The rod 346 (Fig. 39) rocks the latch 320 out of engagement with the block 308 to free the main actuator 282 for row 3. While there is no reason for operating the machine without depressing an amount key, it is possible, and in such a case counter-clockwise movement of the extension 377 causes a stud 381 therein, in cooperation with an angular slot in the latch 320, to rock said latch out of engagement with the blocks 308 to free the main actuator 282 for row 3.

The latch 324 (Fig. 46) for the auxiliary actuator 283 is rocked to ineffective position upon depression of a key in row 3. However, the latch 323 remains effective to retain the auxiliary actuator in zero position. Inasmuch as there are no keys depressed in rows 1 and 2, both the latches 321 (Fig. 45) and 322 remain effective to retain the auxiliary actuator 281 for row 2 in zero position. Upon operation of the machine, the main actuator 282 for row 3 is stopped in its initial movement by the stud 269 (Figs. 33 and 34) in the depressed key to position said main actuator to cause the complement (600) of the value of the depressed key to be subtracted from the item counting wheels.

The next problem to be analyzed is the depression of a key in each of rows 1 and 2. Assuming that the 4 key has been depressed in each row, the complement of 44 is 956, and in this case the depressed key in row 1 stops the actuator at sixth position, the complement of 4, the auxiliary actuator for row 2 is coupled to the main actuator, and said auxiliary actuator in cooperation with the depressed 4 key stops the main actuator at 5, and the main actuator for row 3 is allowed to travel full distance to ninth position; thus we obtain the complement (956) of 44.

Depressing an item counting key in row 1, (Figs. 33, 36, 37, 38 and 39) causes the control plate 275 for row 1, to rock the extension 365 counter-clockwise to cause the hook 359 to lift the rod 346 to move the latches 317, 319 and 320 for their respective main actuators 279, 280 and 282 to ineffective positions. Counter-clockwise movement of the extension 365 also rocks the latch 321 (Figs. 36 and 45) for the auxiliary actuator 281 for row 2 to ineffective position.

Depressing a key in row 2 rocks the extension 367 and the latch 322 (Figs. 36, 38 and 45) for the auxiliary actuator 281 to ineffective position. This frees the auxiliary actuator 281 for movement and permits the arm 299 to be impelled clockwise by the spring 305 to engage the stud 301 with the notch in the block 303 to couple the auxiliary actuator 281 to its associated main actuator 280. Counter-clockwise movement of the extension 367 causes the projection 375 to rock the shaft 372 clockwise to move the latches 316 and 318 to effective positions. However, studs 382 and 380, respectively, in the extensions 365 and 367, in cooperation with their respective slots in said latches, retain said latches in ineffective positions.

It will be noted by referring to Figs. 33 and 45 that the auxiliary actuator 281 has corresponding graduated steps 383 for each of the graduated steps 358 on the main actuator 280. The graduated steps 383 are one step in advance of the steps 358 and when the auxiliary actuator is coupled to the main actuator the corresponding steps 383 in cooperation with the stud 269 (Fig. 33) in the depressed key stops the main actuator 280 one step in advance of the complement of the depressed key, which with the 4 key depressed would be position 5.

Inasmuch as no key is depressed in row 3, the latch 324 remains effective (Figs. 36 and 46) to retain the auxiliary actuator 283 in zero position. The latch 323 for the auxiliary actuator 283 is rocked to ineffective position, however, this is merely incidental to this particular operation and will be explained later in connection with another problem. It is therefore evident that the main actuator for row 1 is positioned under the control of the depressed key in row 1 to the complement thereof, that the main actuator for row 2 is positioned by the auxiliary actuator for row 2 one digit less than the complement of the depressed key and the main actuator for row 3 travels to position 9. Therefore, when 44 is set up on the item counting keys the complement 956 thereof is subtracted from the wheels of the item counting totalizer.

When a key is depressed in each of rows 2 and 3 of the item counting device it is necessary that the main actuator for row 1 be retained in zero position, that the main actuator for row 2 be positioned at the complement of the depressed key, and that the main actuator for row 3 be positioned by the auxiliary actuator at a position corresponding to one digit less than the complement of the depressed key. For example, depressing the 4 key, in each of the rows 2 and 3, when it is desired to enter 440 items in the item counting wheels, causes the main actuator for row 1 to be retained in zero position, the main actuator for row 2 to be stopped in sixth position, and the main actuator for row 3 to be stopped in fifth position, to cause the complement (560) of 440 to be subtracted from the item counting wheels.

Depressing a key in row 2 rocks the plate 275 (Figs. 36, 38 and 45) forwardly to rock the extension 367 for the latch 322 counter-clockwise to cause the projection 375 thereof, in cooperation with the rod 374, to rock the shaft 372 clockwise, to cause the bell crank 370 (Fig. 37) to rock the latch 316 to effective position to retain the main actuator 279 in zero position. This is necessary in this case because counter-clockwise movement of the extension 367 causes the hook 366 to lift the rod 346 to move the latches 317, 319 and 320, (Figs. 37, 38 and 39) to ineffective positions. The stud 380 in the extension 367 in cooperation with the slot in the latch 318 retains said latch in ineffective position upon clockwise movement of the shaft 372 and the bell crank 371. It is therefore evident that the main actuator for row 2 is free to move to engage the depressed key.

Depressing a key in row 3 rocks the extension 377 counter-clockwise to move the latch 324 (Figs. 36 and 46) for the auxiliary actuator 283 to ineffective position. Counter-clockwise movement of the extension 367, when a key is depressed in row 2, causes an extension 384 thereof in cooperation with a bent-over ear 385 to the latch 323 to rock said latch counter-clockwise to ineffective position to couple the auxiliary actuator 283 to the main actuator 282 in the manner explained for row 2. Depression of a key in row 2 rocks the latch 322 (Figs. 36 and 45) for the auxiliary actuator 281 to ineffective position. However, as no key is depressed in row 1 the latch 321 remains effective and retains said auxiliary actuator 281 in zero position. From the foregoing description it is, therefore, obvious that when 440 is set up on the keyboard of the item counting keys, the complement 560 thereof will be subtracted from the item counting wheels.

The next problem is the depression of a key in rows 1 and 3 of the item counting device.

Assuming that the item counting wheels are standing at zero and that 404 is set up on the item keys, it is necessary that the main actuator for row 1 reversely rotate the units item wheel six steps to fourth position, the main actuator for row 2 reversely rotate the tens item wheel nine steps to 9 position, and that the main actuator for row 3 be controlled by the auxiliary actuator 282 to reversely rotate the hundreds item wheel five steps to position 5 to subtract the complement (596) of 404 from the item counting wheels.

Depressing a key in row 1 shifts the plate 275 therefor (Figs. 36 and 37) forwardly to rock the extension 365 and the latch 321 counter-clockwise, causing the hook 359 to raise the rod 346 to rock the latches 317, 319 and 320 for the main actuators 279, 280 and 282, to ineffective positions. Depressing a key in row 3 shifts the control plate 275 forwardly (Figs. 36, 39 and 46) to rock the extension 377 counter-clockwise to move the latch 324 for the auxiliary actuator 283 to ineffective position. Clockwise movement of the extension 377 also causes the projection 375 thereof to rock the rod 374 and the shaft 372 clockwise, which by means of the bell cranks 370 and 371 (Figs. 37 and 38) ordinarily rocks the latches 316 and 318 for the main actuators 279 and 280 to effective or locking positions. However, movement of the latch 316 to effective position is obstructed by the stud 382 in the extension 365, which is effective when a key is depressed in row 1, and an extension 386, (Figs. 36 and 38) of the extension 365, in cooperation with an upward projection 387 of the latch 318, obstructs movement of said latch 318 to effective position upon clockwise movement of the shaft 372 and the bell crank 371.

Therefore it is apparent that the main actuator 279 for row 1 is free to be positioned under control of the depressed key in row 1 and the main actuator in row 2 is free to go to ninth position. The latch 321 (Fig. 45) for the auxiliary actuator 281 for row 2 is rocked to ineffective position by the depression of a key in row 1. However, as there is no key depressed in row 2, the latch 322 remains effective to retain the auxiliary actuator 281 in zero position. Depressing a key in row 3 rocks the latch 324 (Fig. 46) for the auxiliary actuator 283 to ineffective position, and depressing a key in row 1 causes the extension 386 in cooperation with the upward projection 385 of the latch 323 to rock said latch to ineffective position to cause the auxiliary actuator 283 to be coupled to the main actuator 282 so that they may move in unison upon operation of the machine. The rod 346 (Fig. 39) has previously moved the latch 320, for the main actuator 282, to ineffective position, therefore the main actuator 282 is free to be positioned by the auxiliary actuator 283 in cooperation with the stud 269 (Fig. 33) in the depressed key in row 3.

Upon operation of the machine, the main actuator 279 for row 1 is positioned under control of the depressed key and in being positioned reversely rotates the units item counting wheel a sufficient number of steps to subtract the complement (6) of the value of the depressed key therefrom. As there is no key depressed in row 2, the main actuator 280 (Fig. 38) therefore, moves to ninth position, and in so doing reversely rotates the tens item counting wheel nine steps to subtract the complement (9) of one which was borrowed from the tens order from the tens item counting wheel. The auxiliary actuator 283 (Fig. 46) for row 3, positions the main actuator 282 to a position corresponding to one digit less (5) than the complement (6) of the depressed key in row 3, to reversely rotate the hundreds item counting wheel 5 steps to compensate for the digit borrowed from the hundreds order. It is therefore evident that when 404 is set up on the item counting keys the complement 596 thereof will be subtracted from the item counting wheels.

The final example is the depression of a key in each of the three rows of item counting keys. Assuming that 444 has been set up on the item counting keys, it is necessary to subtract the complement 556 thereof from the item counting wheels, to accumulate this amount during a subtract operation. In this case it is necessary that the depressed key in row 1 stop the main actuator in sixth position, that the auxiliary actuator be coupled to the main actuator for row 2, so that the depressed key in row 2 will stop the main actuator at a position one digit less than the complement of the depressed key and that the auxiliary actuator and the main actuator for row 3 be coupled together so that the depressed key in row 3 will also stop the main actuator at a position one digit less than the complement of the depressed key.

Depressing a key in row 1 shifts the control plate 275 (Figs. 36, 37, 38 and 39) forwardly to rock the extension 365 and the latch 321 counter-clockwise to cause the hook 359 to raise the rod 346 to move the latches 317, 319 and 320 for the main actuators for rows 1, 2 and 3, to ineffective position. It is apparent that counter-clockwise movement of the extension 365, by means of the stud 382, would also rock the latch 317 to ineffective position. Counter-clockwise movement of the extension 365, by means of the extension 386 thereof, in cooperation with the projection 387, rocks the latch 318 for the main actuator 280 to ineffective position and by means of the projection 385 rocks the latch 323 (Figs. 36 and 46) for the auxiliary actuator 283 for row 3, to ineffective position.

Depression of a key in row 2 shifts the control plate 275 therefore forwardly to rock the extension 267 and the latch 322 counter-clockwise. Counter-clockwise movement of the extension 367 (Figs. 36 and 38), by means of the projection 375, in cooperation with the bar 374, rocks the shaft 372, the bell cranks 370 and 371 counter-clockwise to move the latches 316 and 318 for the main actuators 279 and 280 to effective positions in the manner explained earlier herein. However, the depressed keys in row 1 and row 2, in cooperation with their respective plates 275, retain the extensions 365 and 367 in their counter-clockwise positions, causing the studs 382 and 380 (Figs. 37 and 38), in cooperation with the slots in the latches 316 and 318, to retain said latches in ineffective positions, as here shown. It is therefore evident that the main actuators for rows 1 and 2 are free to move under influence of the leading frame bail 174, upon operation of the machine.

The latch 321 (Figs. 45 and 46) is rocked to ineffective position upon depression of a key in row 1, and depression of a key in row 2 rocks the latch 322 also to ineffective position. It is therefore apparent that the arm 299 is free to move clockwise to engage the stud 301 with the notch in the block 303 to couple the auxiliary actuator 281 to the main actuator 280 for row 2. Upon operation of the machine, the leading frame will permit the auxiliary and the main actuators for row 2, to move until the step on the auxiliary actuator corresponding to the depressed key engages the key to cause the main actuator to be stopped at a position one digit less than the complement of said depressed key.

Depressing a key in row 3 (Figs. 36, 39 and 46) shifts the control plate 275 forwardly to rock the extension 377 and the latch 324 connected thereto counter-clockwise to ineffective position. It will be recalled that the latch 323 for the auxiliary actuator 283 has previously been moved counter-clockwise to ineffective position by the extension 386 of the latch 321. This permits the arm 300 to be spring-impelled upwardly to engage the stud 302 with the notch in the block 304 to couple the auxiliary actuator 283 to the main actuator 282. It will also be remembered that upward movement of the rod 346 rocks the latch 320 for the main actuator 282 to ineffective position. Likewise in this case the stud 381 in the extension 377, in cooperation with the slot in said latch 320, would also rock said latch to ineffective position. It is, therefore, evident that the main and auxiliary actuators for row 3 are free to move under influence of the leading frame, upon operation of the machine, until the step on the auxiliary actuator corresponding to the depressed key stops the main actuator 282 at a position one digit less than the complement of the depressed key.

Therefore, when 444 is set up on the item counting keys the complement 556 thereof will be subtracted from the item counting wheels, the result being equivalent to adding 444 therein.

At the end of each machine operation, counter-clockwise movement of the key release shaft 219 (Figs. 27 and 33) rocks an arm 388 for each of the item counting banks secured on said shaft 219 counter-clockwise in unison therewith. This causes a stud 389 carried by said arms 388, in cooperation with an angular camming surface on a projection 390 of each of the detents 276 for the item counting banks, to shift said detents rearwardly to disengage the hooks therein from the studs 273 in the depressed item counting keys to permit said keys to be returned upwardly to normal position by the spring 272 (Fig. 34). At the beginning of a machine operation, counter-clockwise movement of the shaft 203 (Figs. 29 and 33) rocks a lug 391 for each of the item counting banks, and integral with said shaft 203, into the path of a projection 392 on each of the locking detents 276 for the item counting banks, to lock the item counting keys against release or depression.

The seven examples outlined above cover all the possible combinations of depressed item-counting keys, and it is believed that an understanding of the operation of the item-counting device will have been obtained from the foregoing specification.

*Item total operations*

In balance operations, during which the balance totalizer is cleared and the new balance printed in the "Balance" column of the stub portion of a ledger sheet 410 (Fig. 3), the item totalizer is also cleared and the total number of items is simultaneously printed in the "Total Items" column of the stub of ledger sheet. In all other operations the item printing sectors 288 (Fig. 33) are held against printing movement to prevent unnecessary printing and in subtract operations to prevent erroneous printing, as it will be recalled that the main actuators and their associated printing sectors, for the item counting device, are always positioned to the complement of the value of the depressed item keys. Also, when items are accumulated automatically, the main actuators and printing sectors for the item counting device are positioned to the complement of one.

When the traveling carriage 66 (Figs. 7, 11 and 33) is tabulated to other than the "Balance" column of the stub, an extension 438 on each of the control elements 192 engages a bent-over ear 439 on an extension of an arm 440 connected by a cross bar 441 to a similar arm 440. This rocks the arms 440 and the bar 441 counter-clockwise against the tension of a spring 442 to move said bar 441 into the path of a projection 443 on each of the three arms that support the three item printing sectors 288 to obstruct printing movement of said arms and said sectors.

The bar 193 carries a control element 444 which positions the carriage so that the "Balance" column on the stub of the ledger sheet 410 is opposite the type sectors. It will be noted that the control element 444 has no extension to cooperate with the ear 439 and consequently the spring 442 retains the bar 441 out of the path of the projections 443 to allow printing movement of the sectors 288.

As previously explained, the mechanism shown in Fig. 27 rocks the shaft 219 counter-clockwise in the beginning of total and sub-total operations to release any depressed amount keys and to move the zero latches for the amount banks to ineffective positions. This counter-clockwise movement of the key release shaft 219 in the beginning of balance or total operations causes the stud 389 (Figs. 33 and 36) in the arm 388, in cooperation with the angular camming surface on a projection 393 on the item control plate 275, to shift said plate forwardly to rock the extensions 365, 367 and 377 counter-clockwise, the same as if a key were depressed in each of the item counting rows. Simultaneously the amount zero latches 158 (Figs. 4 and 36) are rocked counter-clockwise to ineffective positions, and this movement of the latches 158 and the extensions 365, 367 and 377 rocks the rod 346 upwardly to move the latches 317, 319 and 320 (Figs. 37, 38 and 39) for the main actuators 279, 280 and 282 to ineffective positions.

Counter-clockwise movement of the extensions 365, 367 and 377, causes the studs 382, 380 and 381 therein, in cooperation with slots in the latches 316, 318 and 320, to retain the latches 316 and 318 in ineffective positions, when the shaft 372 is rocked clockwise by the projections 375 and 376 on the extensions 367 and 377, as explained earlier herein, and in cooperation with the rod 346 to rock the latch 320 for the main actuator 282 to ineffective position. The three main actuators for the item counting keys are now free to move under influence of the leading frame bail 174 (Fig. 33). In total operations, the auxiliary actuators 281 and 283 (Figs. 45 and 46) are coupled to their associated main actuators and travel in unison therewith, however, this has no influence upon the positioning of said main actuators, as they are positioned by their corresponding item-counting wheels.

In balance operations, the wheels 291, 292 and 293 (Fig. 6) for the item counting device are engaged with their respective main actuators 279, 280 and 282, prior to their initial movement rearwardly, which movement reversely rotates said wheels until one of the two diametrically opposed tripping teeth on the tripping cams 294 (Fig. 33) engage the teeth of the tripping pawls 295 to locate said wheels in zero positions. This positions the main actuators of the item counting device commensurate with the amount on the item counting wheels, and the main actuators in turn position the printing sectors 288 so that when the printer mechanism functions the total number of items will be printed in the "Total Item" column on the stub of the ledger sheet 410 (Fig. 3). Prior to return movement forwardly of the main actuators 279, 280 and 282 the item counting wheels are disengaged therefrom, so that said wheels will remain in a cleared state after the completion of the balance operation.

Item counting mechanism in sub-balance of overdraft operations

In sub-balance of overdraft operations the complementary amount of the overdraft is transposed to a true negative balance and this true negative balance is read from the balance totalizer in a sub-total operation and simultaneously printed in the "Balance" column of the main portion of the ledger sheet 410. Sub-balance of overdraft operations require three cycles of movement of the machine mechanism. In the first cycle of a sub-balance of overdraft operation the complementary amount of the overdraft is cleared from the balance totalizer and simultaneously entered in an auxiliary storage device. In the second cycle of a sub-balance of overdraft operation the complementary amount of the overdraft is subtracted from the cleared balance totalizer, thus leaving the true negative balance entered in said totalizer, and in the third cycle of a sub-balance of overdraft operation the balance totalizer is operated in a sub-total operation and the true negative balance printed in the "Balance" column of the main portion of the ledger sheet 410. It will be recalled that the printer mechanism is disabled during the first two cycles of a sub-balance of overdraft operation to prevent the complementary amount of the overdraft from being printed on the ledger sheet. Therefore, in order to preserve the total of the items in sub-balance of overdraft operations it is necessary to lock the main actuators for the item counting device in zero positions during the first and second cycles of a sub-balance of overdraft operation, so that the total of the items will not be cleared out of the item totalizer during the transposing cycles of said sub-balance of overdraft operation.

Referring to Figs. 6 and 13, integral with the cluster of cams, including the cam 134 loosely mounted on the stud 86, is a cam 394, the periphery of which cooperates with a roller 395 on a lever 396 rotatably supported by the stud 95. A link 397 connects the lever 396 to a crank 398 secured on a shaft 399 journaled in the frames 60 and 61. Secured on the left-hand end of the shaft 399 is an arm 400, carrying a stud 401 which extends through a camming slot 402 in a lever 403 pivoted on a stud 404 in the left frame 61. The lower end of the lever 403 cooperates with a stud 405 fast in the slide 350.

It will be recalled that sub-balance of overdraft operations are initiated by depressing the Sub-Balance of Overdraft key 77 (Fig. 35) and depressing this key causes the pawl 135 in cooperation with the ratchet 137 to rotate the cluster of cams, including the cam 394 (Fig. 6) a slight distance counter-clockwise to move the higher portion of said cam out of the path of the roller 395 to permit a spring 406 to rock the shaft 399 and the arm 400 clockwise. Clockwise movement of the arm 400 (Fig. 13) causes the stud 401, in cooperation with the camming slot 402, to rock the lever 403 clockwise, which movement, by means of the stud 405, shifts the slide 350 forwardly. Forward movement of the slide 350, by means of the link 351 (Figs. 13 and 15), rocks the surface 353 of the arm 354 beyond the bent-over ear 332 on the pitman 328, and the stud 357 carries the arm 334 out of the path of the ear 332. Ordinarily this permits the extension 325 of the yoke 326 to move out of the path of the shoulders 314 on the main actuators for the item counting device, upon initialed movement counter-clockwise of the shaft 78 and the arm 196. However, the extension 325 is retained in effective position, as here shown, by mechanism now to be described and effective only in sub-balance of overdraft operations.

It will be recalled by referring to Figs. 6, 14 and 35 that depressing the Sub-Balance of Overdraft key 77 rocks, by means of the pawl 135, the high portion of the cam 134 out of the path of the roller 133 to release the lever 131 to the action of the spring 136, which immediately rocks said lever clockwise as here viewed. Clockwise movement of the lever 131, by means of a link 407 connecting said lever to one arm of a yoke 408 loose on a rod 409 supported by the frames 60 and 61, rocks said yoke counter-clockwise. Counter-clockise movement of the yoke 408 rocks an arcuate projection 415 of the left-hand arm thereof underneath a protruding ear 416 of the extension 325 of the yoke 326. This obstructs movement of the yoke 326 (Fig. 13) to ineffective position when the arm 196 is retracted from the stud 330 and causes the extension 325 in cooperation with the shoulders 314 on the main actuators 279, 280 and 282 to retain said actuators in zero position.

Near the end of the second cycle of a sub-balance of overdraft operation the high portion of the periphery of the cam 134 (Fig. 35) rocks the lever 131 counter-clockwise, which by means of the link 407, rocks the yoke 408 clockwise to move the projection 415 out of the path of the ear 416 to permit the main actuators and the printing mechanism for the item counting device to be positioned by the item counting wheels in the last or printing cycle of a sub-balance of overdraft operation so that a sub-total of the number of items can be recorded in the "Total Items" column of the main portion of the ledger sheet if so desired. In the final balancing operation the balance totalizer and the item totalizer are cleared and the total number of items and the balance are printed in their respective columns on the stub of the ledger sheet 410.

In case it is desired not to print the total number of items on the main portion of the ledger sheet 410 one of the control elements 192 (Fig. 7) is placed opposite the Balance column and the extension 438 thereon disables the item printing sectors in the manner explained under the subheading "Item Total Operations," earlier herein.

In other than sub-balance of overdraft operations, the projection 415 remains out of the path of the ear 416, as shown in Fig. 35, and consequently does not interfere with the movement of the yoke 326.

*Split and normal amounts keys*

When normally used, the amount banks are so arranged that when a key is depressed in a higher order, all the printing sectors in the lower orders in which no keys are depressed are automatically released by what is termed the zero elimination mechanism, so that the zeros in these lower orders will print. This same mechanism prevents the printing of zeros in higher orders in which no keys are depressed.

Sometimes it is desirable to use the amount keys as listing keys. For example, it is not unusual to split the amount keyboard in several places so that the amount keys are split into several groups and may be used simultaneously for listing several items. When the amount keys are used in this manner, it is necessary to isolate the several groups from each other by rendering the zero elimination mechanism between the various groups inoperative, so that when a key is depressed in a group of a higher order the zeros in the lower order groups will not print. In the present arrangement, the zero elimination mechanism is controlled by a control element on the traveling carriage, which when the traveling carriage is tabulated to a predetermined columnar position for the listing of items causes the amount keyboard to be split into several groups for listening purposes. Obviously, in listing operations the totalizers are not engaged with the actuators.

Directing attention to Figs. 8 and 11, mounted on the carriage tabulating stop bar 193 is a control element 450 having a depending lug 451 adapted to engage an upward projection 452 of a hanging bar lever 453, pivoted on the stud 195, when the traveling carriage is tabulated to a predetermined columnar position in which it is desired to list several items simultaneously. The lug 451 rocks the lever 453 downwardly, causing a downward projection 454 thereof to engage an extension 455 on a yoke 456, pivoted on a rod 457 supported in the printer framework, to rock said yoke 456 counter-clockwise as viewed in Fig. 8. Extending between the two arms of the yoke 456 is a rod 458, which pivotally supports the upper ends of two links 459 and 460, the lower ends of which are connected respectively to slides 461 and 462 shiftably mounted respectively upon the one hundred dollar zero elimination or order pawl 463 and the ten thousand dollar zero elimination pawl 464. The pawls 463 and 464 are similar in every respect and work in exactly the same manner as the pawl 187 for the amount bank illustrated in Fig. 4 and explained earlier herein. Counter-clockwise movement of the yoke 456, by means of the links 459 and 460, shifts the slides 461 and 462 upwardly to move bent-over ears 465 and 466 on the upper ends thereof out of the path of the ends of their adjacent higher order pawls 187.

Each higher order zero elimination pawl carries a stud which overlies a similar stud in its adjacent lower order pawl. Consequently when a key is depressed in any order and the mechanism shown in Fig. 4 rocks the zero elimination pawl 187 for that order to ineffective position, all lower order zero elimination pawls will also be rocked to ineffective positions, in the well known manner, to release the printing sectors for the lower orders for printing movement so that the amount set up on the keyboard will be recorded. The bent-over ears 465 and 466 (Fig. 11) of the slides 461 and 462 take the place of the studs in their associated zero elimination pawls, and when said ears are shifted upwardly in the manner explained above, out of the path of their adjacent higher order elimination pawls, the keyboard is split into three groups or sections. For example, the one hundred dollar zero elimination pawl and all lower order zero elimination pawls are free from control of all higher order zero elimination pawls. It is therefore evident that the keyboard is split into three groups, composed of the one hundred dollar order and all lower orders, the one thousand and the ten thousand dollar order, and a final group composed of the one hundred thousand dollar order and all higher orders.

The edge of the bar 441 (Fig. 11) that controls the printing sectors has three surfaces 467, 468 and 469 which, depending upon the movement imparted to said bar 441, controls the printing of the various type sectors. When the extension 438 (Fig. 7) of the control element 192 engages the nose 439, the surface 467 (Fig. 11) is moved into the path of the projections 443 to obstruct printing movement of the item counting type sectors 283, as previously explained. When the traveling carriage is tabulated to a columnar position where the control element 450 splits the amount keyboard, as explained above, an extension 470 on said control element engages the nose 439 to move the bar 441 to a position where the surface 469, which is cut a little deeper than the surface 467, obstructs movement of the two lowest order type sectors and the symbol printing sector. The surface 467 continues to obstruct movement of the item counting type sectors. However, the surface 468, which is deeper cut than either of the other surfaces does not obstruct movement of the seven higher order printing sectors, and consequently these are the active type sectors when the split keyboard feature is being used.

Another type of control element (not shown) similar to the control element 450 (Fig. 11) imparts a still greater movement to the bar 441 to cause the surface 468 to become effective to block printing movement of the higher order type sectors. Obviously when the surface 468 is effective, the surfaces 467 and 469 are also effective, and in this case all the amount type sectors, the symbol type sector and the item counting type sectors are obstructed against printing movement. Other extensions on the tabulating stops or control elements, in cooperation with a camming surface on the bail of a yoke, control the printing movement of the date type sectors in a manner to be described later in connection with the auxiliary keyboard.

Auxiliary keyboard

The auxiliary keyboard is located directly in front of the regular keyboard and is supported by an extension of the regular machine base and is enclosed in the machine's case or cabinet. As presently arranged, the auxiliary keyboard includes month, days, and year keys, a plurality of symbol printing keys and a Black key.

By removing the date keys and the symbol keys from the main keyboard, space was provided for additional rows of keys, which materially increases the keyboard capacity of the machine. The keys of the auxiliary keyboard are not limited to the uses outlined above but may, with minor alterations, be utilized for any desired purpose, such as, amount, check counting, number printing, etc.

The keys of the auxiliary keyboard are arranged in groups containing from three to twelve keys, each group controlling its respective actuator which in turn positions a printing sector commensurate with the value of the depressed key. The month group consists of three rows of four keys each, the tens of days group consists of a single row of three keys, the units of days group consists of three rows of three keys each and the year group consists of a single row of four keys. The date keys are stay-down keys in that they are not automatically released at the end of each machine operation but may be manually released by means of a Release key incorporated in the auxiliary keyboard.

The symbol keys consist of two rows of four keys each, which control the positioning of a symbol actuator, which in turn positions a symbol type sector in accordance with the depressed symbol key. The symbol keys are automatically released at the end of each machine operation and furthermore, may be manually released by means of the regular Release key incorporated in the main keyboard of the machine. A manually operated device is provided for controlling the automatic and manual release of the symbol keys.

Auxiliary keyboard framework

Directing attention to Figs. 2, 20 and 24. The framework of the auxiliary keyboard comprises a top plate 471, a back plate 472, right and left end plates 473 and 474, and a plurality of partition plates 475, equally spaced between the end plates 473 and 474, and arranged to assist in supporting the various rows of keys. The auxiliary keyboard framework also includes a front plate 476 which is connected to the end plates 473 and 474, as also is the back plate 472. The end plates 473 and 474 are fastened, by screws, to extending lugs 477 of the machine base 62, thereby rigidly securing the auxiliary keyboard assembly to the machine proper.

Keyboard

The keys of the auxiliary keyboard comprise two rows, of four keys each, of symbol keys 478 and 479 (Figs. 2, 24 and 27) three rows, of four keys each, of month keys 480, one row of three tens of days keys 481, three rows, of three keys each, of units of days keys 482, one row of four year keys 483, and a Release key 484 for the date keys. Inasmuch as the date keys and the symbol keys operate in substantially the same manner to position their respective actuators, it is believed that a description of the symbol keys and their associated actuator and printing mechanism will be sufficient for both groups of keys.

Symbol keys

The upper ends of the symbol keys 478 and 479, Figs. 24, 25 and 26, extend through openings in the top plate 471, while right angled extensions of the lower ends of the "Star" symbol key 478 and the "CM" symbol key 478 each carries a square stud 485 which extends through vertical slots in a plate 486 connected to the plate 475 and spaced therefrom by two shoulder studs 487. The lower ends of the stems of the "TX" and "IN" symbol keys have right angled extensions, each carrying a square stud 488 which extends through its respective vertical slot in the partition plate 475. The studs 488 are in alignment with the studs 485.

A coil spring 489 (Fig. 24) laced between studs in the stems of the keys 478 and stationary studs in the plate 475 urges said keys upwardly and normally maintains the studs 485 and 488 in contact with the top of the vertical slots in the plates 486 and 475.

Each of the symbol keys 478 carries a pin 490 (Figs. 24 and 25) which cooperates with a corresponding hook 491 formed in a locking detent 492 mounted for horizontal sliding movement between four rollers 493, loose on studs 494, secured in the plate 475 for this row of keys. The pins 490 also cooperate with angular camming surfaces 495, formed in a control plate 496, also slidably supported by the rollers 493. A spring 497 tensioned between the detent 492 and the plate 496, urges them forwardly and rearwardly respectively to normally maintain the angular noses of the hooks on the detent 492 and the angular camming surfaces 495 of the plate 496, in contact with the pins 490. A wall 498 of the recess in the control plate 496 (Figs. 24 and 32) cooperates with a bent-over extension 499 of a zero latch 500, rotatable on a stationary stud 501 in one of the plates 475. The hook of the latch 500 normally engages a tooth 502 in a symbol actuator 503 to retain said actuator in zero or home position whenever the machine is operated with no symbol key depressed. The actuator 503 is mounted to shift horizontally by means of a slot in the rod 167 and by means of notches in the bar 168, which are engaged by the bifurcated end of said actuator 503.

Depressing one of the symbol keys 478 (Figs. 24, 25 and 32) causes the pin 490 to shift the detent 492 rearwardly until said stud passes beyond the corresponding hook 491 of said detent, whereupon the spring 497 returns the detent forwardly to latch the hook over a flat top surface of said pin 490 to retain the symbol key depressed. Depressing one of the symbol keys 478 also causes the pin 490, in cooperation with the camming surface 495, to shift the control plate 496 forwardly against the action of the spring 497 to rock the latch 500 counter-clockwise out of engagement with the tooth 502 to free the actuator 503 for movement. When no symbol key is depressed, the zero latch 500 remains effective, as here shown, and locks the actuator 503 against movement during machine operation.

The left-hand row of symbol keys 479 (Figs. 2, 27 and 32) each carries a pin 504 which cooperates with a corresponding hook of a locking detent 505 and the angular camming surface of a control plate 506, similar in every respect to the detent 492 and the plate 496 (Figs. 24 and 25) for the right-hand row of symbol keys 478.

The control plates 506 and 496 for the symbol keys each has a notch in the front end thereof which is engaged respectively by the rounded ends of lugs 507 and 508 integral with a shaft 509 with a tenon 515 which fits loosely in a hole in the end plate 473 (Fig. 20). The left-hand end of the shaft 509 has a recess therein which loosely engages a tenon on a shaft 516 for the year keys 483. The shafts 509 and 516 are journaled in holes in the partition plates 475 and similar shafts for the other groups of keys are mounted in alignment with, and in exactly the same manner as, the shafts 509 and 516, as clearly illustrated in Fig. 20. It is therefore evident that the control plates 506 and 496 are tied together and when one of the keys 479 is depressed, forward movement of the plate 506 rocks the plate 496 in unison therewith to rock the zero latch 500 counter-clockwise out of engagement with the tooth 502 of the actuator 503.

The locking detents 505 and 492 (Figs. 24, 27 and 32) are also tied together by means of notches in said detents in cooperation with lugs 517 and 518 integral with a shaft 519 mounted in exactly the same manner as the shaft 509 by means of a tenon on the right end thereof, in cooperation with a recess in the end plate 473 (Fig. 20) and by means of a recess in the left end thereof in cooperation with a tenon of a release shaft 520 for the year keys 483. The shafts 519 and 520 are further rotatably supported by holes in the partition plates 475. The two locking detents for the two rows of symbol keys are tied together so that releasing movement of the shaft 519 will release the depressed key in either of the two rows, in a manner later to be described. It is probably well to here state that each row of keys of the different groups has a locking detent and a control plate similar to those for the symbol keys, and in the case of the units of days keys 482 (Fig. 2) and the month keys 480 the control plates and the locking detents are tied together in exactly the same manner as the control plates and locking detents for the two rows of symbol keys 478 and 479.

Locking of keys during machine operation

During machine operation the locking detents for the different rows of keys are locked against rearward movement, thus effectively locking the depressed keys of the auxiliary keyboard against release and the undepressed keys against depression. This is accomplished by means of a shaft 521 (Figs. 20, 25, 28 and 30) journaled in the auxiliary keyboard framework and having cut therein a slot 522 for each of the locking detents of the auxiliary keyboard. The slots 522 are alined with the locking detents and, when the machine is at rest, are so positioned that they are parallel to the upper edges of said locking detents, and provide sufficient clearance for the detents to slide back and forth upon depression of their corresponding keys. At the beginning of machine operation the shaft 521 is rotated 90 degrees in a clockwise direction to move the top surface of the slots 522 in said shaft at right angles to the top surface of the locking detents and into the path of the rearward ends of said detents, as shown in Fig. 28, to lock them against movement during machine operation. The shaft 521 is rocked clockwise to locking position in the following manner:

Secured on the shaft 521 (Figs. 20 and 29) is a pinion 523, which meshes with teeth in a segment 524 loose on a stud 525 in one of the plates 475. A spring 526 urges the segment 524 counter-clockwise to normally maintain a nose 527 thereof in contact with the back of a slot in a block 528 fast on the forward end of a link 529. A spring 530, one end of which is connected to the link 529, urges said link forwardly and downwardly to maintain the block 528 and the forward end of said link in an annular groove in a roller 531 loose on a stud 532 secured in the main keyboard framework, and to maintain the slot in the block 528 in contact with the nose 527. The rearward end of the link 529 is slotted to receive a stud 533 in a crank 534 secured on the shaft 203 journaled in the main keyboard framework. The spring 204 urges the arm 202 counter-clockwise to normally maintain the stud 201 in contact with the upper end of the pitman 199.

Initial movement counter-clockwise of the main drive shaft 78, under influence of the mechanism shown in Fig. 7, carries the arm 196 and the stud 197 (Fig. 29) in unison therewith to permit the pitman 199 to move downwardly under the influence of the spring 204 which simultaneously rocks the shaft 203 and the crank 534 counter-clockwise. Counter-clockwise movement of the crank 534 and the stud 533 frees the link 529 and the segment 524 to the action of the spring 526, which is strong enough to overcome the action of the spring 530 and rock the segment 524 counter-clockwise, to shift the link 529 rearwardly. Counter-clockwise movement of the segment 524 rotates the pinion 523 and the shaft 521 clockwise approximately 90 degrees (Fig. 28) to cause the slots 522 in said shaft to obstruct movement of the locking detents of the auxiliary keyboard to lock the keys in the manner explained previously. Return movement clockwise of the main drive shaft 78, in the latter part of machine operation, reverses the movement of the parts shown in Fig. 29 to restore said parts to normal position, as here shown.

*Positioning of the symbol actuators*

Referring to Figs. 20 to 26 inclusive, the studs 485 in the Star and CM symbol keys 478, cooperate with a lug 545 on an actuator positioning sleeve 546 loose on a shaft 547, opposite ends of which are journaled in the upper extensions 477 of the base 62. The studs 488 in the "TX" and "IN" keys 478 cooperate with a lug 548 on the sleeve 546, and the corresponding studs in the lower ends of the left-hand row of symbol keys 479 (Fig. 27) cooperate respectively with lugs 549 and 550 on the actuator positioning sleeve 546. Integral with the sleeve 546 is a pinion 551 which meshes with rack teeth in the forward end of the actuator 503 (Fig. 24). The actuator 503 has a vertical slot through which extends a stud 552 in a downward extension of a printed positioning segment 553 rotatably supported by the shaft 172. A spring 554 tensioned between the segment 553 and the bail 174 of the leading frame 175 is tensioned to normally maintain a portion 555 of said segment in resilient engagement with the bail 174.

By way of illustration, depressing the "CM" key 478 (Fig. 24) moves the stud 485, in the lower end thereof, in the path of the lug 545 on the sleeve 546 and simultaneously rocks the zero latch 500 out of engagement with the tooth 502 in the actuator 503 to free said actuator for movement in unison with the leading frame 175. As previously explained, the arm 79 (Fig. 7) rocks the shaft 172 and the leading frame 175 first counter-clockwise and back to normal position. The spring 554 causes the segment 553 to move in unison with the bail 174 during initial movement counter-clockwise of the leading frame 175 to shift the actuator 503 rearwardly, which in turn revolves the sleeve 546 clockwise until the lug 545 contacts the stud 485 of the depressed symbol key 478. This prevents further movement of the actuator 503 and the segment 553 and differentially positions said actuator and said segment in accordance with the depressed symbol key. The leading frame 175 completes its initial movement counter-clockwise independently of the segment 553, flexing the spring 554. The differential positioning of the segment 553 is transmitted to a symbol type sector 556 (Fig. 24) by a link 557 which connects a rearward extension of said segment 553 to the sector 556.

The symbol type sector 556 is pivotally connected to the upper end of an arm 558 loose on the printer shaft 128 and has connected thereto a control plate 559, also loose on the shaft 128. When the segment 553 moves away from zero or home position a stud 560 in a forward extension thereof engages an arcuate surface 561 of the tail of a zero elimination pawl 562 pivoted on the shaft 188 in the printer framework, and rocks said pawl counter-clockwise against the tension of a spring 564 to disengage the tooth of said pawl from a similar tooth in the plate 559 to free the arm 558 and the sector 556 for printing movement.

After the shaft 172 (Figs. 7 and 24) and the leading frame 175 complete their initial movement counter-clockwise, the roller 176 in cooperation with the camming groove 163 rocks the arm 164 and the aliner shaft 162 clockwise to engage the alining bar 160 with one of a series of tooth spaces in the downward extension of the segment 553 to aline said segment and the printing sector 556 in set positions. After the segment 553 and the sector 556 have thus been positioned continued movement clockwise of the printer shaft 128 rocks a printing release trigger 182 counter-clockwise out of engagement with a tooth in the plate 559 to free said plate, the arm 558, and the printing sector 556 to the action of the spring 185 to print a symbol characteristic of the depressed symbol key upon a record sheet 410 (Fig. 3) wound around the platen roll 67.

The different symbols have one interpretation when used in connection with debit items and another interpretation when used in connection with credit items. These different interpretations are given in the two columns on the upper portion of the record sheet 410 headed respectively "Debits" and "Credits." For example: "CM" when used with a debit item means "Charge Memo" and when used with a credit item means "Credit Memo." Therefore the ".67 CM" item in the Check column of the record sheet may be a bookkeeping charge and the "600.00 CM" item in the deposit column may be a check deposited to the credit of this particular account.

After imprinting is completed, the alining bar 160 (Fig. 24) is disengaged from the segment 553 and return movement clockwise of the leading frame 175 picks up the segment 553 and returns it and the actuator 503 to their home positions. After the actuator 503 is returned to zero or home position, the depressed symbol key is automatically released to permit the zero latch 500 to the spring-returned clockwise to effective position, as here shown, to retain the actuator 503 in home position in case the machine is operated with no symbol key depressed. When the actuator 503 and the segment 553 are retained in home or zero position by the latch 500, the zero elimination pawl 565 remains effective as here shown, to obstruct printing movement of the plate 559, the arm 558 and the symbol sector 556.

*Release mechanism for the symbol keys*

Mechanism is provided to automatically release the depressed symbol key at the end of non-adding, adding and subtracting operations and at the beginning of total and sub-total operations. Connections between the automatic releasing mechanism, and the Release key 73 (Fig. 27) for the main keyboard, provide manual means for releasing the symbol keys. A manually operated device is provided for controlling both the automatic and manual releasing means for the symbol keys. The date keys are stay-down keys and consequently are never automatically released. However, the Release key 484 (Fig. 2) provides a manual means for releasing the depressed date keys. The key releasing mechanism will now be described in detail.

The symbol key release shaft 519 (Figs. 27, 28 and 32) in addition to having lugs 517 and 518 for the locking detents 505 and 492, has a similar lug 566 which cooperates with a rearward projection 567 of a control plate 568 pivoted at 569 to a slide 570 mounted for horizontal sliding movement in the auxiliary keyboard framework by means of a slot, in an upward extension thereof, cooperating with a rod 571 supported by the plates of the auxiliary keyboard and by means of an opening in the back plate 472 through which the rearward end of said slide 570 extends. The end of the slide 570, which protrudes through the opening in the back plate 472, has a slot which cooperates with a stud 572 in one end of a link 573 (Fig. 27), the other end of which is pivotally connected to one arm of a crank 574 secured on the key release shaft 219 for the main keyboard and journaled in the framework of said keyboard. The release shaft 219 is connected to the bar 209 by the arm 218 as explained before and the manner in which the bar 209 releases the depressed symbol keys will be explained later.

A spring 581 (Figs. 20, 27 and 28) urges the control plate 568 counter-clockwise to normally maintain an extension 582 thereof in contact with the periphery of a cam 583 secured on a shaft 584 journaled in the end plate 473 and several of the partition plates 475. Secured on the right-hand end of the shaft 584 and protruding through an opening in the case 65 is a knob 585 for manually rotating the cam 583. The knob 585 and the cam 583 have two positions, "Stay-Down" and "Not Stay-Down," and when said knob and said cam are in "Stay-Down" position, as shown in Fig. 27, the high portion of the periphery of the cam 583 positions the control plate 568 so that the projection 567 thereof is out of the path of the lug 566 on the shaft 519. Consequently when the slide 570 is reciprocated, first rearwardly and then back to normal position, either manually or automatically, in a manner presently to be described, no movement is imparted to the shaft 519 and therefore the depressed symbol key will not be released.

Turning the knob 585 to "Not-Stay-Down" position, as shown in Fig. 28, moves a low portion of the periphery of the cam 583 opposite the extension 582 to permit the spring 581 to rock the control plate 568 counter-clockwise to move the projection 567 thereof upwardly into the path of the lug 566. This causes the reciprocating movement of the slide 570 to rock the shaft 519, and the lugs 517 and 518 first counter-clockwise to shift the locking detents 505 and 492 (Figs. 24 and 27) rearwardly to disengage the corresponding hook 491 of either of said detents from the pin 504 or 490 in the depressed symbol key 479 or 478 to permit said key to be spring-returned upwardly to undepressed position. Two notches in the periphery of the cam 583 (Figs. 20 and 28) corresponding to the "Stay-Down" and the "Not-Stay-Down" positions of said cam, in cooperation with a stud 586 in a spring-pulled slide 587, maintain the cam 583, the shaft 584 and the knob 585 in set positions. The slide 587 is slidably mounted on the shaft 584 by a slot therein in cooperation with a collar on said shaft.

Depressing the release key 73 (Fig. 27), by means of the link 207, shifts the bar 209 rearwardly, which, by means of the stud 217 in cooperation with the arm 218, rocks the shaft 219 and the crank 574 counter-clockwise. Counter-clockwise movement of the crank 574 by means of the link 573, shifts the slide 570 rearwardly to release the depressed symbol key in the manner explained above.

In non-adding, adding, and subtracting operations return movement clockwise of the main shaft 78 and the disc 229 shifts the bar 209 rearwardly to rock the shaft 219 counter-clockwise, as explained previously, which by means of the crank 574 and the link 573 shifts the slide 570 rearwardly to rock the symbol key release shaft 519 counter-clockwise, when the knob 585 (Fig. 20) is in "Not Stay-Down" position, to release the depressed symbol key near the end of machine operation. When the pawl 225 (Fig. 27) is disengaged from the roller 228 the bar 209 and connected mechanism are returned to normal positions by the springs 497.

In the beginning of total and sub-total operations, the bar 209 is shifted rearwardly, as explained previously, in order to release any amount keys that have been inadvertently depressed. This shifting of the bar 209 likewise releases any depressed symbol key when the knob 585 is in "Not Stay-Down" position.

Selecting any of the totalizers for a total or sub-total operation rocks the lever 234 clockwise, in the well known manner, (Fig. 27) to permit the spring 226 to engage the notch 240 in the pawl 238 with the roller 241. Initial movement counter-clockwise of the shaft 78 and the disc 229 causes the roller 245 to engage the hump 246 on the lever 242 to rock said lever counter-clockwise to shift the pawl 238 and the bar 209 rearwardly to release any depressed amount or symbol keys at the beginning of machine operation. After the keys have been released, the pawl 238 is disengaged from the roller 241 when the roller 247 engages the raised portion 248 of said pawl 238. This permits the bar 209 and associated mechanism to be immediately spring-returned forwardly to normal position, as here shown.

Date keys

The auxiliary keyboard includes a plurality of date keys for recording the date upon the record material. There are three rows of month keys 480 (Fig. 2) each of which has a locking detent and a control plate similar in every respect to the detent 492 and the control plate 496 (Figs. 24 and 25) for the symbol keys 478. The locking detents for the three rows of month keys are tied together by means of lugs on a shaft in exactly the same manner as the locking detents for the two rows of symbol keys 478 and 479 are tied together by the lugs 517 and 518 on the shaft 519.

The three control plates for three rows of month keys are coupled for unitary movement by means of lugs on a shaft in cooperation with notches in the forward ends of said control plates, said lugs and said shaft being similar to the lugs 507 and 508 and the shaft 509 (Fig. 32) which connect the control plates for the symbol keys 478 and 479. The three control plates for the month keys control a zero latch similar to the zero latch 500 (Fig. 24) which normally latches a month actuator 590 (Fig. 6) in zero position. The month actuator 590 is positioned under control of the depressed month keys in the same manner as the symbol actuator 503 and said month actuator, by means of a month segment (not shown) similar to the symbol segment 553 (Fig. 24), positions a month printing sector 590 (Fig. 11), commensurate with the value of the depressed month key.

Referring to Fig. 2, there is a single row of three tens of days keys 481, which, when depressed, position a tens of days actuator 593 (Fig. 6) and its associated tens of days printing sector 594 (Fig. 11) commensurate with the value of said depressed tens of days keys.

There are three rows of three keys each of units of days keys 482, which in exactly the same manner as the symbol keys 478 and 479 and the month keys 480, position a units of days actuator 595 and its associated units of days printing sector 596 (Fig. 11) in agreement with the depressed units of days key to record the value of said key.

There is a single row of four year keys 483 (Fig. 2), and depressing any one of these keys, positions a year actuator 597 and its associated year printing sectors 598 (Figs. 6 and 9) in agreement with the depressed year key.

Referring to Fig. 9, the date printing sectors are supported by arms 599, similar to the arm 558 (Fig. 24) that supports the symbol sector, and said arms 599 are rotatably supported by the shaft 128. The arms 599 each has a projection 600, which cooperates with a slot 601 in the bail of a yoke 602, extending between two similar arms which are pivotally supported by the screws that support the arms 440 (Fig. 7) for the amount and item control bar 441. Normally the slot in the bail 602 obstructs printing movement of the date sectors. However, tabulating the traveling carriage to a column on the ledger sheet 410 where the date is to be recorded, causes an extension 603, (Figs. 1, 7 and 11) on the control element 192 or 444, to engage a camming extension 604 of the bail 602 to lift the slot in said bail out of the path of the projection 600 to free the date sectors for printing movement.

In addition to being dependent upon the tabulation of the traveling carriage to the proper columnar position, the printing of the date is also dependent upon the movement of one or more amount actuators 166 (Fig. 4) away from zero position. Movement of the amount actuators away from zero position may be effected during a machine operation following the depression of one or more amount keys 71, or during an operation in which one of the totalizers is conditioned for a total or sub-total operation. The month group of keys has a zero elimination pawl 605, (Figs. 11 and 12) the tens of days keys a pawl 606, the units of days keys a pawl 607, and the year keys a pawl 608, similar to the amount zero elimination pawls 187. Each of the zero elimination pawls has a tooth on the upper end which cooperates with a similar tooth 609 on a release plate 610, connected to the arms 599 for the respective groups of date keys. The date zero elimination pawls work in exactly the same manner as the symbol pawl 562 (Fig. 24) to release the date sectors for printing movement when the date actuator moves away from zero position.

The units of days pawl 607 (Figs. 11 and 12) has a bent-over ear 611 that overlies the tens of days pawl 606. Consequently, when a key is depressed in the tens of days group the zero elimination pawl 607 for the units of days keys is released so that the zero will print. In addition to the regular zero elimination pawl, each of the groups of date keys has an auxiliary elimination pawl 612, loose on the rod 188 and having a tooth which cooperates with the projection 609 of their respective plates 610. The four auxiliary pawls 612 and the ten-cent pawl 614 are connected for unitary movement by a rod 613. The ten-cent zero elimination pawl 614 is similar in every respect to the one-cent zero elimination pawl 187 (Fig. 12) and is connected for unitary movement with said pawl by a stud 615. The reason the one-cent and ten-cent zero elimination pawls 187 and 614 are connected for unitary movement is so that a zero will print in either denomination when a key is depressed in the other denomination. The overlying studs and the ears 465 and 466, between the zero elimination pawls (Fig. 11) cause the ten-cent and one-cent pawls 614 and 187 to rock to ineffective position when a key is depressed in any higher order denomination. It is therefore evident that whenever an amount key is depressed in any order, or whenever the amount actuators move out of zero position in total or sub-total operations, the ten-cent pawl 614 will be rocked to ineffective position, and by means of the rod 613 will carry the auxiliary pawls 612 for the date printing sectors to ineffective position in unison therewith. Of course the main zero elimination pawls for the date banks prevent the printing operation of the date type sectors unless keys are depressed in their respective banks, irrespective of whether or not the auxiliary pawls 612 are moved to ineffective positions.

From the foregoing description it is evident that the printing of the date depends upon the fulfilling of two conditions, namely, tabulation of traveling carriage to the proper columnar position and movement of one or more of the amount actuators out of zero position, effected either by depression of an amount key or by a total or sub-total operation in one of the totalizers.

*Release of date keys*

The date keys are not automatically released at the end of machine operation but may be manually released, when desired, by means of the release key 484 mounted in the framework of the auxiliary keyboard in alinement with the second row of units of days keys 482 (Figs. 2 and 31).

Using the second row of units of days keys illustrated in Fig. 31 as an example of all of the rows of date keys, it will be recalled that each row of date keys has a locking plate or detent 616 slidably mounted between rollers connected to the partition plate 475 for each respective row of keys. A spring 617 urges the detent 616 forwardly to normally maintain the angular noses of hooks in said detent in contact with pins 618 in the date keys 482. Depression of a date key 482 shifts the detent 616 rearwardly until the pin 618, in the key being depressed, moves beyond the corresponding hook in said detent 616 whereupon the spring 617 returns the detent forwardly to latch the hook over the pin to retain the key depressed. Depressing another key in the same row shifts the detent 616 rearwardly to release any previously depressed key and to retain the latter key depressed.

At the beginning of a machine operation, the mechanism shown in Fig. 29 and explained previously in connection with the symbol keys, rocks the shaft 521 clockwise ninety degrees to cause the walls of the slots in said shaft, which are normally in regsiter with the upper edges of the detents 616, to obstruct said detents against movement to lock the depressed keys against release and to prevent depression of any undepressed keys during machine operation. Near the end of machine operation the shaft 521 is returned counter clockwise to normal position as shown in Fig. 31.

Where there are more than one row of keys in a group, for example, the month keys and the units of days keys, the detents 616 for the different rows of keys of one group, are connected together for unitary movement by means of notches in the upper edge of said detents in cooperation with lugs 619 integral with a shaft 620 to unite the several rows of keys into a single group.

Depressing the release key 484 (Fig. 31) causes a stud 621 therein to rock an arm 622 and a shaft 623, to which said arm 622 is secured, counter clockwise against the action of a torsion spring 624. The shaft 623 is journaled in the partition plates 475 and has secured thereto an arm 625 for each group of date keys. Counter clockwise movement of the shaft 623 upon depression of the release key 484 causes the camming surfaces on the ends of the arms 625 to engage lugs integral with the shaft 620 and similar to the lug 619, to rock said shaft counter clockwise to shift the detents 616 rearwardly to disengage the hooks in said detents from the pins 618 of the depressed keys to allow said keys to be spring-returned upwardly to undepressed position. When pressure is removed from the release key 484, the torsion spring 624 returns said key, the shaft 623, arms 622 and 625, to normal position, as here shown, whereupon the spring 617 returns the locking detent 616 forwardly to normal position. The single rows of tens of days keys 481 and year keys 483 are released by the release key 484 in exactly the same manner as described for the month key 480 and the units of days keys 482.

Black key mechanism

In using an accounting machine such as that disclosed in the present application for balancing individual checking accounts, it is the general practice to print debit items, such as checks drawn against the account, in a distinctive color, such as red. However, in some business systems it is the practice to print debit items in black, and when so printed an identifying character or symbol is generally printed in conjunction therewith. To take care of such a condition the auxiliary keyboard of the present machine has been equipped with a Black key 626, depression of which disables the mechanism that causes the inking ribbon to be moved to red printing position during substract operations, thus permitting the black portion of the inking ribbon to be moved to printing position. Depressing the Black key also causes an identifying symbol to be printed opposite the amount when one or more of the amount keys is depressed, and when the traveling carriage is tabulated to a subtract column. Ordinarily the Black key is automatically released at the end of each machine operation. However, means is provided for locking the black key in depressed position if desired.

Subtract operations

Referring to Fig. 3, it will be noted that the Check column of the ledger sheet 410 is wide enough for the amounts of three checks to be printed in line, and if there are more than three checks to be listed at one time, after the third entry the operator retains the starting bar 74 (Fig. 7) depressed which causes the traveling carriage to be automatically returned to the first division of the Check column, and simultaneously line-spaces the platen. After this, the amounts of three more checks may be entered in a line and this procedure may be repeated as many times as necessary.

The Control elements 192 (Fig. 14) mounted upon the stop bar 193 carried by the traveling carriage, are positioned on said bar corresponding to the three divisions of the Check column, and are operable to position the ledger sheet 410 in relation to the printing mechanism, and select and condition the balance totalizer for a subtract operation in the following manner:

When any of the divisions of the Check column is opposite the printing mechanism, the lug 344 (Fig. 14) on the Control element 192 engages the upturned end of the hanging bar lever 194, causing said lever to rock the lever 340 (Figs. 13 and 19) counter-clockwise, which in turn rocks the lever 420 counter-clockwise to Condition the #1 or balance totalizer for a subtract operation in the manner explained near the beginning of this specification. The balance totalizer may be conditioned for a subtract operation by depressing the Subtract key 73, which also rocks the lever 420 clockwise in the manner explained earlier herein.

Ribbon mechanism

The bichrome inking ribbon 50 (Fig. 1) is wound around two reversible spools 627 mounted upon the machine case 65 and positioned so as to feed the ribbon 50 between the type sectors and the platen roll 67. The ribbon 50 is threaded between upwardly extending prongs of a ribbon shifting fork 628 (Figs. 6 and 18) which straddles all the printing sectors. The fork 628 has bent-over ears which embrace respectively uprights 629, secured to a top plate 630 of the printer assembly. A downward extension of the fork 628 has symmetrical right-angled ears 631 slotted to embrace opposed tenons of a stud 632 secured in the forward end of a lever 633 pivoted at 634 to the cross-frame 63. The rearward end of the lever 633 is connected by a link 635 to an arm 636 of a yoke 637 pivoted on trunnions 638 in extensions of the frame 63. Another arm of the yoke 637 carries a stud 640, which extends through a slot in one end of a link 641, the other end of which is pivotally connected to a lever 639 secured to the printer shaft 128. A spring 642, tensioned between the stud 640 and the link 641, urges the yoke 637 clockwise to normally maintain the stud 640 in contact with the forward end of the slot in the link 641. By referring to Fig. 7 it will be remembered that oscillation of the arm 79 rocks the printer shaft 128 and the arm 639 first clockwise and then back to normal position. This movement of the arm 639 (Fig. 18), by means of the link 641, the yoke 637 and the lever 633, shifts the fork 628 and the ribbon 50 upwardly to printing position and then back to normal position each machine operation.

A stud 643 in the arm 636 of the yoke 637 (Figs. 6 and 18) cooperates with a hook 644 pivoted to a bracket 645 adjustably attached to an extension of the cross-frame 63. The bracket 645 and the hook 644 are adjustable in relation to the stud 643 by means of a slot in said bracket which straddles an eccentric 646 (Fig. 6) secured in an extension of the frame 63. The eccentric 646 also forms a bearing for a color shaft 647, opposite ends of which are journaled in downward extensions of the cross-frame 63. A spring 648 urges the hook 644 clockwise to normally maintain an extension 649 thereof in contact with a stud 650 in a crank 651 secured to the shaft 647.

When the shaft 647 is in its counter-clockwise position, as here shown, the crank 651 positions the hook 644 so that it is in the path of the stud 643 and consequently said hook 644 obstructs full movement clockwise of the yoke 637 to cause the ribbon fork 628 to be lifted to a position where the upper or black edge of the ribbon 50 is interposed between the type sectors and the platen 67.

Conditioning the machine for a subtract operation, either by tabulating the traveling carriage to a subtract column or by depressing the subtract key 73, causes the inking ribbon 50 to be lifted to its red printing position in the following manner:

The balance totalizer subtraction conditioning lever 420 (Fig. 19) is pivotally connected by a link 652 to a lever 653 fulcrumed on a stud 654 in the left frame 61. The lever 653 has connected thereto the lower end of a link 655, the upper end of which is slotted to receive a stud 656 in a color shaft shifting link 657, the rearward end of which is pivotally connected to a crank 658 secured on the color shaft 647. A spring 659 tensioned between the links 655 and 657 normally maintains the stud 656 in the bottom of the slot in the link 655.

Selecting and conditioning the balance totalizer for a subtract operation, either by means of control elements on the traveling carriage or by depressing the Subtract key 73, rocks the lever 420 counter-clockwise which, by means of the link 652, rocks the lever 653 clockwise to lower the hook-shaped forward end 665 of the link 657 into the path of a stud 666 secured in the balance totalizer engaging link 430. Initial movement counter-clockwise of the main shaft 78 and the engaging plate 429 shifts the link 430 forwardly to engage the balance totalizer with the actuators in subtract time. Forward movement of the link 430 causes the stud 666 to engage the hook 665 to rock the shaft 647 and the crank 651 (Fig. 18) clockwise. Clockwise movement of the crank 651, by means of the stud 650 in cooperation with the extension 649, shifts the hook 644 counter-clockwise out of the path of the stud 643. Therefore, in subtract operations, movement of the yoke 637 is not limited by the hook 644 and consequently the inking ribbon 650 is raised its full distance upwardly to interpose the red or lower section of the ribbon between the type carriers and the platen. When the inking ribbon is shifted to red printing position, clockwise movement of the yoke 637 is terminated by the stud 643 coming in contact with a shoulder 667 (Fig. 18) on a bracket 668 secured to the frame 63 (Fig. 6).

Under normal conditions, the color shaft 647 is returned counter-clockwise to blank printing position at the end of each machine operation. This is accomplished by means of the mechanism shown in Fig. 17 and comprising a crank 669 secured on the color shaft 647, the upper end of said crank being bifurcated to straddle a stud 670 in a pitman 671, slidably mounted in slots in the cross-frame 63 and the printer framework. The pitman 671 carries a stud 672 which extends through a slot in a by-pass pawl 673 urged rearwardly by a spring 674 which normally maintains a bent-over ear 675 on said pawl in contact with the bottom of a notch in the link 671.

When the color shaft 647 is rocked clockwise to red printing position, the pitman 671 and the by-pass pawl 673 move in unison therewith until said pawl is in the position indicated by dot and dash lines in Fig. 17. Initial movement clockwise of the printer shaft 128 and the arm 639 causes a stud 676 in said arm, in cooperation with the bifurcated lower end of a lever 678 pivoted on a stud 677 in the printer frame, to rock said lever 678 also clockwise to cause the upper end thereof to by-pass the tooth of the pawl 673. Return movement counter-clockwise of the arm 639, after printing has been effected, causes the lever 678 to engage the pawl 673 and return the pitman 671 and the color shaft 647 counter-clockwise to black printing position. After the pitman 671 is fully restored to black printing position, the pawl 673, due to the slot therein, and the spring 674, moves on independently of said pitman in unison with the lever 678 until the angle of the slot in the pawl 673 causes the tooth of said pawl to ride off the end of the lever 678. The spring 674 then restores the pawl 673 beyond the end of the lever 678 so that said lever will not interfere with rearward movement of the pitman 671 when the color shaft 647 is again rocked clockwise to red printing position.

*Disabling of red printing mechanism by the black key*

Depressing the Black key 626 renders the mechanism shown in Fig. 19 ineffective to shift the color shaft 647 to red printing position in subtract operations. The upper end of the Black key 626 extends through an opening in the angular top plate 471 of the auxiliary keyboard, while the lower end of the stem of said key carries a stud 679 which extends through a vertical slot in the key guide plate 486 which is connected to the partition plate 475 for the Black key. A spring 680 stretched between two stationary studs, in cooperation with a stud in the stem of the key 626, urges said key upwardly and normally maintains said key in undepressed position. The key 626 carries a flat-topped pin 681, which cooperates with a hook in a locking detent 682 and an angular camming surface on a control plate 683, said detent and said control plate being slidably mounted upon the partition plate 475 in exactly the same manner as the detent 492 and the control plate 496 for the row of symbol keys shown in Figs. 24 and 25 and explained earlier herein. A spring 684 stretched between the detent 682 and the control plate 683 maintains the angular nose of the hook in said detent and the angular camming surface on the control plate in resilient contact with the pin 681. Depressing the Black key 626 causes the pin 681 to move the detent 682 rearwardly until the hook of said detent moves beyond the flat top of said stud 681 whereupon the spring 684 returns the detent 682 forwardly to cause the hook to latch the key in depressed position.

Depressing the Black key 626 (Figs. 19 and 20) causes the end of the stem thereof, in cooperation with a roller 685 in a lever 686 fulcrumed at 687 to the auxiliary keyboard end plate 474, to rock said lever 686 clockwise. The lever 686 is pivotally connected by a link 688 to an arm 689 pivoted on the stud 654, consequently clockwise movement of the lever 686 rocks the arm 689 counter clockwise to move the rounded upper end thereof under a roller 690 carried by the link 657. This obstructs downward movement of the link 657 when the traveling carriage is subsequently tabulated to a Subtract column or when the Subtract key 73 is depressed, and thereby prevents shifting of the color shaft 647 clockwise to red printing position, to cause subtractive items to be printed in black.

The spring 659 and the slot in the upper end of the link 655 permit movement of said link 655 independently of the link 657 upon selection of the balance totalizer for a subtract operation. In case the traveling carriage has been tabulated to a Subtract column or in case the Subtract key 73 has been depressed prior to depression of the Black key, depression of said Black key causes the rounded nose of the arm 689 in cooperation with the roller 690 to shift the link 657 upwardly to move the hook 665 of said link out of the path of the stud 666.

A knob 691 (Figs. 19 and 27) similar to the knob 585 for the symbol keys controls mechanism exactly like that for the symbol keys for releasing the Black key 626 at the end of machine operation or for rendering the releasing means ineffective to thereby cause said key to stay down. This mechanism functions in exactly the same manner as the mechanism for the symbol keys, and it is though unnecessary to further describe said mechanism. Moreover, the Black key 626 may be released manually by the regular Release key 73 (Fig. 27), by means of similar mechanism and in exactly the same manner as the symbol keys, and it is also believed unnecessary to further explain this manual releasing mechanism. During machine operations the shaft 521 (Fig. 19) obstructs rearward movement of the locking detent 682 to prevent release or depression of the Black key 626 during machine operations. The manner in which this shaft 521 is moved to and from effective position has been fully explained in connection with the symbol keys.

Black key control of symbol printing

When the Black key 626 is used to cause subtractive items to be printed in black, an identifying symbol, in this case a minus sign, is printed to the right of the amount. The minus symbol for the black key is located in the zero or neutral position of the symbol sector 556 (Fig. 18). This position is not needed for the symbol keys, because when no symbol key is depressed the pawl 562 retains the symbol sector 556 against printing movement.

When the #1 or balance totalizer is selected and the machine is conditioned for a subtract operation by means of control elements on the traveling carriage, and the Black key 626 is depressed, mechanism effective at the beginning of machine operation and dependent upon the depression of one or more amount keys for effectiveness, rocks the zero elimination pawl 562 for the symbol printing sector 556 out of engagement with the symbol printing arm. This permits said arm and the symbol sector to make a printing stroke to print the minus symbol opposite the amount to identify said amount as a subtractive item.

The arm 196, which is secured on the main shaft 78 (Fig. 19) has an extension 664, which cooperates with a stud 692 in the lower end of a pitman 693 pivotally connected to a lever 694 fulcrumed on a stud 695 in the left frame 61. The forked upper end of the pitman 693 straddles a stud 696 in a crank 697 secured on a shaft 698, one end of which is journaled in a bracket 699 (Fig. 11) secured to the cross-frame 64. The righthand end of the shaft 698 is journaled in the right side plate of the printer mechanism. Also secured on the shaft 698 is a crank 700 (Figs. 11 and 18) bifurcated to embrace a stud 701 in a slide 702 mounted to shift vertically upon the one-cent zero elimination pawl 187. The slide 702 has a projecting finger 703 which co-operates with a stud 704 in the upper end of the symbol pawl 562. A flexible connection between the shaft 698 and the pitman 693 is formed by a spring 705 tensioned between the stud 696 and said pitman 693.

Tabulating the traveling carriage to a Subtract column causes one of the control elements 192 (Figs. 14 and 19) to rock the Subtract hanging bar lever 194 clockwise, which in turn rocks the lever 340 counter-clockwise to move a bent-over ear 706 on an extension thereof out of the path of a projection 707 on the lever 694. Depressing the Black key 626 shifts the link 688 forwardly, causing a stud 708 in said link, in cooperation with the slotted end of an arm 709, to rock said arm clockwise on its pivot 710 in the left frame 61. Clockwise movement of the arm 709 moves the upper end thereof out of the path of a stud 711 in an extension of the lever 694. This frees the lever 694 for counter-clockwise movement. Consequently, upon operation of the machine initial movement counter-clockwise of the main shaft 78 and the arm 196 withdraws the extension 664 of said arm from the stud 692, permitting a spring 712 to shift the pitman 693 upwardly to rock the shaft 698 counter-clockwise. Counter-clockwise movement of the shaft 698 and the crank 700 (Figs. 11 and 18) shifts the slide 702 upwardly to move the finger 703 into the path of the stud 704.

Depression of an amount key in any order causes the zero elimination pawl for that order and all of the lower orders to be rocked to ineffective position so that the zeros of the lower orders will be recorded. Therefore, depression of any amount key causes the one-cent pawl 187 to be rocked counter-clockwise upon operation of the machine, which movement by means of the finger 703, in cooperation with the stud 704, rocks the symbol pawl 562 in unison therewith to ineffective position. This frees the printing type sector 556 (Fig. 18) for printing movement when in neutral or zero position, to cause the minus sign to be recorded besides the subtractive item which, as previously stated, is printed in black, to distinguish said subtractive item from other items.

From the foregoing description it is evident that depression of the Black key 626 causes the mechanism that normally shifts the inking ribbon 50 to red printing position in subtract operations to be rendered ineffective, and as a result the black portion of the ribbon is raised into printing position to print subtractive items in black. Moreover depression of the Black key causes the symbol sector to be released in its zero position to print an identifying symbol adjacent the subtractive item. During the latter part of a subtract operation, return movement clockwise of the shaft 78 and the arm 196 (Figs. 18 and 19) moves the finger 703 out of the path of the stud 704 in the symbol pawl 562. The flexible connection formed by the spring 705 prevents strain or injury to any of the parts due to a binding between the finger 703 and the stud 704 prior to return movement of the amount elimination pawls 187 to normal or effective positions.

Repeat print of overdraft

The Sub-Balance of Overdraft key 77 (Figs. 2 and 7) was known as an Overdraft key in former machines of this type such as that illustrated in the United States patent to Lee, No. 2,079,355. In former machines, depressing the Overdraft key initiated an overdraft operation consisting of three cycles of movement, and during these three cycles the complementary amount of the overdraft was transposed to a true negative balance and in the last cycle of an overdraft operation this true negative balance was cleared from the machine and recorded on the ledger sheet. In the present machine the Sub-Balance of Overdraft key 77 is likewise used to initiate an operation consisting of three cycles. However, during the third cycle of the operation the balance totalizer is operated in a sub-total operation instead of being cleared, and the true negative balance is thus preserved and may be printed in a subsequent balance operation. This repeat print of the overdraft feature is particularly desirable for recording the true negative balance upon the main and the stub portions of a ledger sheet such as that shown in Fig. 3.

During the first two or transposing cycles of a sub-balance of overdraft operation the printer mechanism is disabled to prevent erroneous entries upon the ledger sheet. However, the printer mechanism is enabled at the beginning of the third cycle of a sub-balance of overdraft operation in order that the overdraft may be recorded. The disabling of the printer mechanism during the first two cycles of a sub-balance of overdraft operation renders mechanism effective that causes the inking ribbon 50 to be raised to red printing position during the printing cycle of a sub-balance of overdraft operation in order that the overdraft may be printed in a distinctive color, for easy identification. At the end of a sub-balance of overdraft operation, as well as all other operations, the mechanism shown in Fig. 17 and described earlier herein returns the color shaft 647 to black printing position so that intervening items, that is, items printed between the time of printing the sub-balance and the balance of the overdraft, will be printed in black.

However, during a sub-balance of overdraft operation, a condition is set up whereby the next time the balance totalizer is selected for a balance operation the color shaft 647 will be automatically moved to red printing position to record a repeat print of the overdraft in a distinctive color. After the repeat print of the overdraft the ribbon mechanism is restored to black printing position. The mechanism for causing a repeat print of the overdraft to be in a distinctive color will now be described in detail.

Referring to Figs. 7 and 10, the arm 127 on the printer shaft 128 carries a stud 713 which engages a slot in a color shifting link 714, the rearward end of which is pivotally connected to a crank 715 secured on the color shaft 647. A foot 716 of the link 714 is normally in the path of a stud 717 in the arm 164. Ordinarily during machine operation, initial movement clockwise of the printer shaft 128 and the arm 127 moves the foot 716 downwardly out of the path of the stud 717 prior to initial movement clockwise of the arm 164, and in this case the stud 717 imparts no movement to the link 714. In sub-balance of overdraft operations, depressing the Sub-Balance of Overdraft key 77 rocks the cam 134 out of engagement with the stud 133 (see also Fig. 35) to permit the spring 136 to shift the lever 131 clockwise, which movement by means of the link 129 shifts the link 125 out of engagement with the stud 124 in the arm 79 and into engagement with the stationary stud 139 to render the printer mechanism inoperative during the first two cycles of a sub-balance of overdraft operation. This retains the foot 716 in the path of the stud 717; consequently clockwise movement of the arm 164 shifts the link 714 rearwardly to rock the color control shaft 647 clockwise to move the pawl 644 (Fig. 18) out of the path of the stud 643. This causes the inking ribbon to be lifted to red printing position in the third cycle of a sub-balance of overdraft operation in order that the sub-balance of the overdraft will be printed in a distinctive color. Prior to the end of the third cycle of a sub-balance of overdraft operation, the mechanism shown in Fig. 17 returns the color shaft 647 counter-clockwise to black printing position.

Near the end of a sub-balance of overdraft operation, the cam 122 (Fig. 7) rocks the lever 118 counter-clockwise, which, by means of the link 117, disengages the shoulder 108 of the latch 109 from the ear 107 and rocks an arm 718, integral with said latch 109, counter-clockwise in unison therewith. The arm 718 is pivotally connected to one end of a link 719, the other end of which is slotted to receive a stud 720 in an extension of a yoke 721 rotatably mounted on the color shaft 647. Counter-clockwise movement of the arm 718, by means of the link 719, rocks the yoke 721 clockwise to move the upper edge of the bail 722 thereof beneath a hook 723 secured on a shaft 724 journaled in the arms of a yoke 725 loose on the shaft 647 and located between the arms of the yoke 721. A spring connected between the yoke 725 and the hook 723 immediately draws said hook counter-clockwise, as shown in Fig. 40, over the upper edge of the bail 722. A link 726 pivotally connects the yoke 725 to a balance totalizer engaging cam 727 secured on the shaft 432. An arm 728 is secured to the left arm of the yoke 721 by an eccentric 729, by means of which an upward projection 730 of said arm may be adjusted in relation to a stud 731 in a pitman 732 slidably mounted by means of the bifurcated forward end thereof in cooperation with a stud 733 in the righthand printer plate and by means of a groove in the cross-frame 63 (Fig. 7).

In a balance operation following a sub-balance of overdraft operation, depressing the Balance key 73 (Fig. 19) moves a notch in the stem thereof opposite a bent-over ear 734 on a lever 735 pivoted at 404 to the left frame 61, whereupon the lever 735 is spring-urged counter-clockwise to cause a stud in the lower end thereof to rock a lever 737 counter-clockwise to move the engaging pawls 425 and 426 into the path of the flying lever 427. Depressing the Balance key 73 also initiates machine operation in the following manner:

Counter-clockwise movement of the lever 735 (Fig. 19) causes a lever 740 flexibly connected thereto to move in unison therewith to cause a stud in a downward extension of said lever to engage a finger of a lever 741 secured on the shaft 409 journaled in the frames 60 and 61, to rock said arm and said shaft 409 clockwise. Clockwise movement of the shaft 409 (Fig. 6) causes the bifurcated upper end of an arm 742 integral therewith, in cooperation with a stud 743 in the plate 82, to rock said plate counter-clockwise to start the machine operating in the manner explained earlier herein.

Initial movement counter-clockwise of the main shaft 78 (Fig. 19) and the plate 429 causes the flying lever 427 to engage the pawl 425 to rock the arm 431 and the shaft 432 clockwise to engage the wheels of the balance totalizer with the actuators before said actuators start their initial movement rearwardly. Clockwise movement of the shaft 432 and the engaging cam 727 (Figs. 7, 10 and 40), by means of the link 726, rocks the yoke 725 clockwise in unison therewith. The hook 723, in cooperation with the upper edge of the bail 722, carries the yoke 721 clockwise in unison with the yoke 725, to the position shown in Fig. 41, to cause the projection 730 (Fig. 40) to engage the stud 731 and shift the slide 732 rearwardly. This causes a shoulder 744 on said slide in cooperation with a stud 745 in the pitman 671 (Figs. 17 and 43) to shift said pitman rearwardly in unison therewith to rock the color shaft 647 clockwise. Clockwise movement of the shaft 647 (Fig. 18) rocks the pawl 644 out of the path of the stud 643 to permit the inking ribbon 50 to be lifted to red printing position to cause a repeat print of the overdraft to be made in a distinctive color. Rearward movement of the pitman 732 causes a stud 746 (Fig. 40) in the forward end thereof, in cooperation with a hump 747 on a lever 748 loose on the stud 733, to rock said lever clockwise. Clockwise movement of the lever 748 by means of a link 749 positions a signal printing sector 750 to print an identifying signal, in this case "OD", opposite the amount. After the signal sector 750 is thus positioned, clockwise movement of the printer shaft 128 moves the stud 676 in the arm 639, away from a downward extension of an alining pawl 753 to permit said pawl to be spring-impelled clockwise to cause the proper one of a series of notches to engage a stud 754 in the lever 748 to aline the signal sector 750 in set position.

A spring-pulled aliner 755 (Figs. 7 and 41) fulcrumed on a stud 756 in a support plate 757 secured to the frame 191, has two V-shaped notches which, in cooperation with a square stud 758 in an upward extension of the yoke 721, aline said yoke in its home position, as shown in Fig. 7, and in its first moved position, as shown in Fig. 41. The plate 757 also forms a support for the right-hand end of the color shaft 647.

After the yoke 721 has been shifted the full distance clockwise to move the color shaft 647 to red printing position, clockwise movement of the arm 164 (Figs. 7 and 10) shifts a bar 759, the forward end of which is pivoted on the stud 717 and the rearward end of which is slotted to embrace a stud 760 in a downward extension of the aliner 755, rearwardly. Rearward movement of the bar 759 causes the surface 761 on the end thereof to engage a stud 762 in a crank 763 (Figs. 7, 10 and 41) secured on the shaft 724, to rock said shaft clockwise, to the position shown in dot and dash lines in Fig. 41, to disengage the hook 723 from the upper edge of the bail 722. Simultaneously the slot in the bar 759, in cooperation with the stud 769, rocks the aliner 755 counter-clockwise out of engagement with the stud 758 to release the yoke 721 to the action of a spring 764, which immediately returns said yoke counter-clockwise to normal or home position, as shown in Fig. 7. However, during machine operations in which the cam 727 is not rocked to engage the balance totalizer, the stud 762 is out of reach of the bar 759 (see Figs. 7 and 40). Therefore the bar 759 is effective to release hook 723 only after the balance totalizer is in engaged position, as shown in Fig. 41. Therefore the hook 723 is released only during an operation in which the balance totalizer is in engaged position. When the balance totalizer is not in engaged position, the extension 761 cannot reach stud 762. When the bar 759 is returned forwardly, the aliner 755 re-engages the stud 758 and the hook 723 resiliently engages the back surface of the bail 722 upon which it rides idly when rocked by the cam 727 in subsequent operations.

Between a sub-balance of overdraft operation and a subsequent balance operation, operations may be carried on in all totalizers except the balance totalizer without affecting the condition set up in said sub-balance of overdraft operation which causes a repeat print of the overdraft to be in red. In these intervening operations, the ribbon may be shifted from black to red printing position as often as desired and in the usual manner. After the yoke 721 (Fig. 7) has been restored to normal position, the mechanism shown in Fig. 17 returns the color shaft 647 counter-clockwise to black printing or normal position.

It is to be understood, that in the final cycle of a sub-balance of overdraft operation, the balance totalizer is read and the true negative balance is consequently preserved. In a subsequent balancing operation the true negative balance is cleared from the balance totalizer and a repeat print thereof is recorded in the proper column of the ledger sheet. Other transactions, such as adding and subtracting, should not be carried on in the balance totalizer until the true negative balance is cleared therefrom as adding amounts to, or subtracting amounts from the true negative amount of the overdraft would give an erroneous result. While it is possible to record the true negative balance as many times as desired by using the Sub-Balance key 73, still there is no reason for doing this as it is only necessary to print the true negative balance twice, once on the main portion and once on the stub of the ledger sheet, and this may be accomplished in a sub-balance of overdraft operation and a following balance operation.

*Clear signal printing*

The machine of the present invention embraces mechanism to cause a distinctive signal consisting of two zeros and a minus sign to be printed when certain total keys are depressed to show that the totalizers selected by these keys are in a cleared condition. As presently arranged, only the Total New Balance and the Total Check keys cause the clear signal to print when their respective totalizers are in a cleared condition. However, it is a simple matter to have any or all of the total keys control the clear signal printing mechanism.

Referring to Figs. 13 and 16, depressing either the Total Checks or the Total New Balance keys 73 causes studs 765 or 766 respectively in the lower ends of the stems thereof, in cooperation with their respective camming lugs 767 and 768 on a control plate 769 slidably mounted upon the studs 360 adjacent the control plate 350, to shift said control plate 769 rearwardly. Rearward movement of the plate 769 causes the righthand end thereof, as here viewed, to engage a stud 770 in a downward extension of a lever 771 loose on the main shaft 78 to rock said lever 771 counter-clockwise against the action of a spring 772. Counter-clockwise movement of the lever 771 causes the bi-furcated upper extension thereof, in cooperation with a stud 773 in one arm of a yoke 774, see also Figs. 6 and 11, loose on the shaft 254, to rock said yoke clockwise. Clockwise movement of the yoke 774 causes two fingers 775 and 776, integral therewith, in cooperation respectively with extensions 777 and 778 of the symbol and one-cent zero elimination pawls or order hooks 562 and 187, to rock said pawls counter-clockwise, as viewed in Fig. 13, to ineffective positions.

Figure 12:
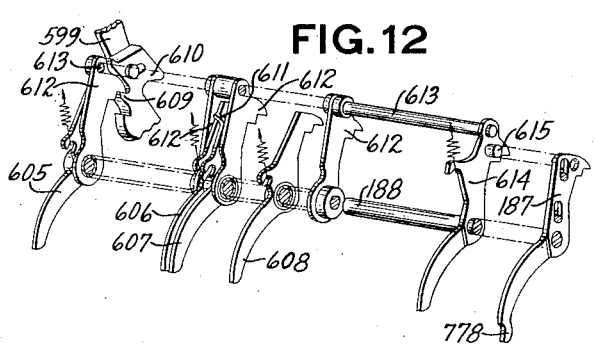
Fig. 12 is a disassembled perspective view illustrating the manner in which the amount zero elimination pawls control the date zero elimination pawls.

It will be recalled by referring to Fig. 12 that the one-cent pawl 187 and the ten-cent pawl 614 are connected together by a stud 615; consequently the ten-cent pawl 614 will be moved to ineffective position by the one-cent pawl 187. The ten-cent, one-cent, and symbol printing sectors are now free to print in their zero positions and upon operation of the machine print a clear signal consisting of "00—" to indicate that the totalizer selected by the Total Checks or Total New Balance keys 73 is in a cleared condition.

In addition to the clear signal, the Total Checks and Total New Balance keys, in cooperation with camming lugs on the control plate 350 (Fig. 13) position the signal sector 750 (Fig. 7) to print an identifying signal for each of these keys. If there is an amount in the Total Checks and Total New Balance totalizers, depressing their respective keys will cause this amount to be cleared therefrom and recorded on the record material, and in this case the minus symbol and a signal characteristic of the key depressed will be printed opposite the amount.

Operation

A brief statement of operation will be given, using the ledger sheet 410 (Fig. 2) as an example.

It is customary for banking institutions to balance individual checking accounts daily, and in so doing the ledger sheets for the different depositors are arranged alphabetically in a convenient stack, from which they are taken one at a time by the operator and placed in the open throat of the front feed platen 67 (Fig. 1) alined with the printing line and the throat closed. It is believed unnecessary to explain the front feed platen and carriage in detail herein, but a complete showing and description of this mechanism may be had by referring to the co-pending application for Letters Patent of the United States, Serial No. 653,838, filed January 27, 1933, by Raymand A. Christian.

Carried by the platen roll, underneath the ledger sheet 410, is a journal sheet 780 (Fig. 1) upon which all the transactions for one day are posted. An interposed carbon sheet between the journal sheet and the ledger sheets causes all the items entered on the various ledger sheets to be duplicated on the journal sheet. The lefthand edge of the journal sheet extends beyond the edge of the ledger sheet, and when the traveling carriage is fully returned to starting position the amount type sectors are in register with this extending portion of the journal sheet.

In starting new ledger sheets, the traveling carriage is tabulated to a place where the Balance column of the main portion of the ledger sheet 410 (Fig. 3) is opposite the amount type sectors. The amount of the previous balance, $1000.00, ascertained from the last entry on the former ledger sheet, is set up on the amount keys, the #1 Add key depressed, and the machine released for operation. In this operation the previous balance of $1000.00 is added in the balance totalizer and simultaneously printed at the head of the Balance column on the main portion of the ledger sheet. The traveling carriage is then skip tabulated to the Balance column of the stub portion of the ledger sheet and in a balance operation the balance totalizer is cleared and the amount of the previous balance, $1000.00, is printed at the head of the Balance column of the stub.

All new ledger sheets are started in this manner, after which they are removed from the machine and made ready for further posting at a later period.

In the first posting operation, after the previous balance has been printed upon the main and stub portions of the balance sheet, the traveling carriage is returned to the extreme starting position, in which position the edge of the journal sheet is in alinement with the amount type sectors, the amount of the previous balance $1000.00 entered on the amount keys, and the machine released for operation. In this operation the previous balance of $1000.00 is added in the balance totalizer and simultaneously printed upon the edge of the journal sheet. After this the traveling carriage is tabulated to the first division of the Check column, which it will be noted, is wide enough for three checks to be entered in a horizontal line. If there are more than three checks to be entered at one posting, the traveling carriage is returned to the first division of the Check column, and the ledger sheet line-spaced in readiness for the entering of the next item.

A description of the entries on the ledger sheet 410 will now be given. On February 14, 1935, three checks for $100.00 each were deducted from the depositor's balance of $1000.00. As there were only three debit items in this transaction, the traveling carriage tabulated automatically to the Deposit column, in which a deposit of $250.00 was added to the depositor's balance. The traveling carriage then tabulated to the Balance column on the main portion of the ledger sheet and in a sub-balance operation a sub-total of the balance, $950.00, was printed in the Balance column and the sub-balance symbol (S) printed opposite the amount.

The traveling carriage then tabulated to the Analysis of Float column on the stub, which is divided into three sections, one for transient checks, one for city checks, and a third division for the amount of the transient checks reduced to a one-day basis. The city checks are always treated as cash. When the traveling carriage tabulated to the Analysis of Float column the control element 450 (Fig. 11) which is opposite this column, in cooperation with the hanging bar lever 453, split the amount keys into three groups for printing the Analysis of Float. This isolated the three groups of keys so that the printing of zeros in each group was independent of the higher orders. In this case there were four transient checks, no city checks, and the total amount of the transient checks reduced to a one-day basis was $150.00. The traveling carriage then tabulated automatically to the Balance column on the stub, and in a balance operation the balance totalizer was cleared and the new balance of $950.00 printed in the Balance column, and an identifying symbol printed opposite the new balance.

As each of the three $100.00 checks was deducted from the depositor's balance, one was automatically accumulated in the wheels of the item-counting device, and in the final balancing operation the wheels of the item-counting device were cleared and the total number of items (3) was printed in the Total Items column of the stub.

On February 15, 1935, a check for $350.00 and two checks for $100.00 each were deducted from the depositor's previous balance of $950.00. The first two checks were automatically counted as they were deducted, but it was not desired to count the third item, and depressing the Subtract key 73 by means of the mechanism shown in Fig. 13 rendered the automatic check counting mechanism inoperative and caused the symbol NC to be printed opposite the amount, meaning non-count. On this particular date there were no deposits, so the traveling carriage was skip-tabulated to the Balance column of the main portion of the ledger sheet and in a sub-balance operation the sub-total $400.00 was printed in the Balance column. After the printing of the sub-balance the traveling carriage tabulated to the Analysis of Float column on the stub, where the different items of the Analysis of Float were entered in their respective divisions. The traveling carriage then tabulated to the Balance column, and depression of the Balance key caused the item and the balance totalizers to be cleared and the total number of items (2) printed in the Total Items column, and the new balance $400.00 printed in the Balance column.

On February 16, 1935, a bundle of 25 checks amounting to $500.00 were deducted from the depositor's previous balance of $400.00. In handling this transaction the total number of checks in the bundle (25) was set up on the item-counting keys, the amount of $500.00 was set up on the amount keys, and the LS symbol key was depressed to distinguish this as a transaction of listed items. Upon operation of the machine the total number of items (25) was added in the item counting wheels, while the amount of the items ($500.00) was subtracted from the previous balance of $400.00. As there were no further checks or deposits to be listed at this time, the traveling carriage was skip tabulated to the Balance column on the main portion of the ledger sheet, and the operator was notified that the Balance totalizer was in an overdrawn condition by the locking of the Sub-Balance key against depression. Depression of the Sub-Balance of Overdraft key 77 causes the complementary amount of the overdraft to be transported to a true negative balance, and a sub-total of this true negative balance printed in red in the Balance column. As there were no entries to be made in the Analysis of Float column, the traveling carriage was skip tabulated to the Balance column of the stub, and upon depression of the Balance key, the balance totalizer was cleared and the true negative balance of $100.00 printed in red in the Balance column of the stub. In this final balancing operation the wheels of the item-counting device were also cleared and the total number of items (25) recorded in the Total Items column.

On February 18, 1935, checks for $50.00, $150.00, $60.00 and $40.00, were deducted from the depositor's true negative balance of $100.00, and a bookkeeping charge of 67 cents was also deducted from the depositor's balance. Depression of the proper symbol key caused the symbol CM to be printed opposite the 67 cent item, to identify this item as a charge memo. Also on February 18, the depositor's account was credited with a deposit of $400.00 and a credit memo of $600.00, which is identified by the symbol CM. In a sub-balance operation the sub-total of the balance $599.33 was printed in the Balance column of the main portion of the ledger sheets. The traveling carriage was then tabulated to the Analysis of Float column, and on this particular day there were eight transient checks, no city checks, and the total amount of the eight transient checks reduced to a one-day basis was $500.00. In a final balancing operation the balance totalizer was cleared and the amount of the new balance, $599.33, was printed in the Balance column of the stub.

In this particular case all of the checks and debit items listed in the Check column of the ledger sheet are printed in red. In some cases it is desirable to have some of these or all of these items printed in black, and depressing the Black key 626, by means of the mechanism pictured in Fig. 19, controls the ribbon shifting mechanism to cause subtractive or debit items to be printed in black instead of red. It will be remembered that extensions on the control elements, opposite the column in which it is desired to have the date recorded, free the date printing sectors for printing movement.

A carriage control lever 781 (Figs. 1 and 2) located on the keyboard controls the functions of the traveling carriage. The lever 781 has three positions. When said lever is in its upper position, as here shown, it is ineffective and the carriage is controlled by the starting bars 74, 75 and 76 in the usual manner. In the particular mode of operation described above the lever 781 is always kept in its upper or ineffective position.

When the lever 781 is in its middle position the automatic tabulation of the carriage is disabled at all times, and when said lever is in its lower position the automatic tabulation is disabled, and the platen 67 receives vertical feeding movement each machine operation.

A full showing and description of the lever 781 and associated mechanism, the starting bars 74, 75 and 76, the tabulating mechanism and the carriage return mechanism may be had by referring to Letters Patent of the United States, No. 2,082,098, filed June 25, 1934, and issued on June 1, 1937, to Raymond A. Christian.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, having printing means to print on record material, a balance totalizer, a two-color inking ribbon, and means to shift the ribbon to control the color in which printing will be done, and adapted to perform overdraft operations in which the complementary amount of an overdraft is transposed to a true negative balance and said true negative balance recorded, the combination of means effective in overdraft operations to control operation of the shifting means for the inking ribbon to cause the true negative balance to be recorded in a distinctive color; and means rendered effective in overdraft operations and operative in the next subsequent operation of the balance totalizer, to control the operation of the ribbon shifting means to cause a repeat print of the true negative balance to be in said distinctive color.

2. In a machine of the character described, having printing means to print on record material, a balance totalizer and adapted to perform overdraft operations, the combination of a two-color inking ribbon; means to shift the ribbon; means operative in overdraft operations to control the operation of the shifting means to cause the ribbon to be moved to a position where the overdraft will be recorded in a distinctive color; means to return the control means for the means to shift the ribbon, to normal control position near the end of each machine operation in which printing occurs; an element associated with the returning means; a rockable member operatively connected to the element; and means rendered effective in overdraft operations and operative to operate the rockable member in the next subsequent operation of the balance totalizer, which, in cooperation with the element and the returning means, causes the control means to control the operation of the shifting means to move the ribbon to a position where a repeat print of the overdraft will be in said distinctive color.

3. In a calculating machine, having printing means to print on record material, a balance totalizer, a two-colored ribbon, means to shift said ribbon to control the color in which printing will take place, and an overdraft mechanism to control the operation of certain parts of the machine to transpose the complementary amount of an overdraft into a true negative balance and store said true negative balance in the balance totalizer, the combination of means effective in overdraft operations to control the ribbon shifting means to cause a true negative balance to be printed in a distinctive color; and means, comprising a rockable element and means to rock said element, rendered effective in an overdraft operation and operative in a balance operation following said overdraft operation to control said ribbon shifting means, to cause a repeat print of the true negative balance to be recorded in said distinctive color.

4. In a calculating machine, having printing means to print on record material, a balance totalizer, a multi-colored ink ribbon, means to shift the ribbon to cause the printing to be done in various colors, control means for said shifting means, and an overdraft device adapted to transpose the complementary amount of an overdraft into a true negative balance and store said true negative balance in the balance totalizer, the combination of means effective in overdraft operations to operate the control means to cause the ribbon shifting means to cause the true negative balance to be printed in a distinctive color; and means rendered effective in an overdraft operation and operative in a balance operation following said overdraft operation to operate the control means, to cause the ribbon shifting means to cause a repeat print of the true negative balance to be recorded in said distinctive color.

5. In a machine of the class described, having printing means to print on record material, a balance totalizer, a multi-colored ink ribbon, and means for shifting said ribbon to cause printing in various colors, and adapted to perform overdraft operations, in which the complementary amount of an overdraft is transposed to a true negative balance and said true negative balance stored in the balance totalizer, the combination of means effective in overdraft operations to control the ribbon shifting means to cause the true negative balance to be printed in a distinctive color; a device having movement imparted thereto during an overdraft operation; and means rendered effective by the device and operative in a balance operation following an overdraft operation to control the ribbon shifting means to cause a repeat print of the true negative balance to be in said distinctive color.

6. In a machine of the character described, having printing means to print on record material, a balance totalizer, a multi-colored ink ribbon, and means to position the ribbon to cause printing to be performed in different colors, and adapted to perform overdraft operations, in which the complementary amount of an overdraft is changed into a true negative balance, stored in the balance totalizer and recorded in a distinctive color, the combination of actuators for the balance totalizer; means to engage the balance totalizer with the actuators; and means prepared for operation in an overdraft operation and operated by the balance totalizer engaging means when the balance totalizer is engaged with the actuators following said overdraft operation, to control the operation of the ribbon positioning means to cause a repeat recording of the true negative balance to be in said distinctive color.

7. In a machine of the class described, having a balance totalizer, printing means, a multi-colored ribbon, and means to position the ribbon to enable printing to be performed in different colors, and adapted to perform overdaft operations in which the complementary amount of an overdraft is changed to a true negative balance, said true negative balance stored in the balance totalizer and printed in a distinctive color, the combination of actuators for the balance totalizer; means to engage the balance totalizer with the actuators; means to initiate an overdraft operation; means to latch the initiating means in effective position; means to disengage the latching means near the end of an overdraft operation; and means conditioned for operation by the disengaging means and operated by the balance totalizer engaging means, in a balance operation following an overdraft operation, to control the ribbon positioning means to cause a repeat print of the true negative balance to be recorded in a distinctive color.

8. In a machine of the class described, having a balance totalizer and printing means, and adapted to perform overdraft operations in which the complementary amount of an overdraft is changed to a true negative balance, said true negative balance stored in the balance totalizer and printed upon record material, the combination of an inking ribbon having two sections of different colors; means to lift the ribbon to printing position; means including a rockable shaft to control the lifting means to determine which section of the ribbon is lifted to printing position; means to rock the shaft in overdraft operations to cause the true negative balance to be printed in a particular color; and means conditioned for operation in an overdraft operation and operated in a balance operation following said overdraft operation, to rock the shaft to control the lifting means to cause a repeat print of the true negative balance to be in said particular color.

9. In a calculating machine, having a balance totalizer and printing means, and adapted to perform overdraft operations, in which the complementary amount of an overdraft is changed to a true negative balance, said true negative balance is stored in the balance totalizer and is printed upon record material, the combination of an inking ribbon having two sections of different colors; means to lift the ribbon to printing position; means including a rockable shaft to control the lifting means to control which section of the ribbon will be lifted to printing position; means to rock the shaft in overdraft operations to control the lifting means to cause the true negative balance to be printed in a certain color; a device operated near the end of an overdraft operation; and means, the operation of which is conditioned by the device and effected in a balance operation following an overdraft operation, to rock the shaft to control the operation of the lifting means to cause a repeat print of the true negative balance to be in said certain color.

10. In a machine of the class described, having a balance totalizer and printing means, and adapted to perform overdraft operations, in which the complementary amount of an overdraft is changed to a true negative balance, said true negative balance stored in the balance totalizer and printed upon record material, the combination of actuators for the balance totalizer; means to engage the balance totalizer with the actuators; an inking ribbon having two sections of different colors; means to move the inking ribbon to printing position; means to control the moving means to cause the proper section of the ribbon to be moved to printing position; means to operate the controlling means for the moving means in overdraft operations to cause the true negative balance to be printed in a certain color; a device operative during an overdraft operation; and means rendered effective by the device and operated by the balance totalizer engaging means, in an operation following an overdraft operation, to operate the controlling means for the moving means to control the moving means to cause the ribbon to be positioned to cause a repeat print of the true negative balance to be in said certain color.

11. In a machine of the class described, having a balance totalizer and printing means, and adapted to perform overdraft operations, in which the complementary amount of the overdraft is changed to a true negative balance, said true negative balance printed on record material and stored in the balance totalizer, the combination of a two-color inking ribbon; means to shift the ribbon from normal to printing position; means to control the shifting means to cause the proper colored portion of the ribbon to be shifted to printing position; means to move the controlling means for the shifting means from a normal position to a predetermined position in overdraft operations to control the operation of the ribbon shifting means to shift the ribbon to cause the true negative balance to be printed in a certain color; means to return the controlling means for the shifting means to its normal position near the end of each machine operation in which printing occurs; a signal type carrier; a member connected to the type carrier and the returning means; an element operatively connected to the member; means to operate the element, in an operation following an overdraft operation; and means rendered effective in an overdraft operation, to connect the element to its operating means, to cause the member in cooperation with the returning means to move the controlling means for the shifting means to said predetermined position to control the operation of the ribbon shifting means to position the ribbon to make a record of a repeat print of the true negative balance in said certain color and to cause said member to position the type carrier to record an identifying signal.

12. In a machine of the character described, having a balance totalizer and printing means, and adapted to perform overdraft operations in which the complementary amount of an overdraft is changed to a true negative balance, said true negative balance printed on record material and stored in the balance totalizer, the combination of a two-color inking ribbon; means to shift the ribbon to printing position; means to control the shifting means, to cause the proper colored portion of the ribbon to be shifted to printing position; means to move the controlling means for the shifting means from a normal position to a predetermined position in overdraft operations to control the ribbon shifting means to position the ribbon to cause the true negative balance to be printed in a certain color; means to return the controlling means for the shifting means to its normal position near the end of each machine operation in which printing occurs; a signal type carrier; a member connected to the type carrier and the returning means; an element operatively connected to the member; means to operate the element in an operation following an overdraft operation; means to connect the element to its operating means; and a device, operative in overdraft operations, to move the element into engagement with the connecting means, to cause the member to position the type carrier to record an identifying signal and to cause said member, in cooperation with the returning means, to move the controlling means for the shifting means to said predetermined position to control the ribbon shifting means to position the ribbon so that a repeat print of the true negative balance will be recorded in said certain color.

13. In a machine of the class described, having a balance totalizer and printing means, and adapted to perform overdraft operations in which the complementary amount of an overdraft is changed to a true negative balance, said true negative balance printed on record material and stored in the balance totalizer, the combination of a two-color inking ribbon, means to move the ribbon from non-printing to printing position; means to govern the movement of the ribbon moving means to cause the proper colored portion of the ribbon to be moved to printing position; an element connected to the governing means and settable in an overdraft operation; means to operate the element in an operation following an overdraft operation; a latch on the operating means to engage the element when the element has been set; a device operative in overdraft operations to move the element into engagement with the latch; and means operable to move the operating means, the latch, and the element to position the governing means to control the ribbon moving means to cause the ribbon to be positioned so that a repeat print of the true negative balance will be in a certain color.

14. In a machine of the class described, having a balance totalizer and printing means, and adapted to perform overdraft operations in which the complementary amount of an overdraft is changed to a true negative balance, said true negative balance printed on record material and stored in the balance totalizer, the combination of means to move the balance totalizer to and from actuating position; a two-color inking ribbon; means to move the ribbon from non-printing to printing position; means to control the moving means for the ribbon to cause the proper colored portion of the ribbon to be moved to printing position; an element connected to the controlling means; means including a member connected to and operating in unison with the moving means for the balance totalizer; a latch on the member; and a device operative in overdraft operations to move the element into engagement with the latch, whereupon operation of the moving means for the balance totalizer, in an operation following an overdraft operation, positions the controlling means to control the ribbon moving means to cause a repeat print of the true negative balance to be recorded in a certain color.

15. In a calculating machine, having a balance totalizer and printing means, and adapted to perform overdraft operations in which the complementary amount of an overdraft is changed to a true negative balance, said true negative balance printed on record material and stored in the balance totalizer, the combination of means to move the balance totalizer to and from actuating position; a two-colored inking ribbon; means to move the ribbon from non-printing to printing position; means to control the moving means for the ribbon to cause the proper colored portion of the ribbon to be moved to printing position; an element connected to the controlling means; means including a member connected to and operating in unison with the moving means for the balance totalizer; a latch on the member; a device operative in overdraft operations to move the element into engagement with the latch, so that operation of the moving means for the balance totalizer in a balance operation following an overdraft operation, positions the controlling means to control the ribbon moving means to cause a repeat print of the true negative balance to be in a distinctive color; and means effective only when the controlling means is thus positioned to disengage the latch from the element.

16. In a calculating machine, having a balance totalizer and printing means, and adapted to perform overdraft operations in which the complementary amount of an overdraft is changed to a true negative balance, said true negative balance printed on record material and stored in the balance totalizer, the combination of a red and black inking ribbon; means to move the ribbon to and from printing position; means comprising a rockable shaft and a part connected thereto to limit the movement of the moving means for the ribbon, to cause the black portion of the ribbon to be moved to printing position; means effective in overdraft operations to rock the shaft to control the movement of the ribbon moving means to cause the red portion of the ribbon to be moved to printing position to record the true negative balance in a distinctive color; means to return the shaft to normal position during each machine operation in which printing occurs; a signal type carrier; a member connected to the type carrier and the returning means; an element operatively connected to the member; means to move the balance totalizer to and from actuating position; means including a piece connected to and operating in unison with the balance totalizer moving means; a latch on the piece; a device operative in overdraft operations to move the element into engagement with the latch, whereupon operation of the moving means for the balance totalizer, in an operation following an overdraft operation, causes the member in cooperation with the returning means, to rock the shaft and control the movement of the ribbon moving means to cause the red portion of the ribbon to be moved to printing position to record a repeat print of the true negative balance in a distinctive color, and to cause said member to position the type carrier to record an identifying signal; and means, effective only after a repeat print of the true negative balance has been recorded, to disengage the latch from the element.

17. In a machine of the class described, having a balance totalizer, operating means for the balance totalizer, and printing means adapted to record various data on a ledger sheet, the combination of a traveling carriage; means controlled by the traveling carriage to condition the balance totalizer operating means to cause the balance totalizer to be operated for subtract operations; means rendered effective by the conditioning means to cause subtractive items to be printed in a distinctive color; means to render the causing means ineffective, to cause subtractive items to be printed in an ordinary color; means to print an identifying symbol when subtractive items are printed in an ordinary color; means to automatically accumulate one for each subtractive item entered in the machine; and means operated by the traveling carriage controlled means to render the symbol printing means and item accumulating means effective.

18. In a machine of the class described, having a balance totalizer, operating means for the balance totalizer, and printing means adapted to record various data on a ledger sheet, the combination of means to condition the balance totalizer operating means to cause the balance totalizer to be operated for a subtract operation; means rendered effective by the conditioning means to cause subtractive items to be printed in a conspicuous color; means to render the causing means ineffective, to cause subtractive items to be printed in an inconspicuous color; means to print an identifying symbol when subtractive items are printed in an inconspicuous color; means to count the number of subtractive items entered in the machine and including a plurality of actuating members; normally effective means to retain the members in a neutral position; means operated by the conditioning means to cause the retaining means to release the members; a traveling carriage; and means including control elements on the carriage and a lever cooperating therewith to control the conditioning means to thereby render the symbol printing means effective and to cause the retaining means to release the members for operation.

19. In a machine adapted to print subtractive items in a particular color, count said items, and print a symbol indicating that the items are being counted and printed in the particular color, the combination of symbol keys; amount keys; actuators controlled by said keys; amount type and symbol type positioned by said actuators; a balance totalizer; operating means for the balance totalizer; means to condition the totalizer operating means to cause the balance totalizer to be operated for subtractive engagement with certain of the actuators; means controlled by the conditioning means to cause subtractive items to be printed in a conspicuous color; manipulative means to prevent the operation of the causing means, to enable the printing of subtractive items in a particular color; said symbol type being normally in position to print a symbol indicating that a subtractive item is being printed in said particular color; means to automatically count the number of subtractive items, and including a plurality of actuating members; a traveling carriage; means on the carriage operable in certain positions of the carriage to operate the conditioning means and, through the conditioning means, control the operation of the symbol type and the members; amount key controlled means jointly cooperable with the conditioning means to control the operation of the symbol type and the members; and means operated by the manipulative device and jointly cooperable with the conditioning means and the amount key controlled means to control the operation of the symbol type; so that upon operation of the machine with the carriage in position to operate the conditioning means, with the manipulative means effective and with amount keys operated, the item will be counted and a symbol printed to indicate that the item has been counted and printed in said particular color.

20. In a machine of the class described, having a balance totalizer, operating means for the balance totalizer, and printing means adapted to record various data on a ledger sheet, the combination of means to condition the balance totalizer operating means to cause the balance totalizer to be operated for subtract operations; means rendered effective by the conditioning means to cause subtractive items to be printed in a prominent color; means to render the causing means ineffective, to cause subtractive items to be printed in an ordinary color; means controlled by said conditioning means and said rendering means and operable to print an identifying symbol when subtractive items are printed in an ordinary color; means to automatically accumulate one for each subtractive item entered in the machine; means operated by said conditioning means to render the item accumulating means effective; a traveling carriage; and means whereby the traveling carriage controls the conditioning means and thereby controls the symbol printing means, and the item accumulating means.

PAUL H. WILLIAMS.
JESSE R. GANGER.
WILLIAM H. PETIT.
JOHN T. DAVIDSON.